(12) United States Patent
Su et al.

(10) Patent No.: US 11,405,157 B2
(45) Date of Patent: Aug. 2, 2022

(54) DATA TRANSMISSION METHOD AND APPARATUS AND COMPUTER STORAGE MEDIUM

(71) Applicant: China Academy of Telecommunications Technology, Beijing (CN)

(72) Inventors: Xin Su, Beijing (CN); Qiubin Gao, Beijing (CN); Tamrakar Rakesh, Beijing (CN); Runhua Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 85 days.

(21) Appl. No.: 16/961,687

(22) PCT Filed: Dec. 12, 2018

(86) PCT No.: PCT/CN2018/120742
§ 371 (c)(1),
(2) Date: Jul. 12, 2020

(87) PCT Pub. No.: WO2019/137144
PCT Pub. Date: Jul. 18, 2019

(65) Prior Publication Data
US 2021/0083826 A1 Mar. 18, 2021

(30) Foreign Application Priority Data
Jan. 12, 2018 (CN) .......................... 201810032484.6

(51) Int. Cl.
*H04L 5/00* (2006.01)
*H04B 17/373* (2015.01)
*H04B 7/0413* (2017.01)

(52) U.S. Cl.
CPC .......... *H04L 5/0051* (2013.01); *H04B 7/0413* (2013.01); *H04B 17/373* (2015.01); *H04L 5/0026* (2013.01); *H04L 5/0078* (2013.01)

(58) Field of Classification Search
CPC ... H04L 5/0051; H04L 5/0026; H04L 5/0078; H04L 1/1893; H04L 5/0048;
(Continued)

(56) References Cited

U.S. PATENT DOCUMENTS

2011/0176517 A1 7/2011 Hu et al.
2012/0300670 A1* 11/2012 Sun ...................... H04L 5/0023
370/254
(Continued)

FOREIGN PATENT DOCUMENTS

CN 101605375 B 2/2011
CN 102088429 A 6/2011
(Continued)

OTHER PUBLICATIONS

3GPP TS 38.211 V15.0.0, 3rd Generation Partnership Project;Technical Specification Group Radio Access Network; NR; Physical channels and modulation; Release 15, total 73 pages, Dec. 2017 (Year: 2017).*
(Continued)

*Primary Examiner* — Ayaz R Sheikh
*Assistant Examiner* — Louis Samara
(74) *Attorney, Agent, or Firm* — Kilpatrick Townsend & Stockton, LLP

(57) ABSTRACT

Disclosed are a data transmission method and apparatus and a computer storage medium, used to arrive at the mapping a data layer, based on a predefined DMRS port ordering rule, onto the DMRS port used during transmission to transmit the data layer. The present application provides a data transmission method, comprising: determining a predefined
(Continued)

S101
Determining a preset DMRS port ordering rule

S102
Mapping a data layer onto a DMRS port for transmission according to the preset DMRS port ordering rule, and sending the data layer to a terminal demodulation reference signal (DMRS) port ordering rule; and mapping, according to the predefined DMRS port ordering rule, a data layer onto the DMRS port used during transmission to send the data layer to a terminal.

18 Claims, 6 Drawing Sheets

(58) Field of Classification Search
CPC . H04L 25/0204; H04L 5/0023; H04B 17/373; H04B 7/0413; H04B 7/024
See application file for complete search history.

(56) References Cited

U.S. PATENT DOCUMENTS

| | | | | |
|---|---|---|---|---|
| 2012/0300709 | A1* | 11/2012 | Su | H04L 5/0051 370/328 |
| 2018/0026764 | A1* | 1/2018 | Namgoong | H04L 5/0048 370/329 |
| 2018/0041320 | A1* | 2/2018 | Jin | H04L 5/0048 |
| 2020/0235901 | A1* | 7/2020 | Dou | H04L 5/0044 |

FOREIGN PATENT DOCUMENTS

| | | |
|---|---|---|
| CN | 102158319 A | 8/2011 |
| CN | 102299769 A | 12/2011 |
| CN | 103916349 A | 7/2014 |
| CN | 109842468 A | 6/2019 |
| EP | 2369776 B1 | 8/2018 |
| JP | 2013520046 A | 5/2013 |
| JP | 2014533909 A | 12/2014 |
| JP | 2015136115 A | 7/2015 |
| JP | 2020528299 A | 9/2020 |
| WO | 2011088589 A1 | 7/2011 |
| WO | 2016099057 A1 | 6/2016 |
| WO | 2017181818 A1 | 10/2017 |

OTHER PUBLICATIONS

3GPP TS 38.211 V15.0.0, 3rd Generation Partnership Project;Technical Specification Group Radio Access Network; NR; Physical channels and modulation; Release 15, total 73 pages, Dec. 2017.

3GPP TS 38.212 V15.0.0, 3rd Generation Partnership Project; Technical Specification Group Radio Access Network; NR; Multiplexing and channel coding; Release 15, total 82 pages, Dec. 2017.

Samsung, "Remaining details on DL DMRS", 3GPP TSG RAN WG1 Meeting #90,Prague, Czechia, Aug. 21-25, 2017, total 9 pages, R1-1713603.

Vivo, "Remaining details on DMRS design", 3GPP TSG RAN WG1 Meeting #91, Reno, USA, Nov. 27-Dec. 1, 2017, total 9 pages, R1-1719774.

Pamech, "Discussion on demodulation RS for DL MIMO enhancements", 3GPP TSG RAN WG1 Meeting #65, Barcelona, Spain, May 9-May 13, 2011, total 4 pages, R1-111655.

* cited by examiner

DATA TRANSMISSION METHOD AND APPARATUS AND COMPUTER STORAGE MEDIUM

The present application is a national phase entry under 35 U.S.C. § 371 of International Application No. PCT/CN2018/120742, filed on Dec. 12, 2018, which claims the priority from Chinese Patent Application No. 201810032484.6, filed with the China National Intellectual Property Administration on Jan. 12, 2018 and entitled "Data Transmission Method and Apparatus and Computer Storage Medium", both of which are hereby incorporated by reference in their entireties.

FIELD

The present application relates to the field of communication technologies, and particularly to a data transmission method and apparatus and a computer storage medium.

BACKGROUND

In the New Radio (NR) system, Demodulation Reference Signal (DMRS) is required for channel estimation during the data demodulation process. In the prior art, the DMRS in the NR system will be transmitted using the same pre-coding scheme as the corresponding data layer.

SUMMARY

The embodiments of the present application provide a data transmission method and apparatus and a computer storage medium, to implement the mapping of the data layer to the DMRS port for transmission based on the preset DMRS port ordering rule for transmission.

At the network side, a method for sending data provided by an embodiment of the present application includes:
  determining a preset DMRS port ordering rule;
  mapping a data layer onto a DMRS port for transmission according to the preset DMRS port ordering rule, and sending the data layer to a terminal.

With this data sending method, the preset DMRS port ordering rule is determined, and the data layer is mapped onto the DMRS port for transmission according to the preset DMRS port ordering rule and then sent to the terminal, implementing the mapping of the data layer to the DMRS port for transmission based on the preset DMRS port ordering rule for transmission.

Accordingly, at the terminal side, a method for receiving data provided by an embodiment of the present application includes:
  determining a preset DMRS port ordering rule;
  receiving a data layer mapped onto a DMRS port according to the preset DMRS port ordering rule.

At the network side, a data sending apparatus provided by an embodiment of the present application includes: a memory and a processor, where the memory is configured to store the program instructions, and the processor is configured to invoke the program instructions stored in the memory and, in accordance with the obtained program, perform:
  determining a preset DMRS port ordering rule;
  mapping a data layer onto a DMRS port for transmission according to the preset DMRS port ordering rule, and sending the data layer to a terminal.

At the terminal side, a data receiving apparatus provided by an embodiment of the present application includes: a memory and a processor, and the memory is configured to store the program instructions, and the processor is configured to invoke the program instructions stored in the memory and, in accordance with the obtained program, perform:
  determining a preset DMRS port ordering rule;
  receiving a data layer mapped onto a DMRS port according to the preset DMRS port ordering rule.

At the network side, another data sending apparatus provided by an embodiment of the present application includes:
  a determining device configured to determine a preset DMRS port ordering rule;
  a sending device configured to map a data layer onto a DMRS port for transmission according to the preset DMRS port ordering rule, and sending the data layer to a terminal.

At the terminal side, another data receiving apparatus provided by an embodiment of the present application includes:
  a determining device configured to determine a preset DMRS port ordering rule;
  a receiving device configured to receive a data layer mapped onto a DMRS port according to the preset DMRS port ordering rule.

Another embodiment of the present application provides a computer storage medium storing the computer executable instructions which are configured to cause the computer to perform any one of the above-mentioned methods.

BRIEF DESCRIPTION OF THE DRAWINGS

The embodiments of the present application are described in the accompanying figures

DETAILED DESCRIPTION OF THE EMBODIMENTS

The embodiments of the present application provide a data transmission method and apparatus and a computer storage medium, to implement the mapping of the data layer to the DMRS port for transmission based on the preset DMRS port ordering rule for transmission.

The basic DMRS pattern (front-load DMRS) configuration includes the following cases.

Configuration 1

The number of DMRS symbols is 1: combination (comb) 2+Cyclic Shift (CS) 2, up to 4 ports.

Figure 1:
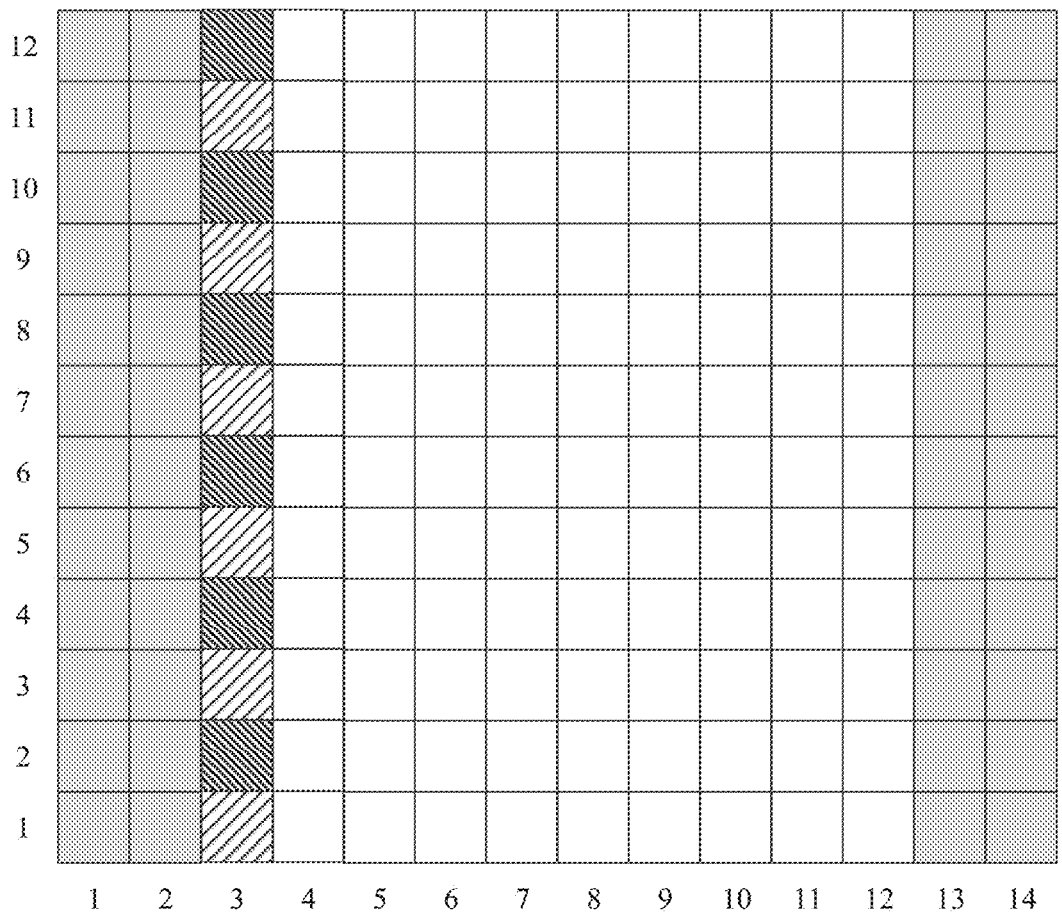
FIG. 1 is a schematic diagram of a first DMRS pattern provided by an embodiment of the present application.

Referring to FIG. 1, comb2 refers to frequency domain multiplexing. For example, the multiplexing relationship of comb2 exists between ports 0 and 2. CS2 refers to multiplexing of the sequence between ports by way of Cyclic Shifting (CS). For example, the multiplexing relationship of CS2 exists between ports 0 and 1.

The number of DMRS symbols is 2: comb2+CS2+TD-OCC ($\{1, 1\}$ and $\{1, -1\}$), up to 8 ports. Here TD-OCC ($\{1, 1\}$ and $\{1, -1\}$) indicates that the Time Domain Orthogonal Cover Code (TD-OCC) multiplexing is used between two ports, and $\{1, 1\}$ and $\{1, -1\}$ are the multiplexing coefficients for the two ports respectively.

Figure 2:
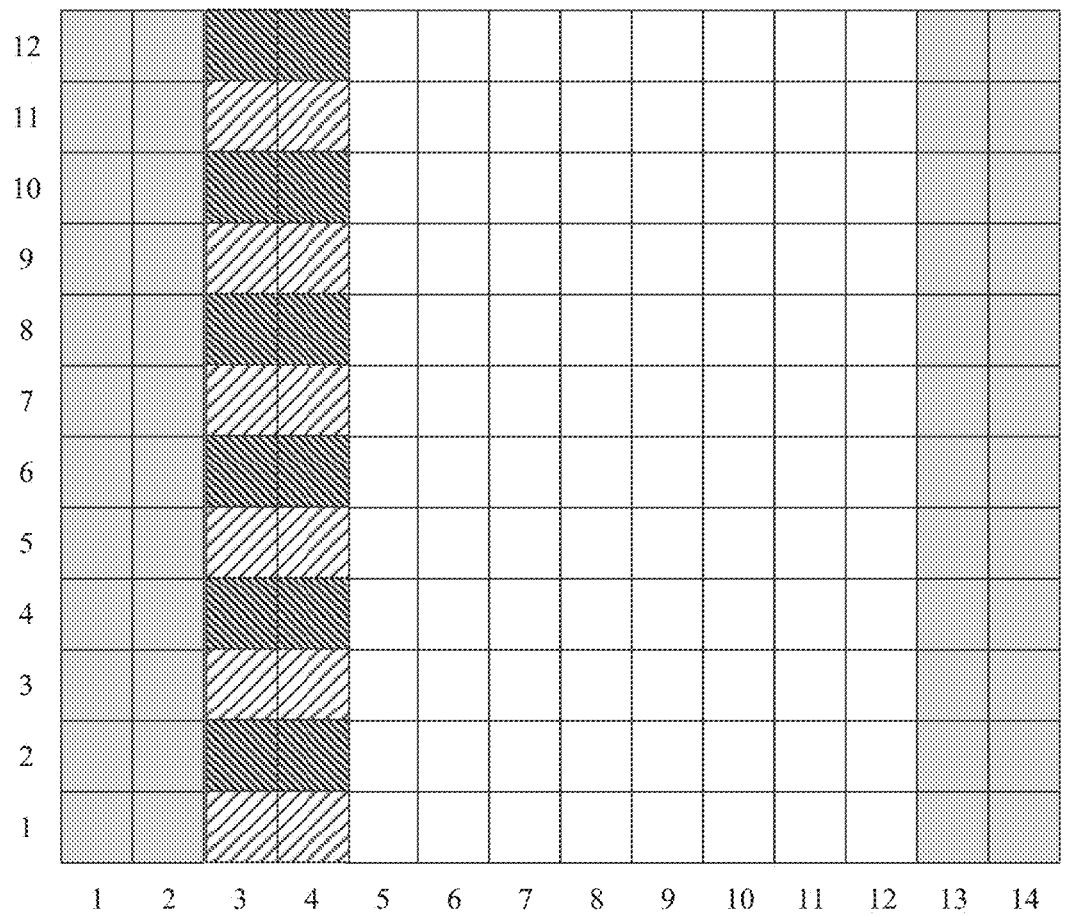
FIG. 2 is a schematic diagram of a second DMRS pattern provided by an embodiment of the present application.

Referring to FIG. 2, TD-OCC refers to time domain Orthogonal Cover Code (OCC) multiplexing. For example, the time domain OCC multiplexing is used between ports 0/1 and 4/5. Here the CS2 multiplexing exists between port 0 and port 1, the CS2 multiplexing exists between port 4 and port 5, and the time domain OCC multiplexing exists between port 0/1 and port 4/5.

Configuration 2:

The number of DMRS symbols is 1: 2-FD-OCC (across adjacent Resource Elements (REs) in the frequency domain), up to 6 ports.

Figure 3:
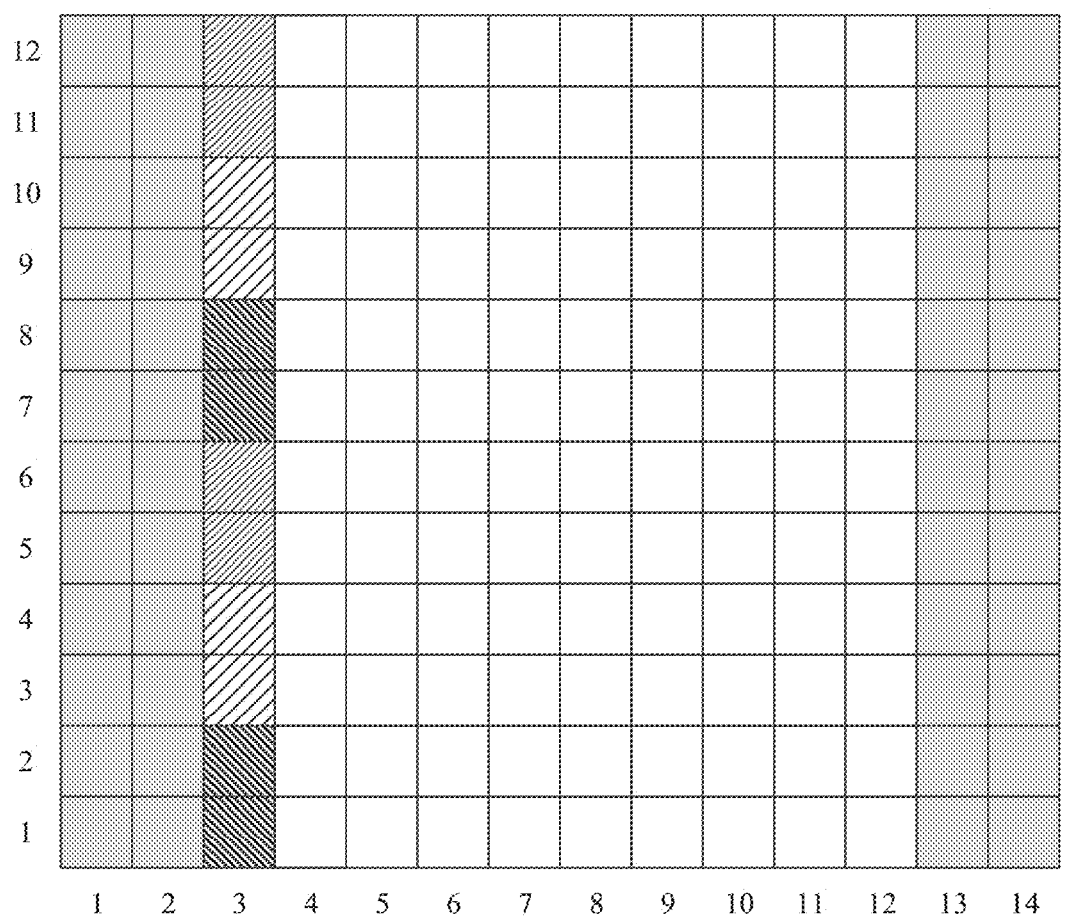
FIG. 3 is a schematic diagram of a third DMRS pattern provided by an embodiment of the present application.

Referring to FIG. 3, 2-FD-OCC refers to frequency domain OCC multiplexing. For example, the frequency domain OCC multiplexing exists between ports 0 and 1. In addition, the Frequency-Division Multiplexing (FDM) is used between the ports 0/1 and other ports, for example, the FDM mode is used between ports 0/1 and 2/3.

The number of DMRS symbols is 2: 2-FD-OCC (across adjacent REs in the frequency domain)+TD-OCC ($\{1, 1\}$ and $\{1, -1\}$), up to 12 ports.

Figure 4:
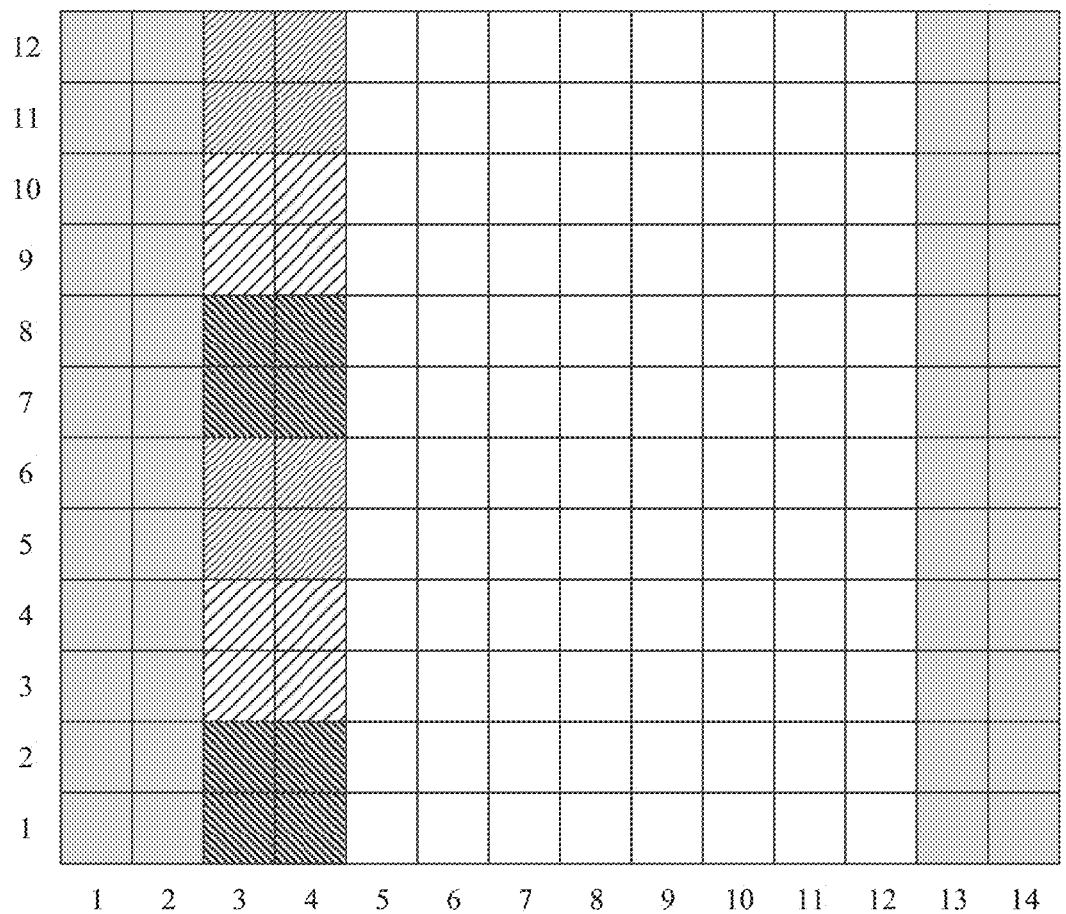
FIG. 4 is a schematic diagram of a fourth DMRS pattern provided by an embodiment of the present application.

Referring to FIG. 4, TD-OCC refers to time domain OCC multiplexing, for example, the time domain OCC multiplexing is used between ports 0/1 and 6/7.

As can be seen from various DMRS patterns described above, in the case of configuration 1: if the maximum number of ports supported does not exceed 4, the pattern shown in FIG. 1 may be used for configuration; and if it exceeds 4 but does not exceed 8, the pattern shown in FIG. 2 may be used for configuration. In the case of configuration 2, if the maximum number of ports supported does not exceed 6, the pattern shown in FIG. 3 may be used for configuration, and if it exceeds 6 but does not exceed 12, the pattern shown in FIG. 4 may be used for configuration. The number of ports mentioned here refers to the sum of the numbers of multiplexed ports of all the terminals at each resource position.

As a supplementary note, in FIGS. 1 to 4, the first two columns represent the control symbol field, i.e., the symbol positions that the downlink control channel needs to occupy, and the last two columns may be the symbol positions that the uplink control channel needs to occupy, i.e., the symbol resources that cannot be used for the Physical Downlink Shared Channel (PDSCH) data channel.

In an NR system, there may be a need to consider a case of cooperative transmission of multiple Transmission/Reception Points (TRPs)/antenna panels or subarrays. In this case, the signals sent by different TRPs/panels may have relatively independent large-scale features, such as average delay, delay spread, average Doppler shift, Doppler spread, spatial domain reception parameters, etc. Therefore, in the NR system, the case where two or more reference signal channels have the same large-scale parameters is called Quasi-Co-Location (QCL). Otherwise, it is called non-QCL. Here, the large-scale parameters are, for example, average delay, delay spread, Doppler shift, Doppler spread, spatial reception parameters, average reception power, etc. Furthermore, the QCL is further interpreted as follows: the terminal cannot determine that the received reference signal ports come from sites or antenna panels in the same or different physical positions; if two reference signal ports have the same average delay, delay spread, Doppler shift, Doppler spread, spatial reception parameters, average reception power and other parameters (or a subset thereof), it can be considered that these two reference signals are quasi-co-located in the sense of the above-mentioned large-scale parameters.

For the DMRS ports, QCL group, i.e., QCL group of DMRS ports (may be called QCL group for short) is defined in the NR system. The DMRS ports in the QCL group are in QCL relationship, while the DMRS ports belonging to different QCL groups are in non-QCL relationship. It is specified in the NR system that the DMRS ports in the same Code Division Multiplexing (CDM) group have the QCL relationship. That is, in a CDM group, all the reference signal ports occupy the same time-frequency resources and are distinguished by orthogonal code words. Taking FIG. 4 as an example, due to the characteristics of the DMRS design, when there is one DMRS symbol, the port 0/1 has the CDM relationship, the port 2/3 has the CDM relationship, and there is the FDM relationship between the port 0/1 and port 2/3. In FIGS. 1 to 4, adjacent blocks with the same filling pattern form a CDM group. Each data channel can support two QCL groups. The data channel is for example PDSCH.

The QCL group of DMRS ports described in the embodiments of the present application may be called QCL group for short, or may be called DMRS group.

The DMRS port described in the embodiments of the present application may be called port for short, or may be called antenna port.

The specific solution provided by an embodiment of the present application includes the following.

Figure 5:
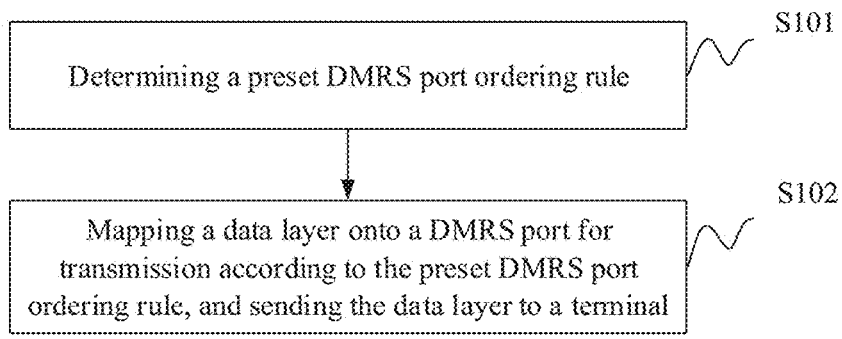
FIG. 5 is a flow schematic diagram of a method for sending data provided by an embodiment of the present application.

Referring to FIG. 5, at the network side, e.g., at the base station side, a data transmission method provided by an embodiment of the present application includes:

S101: determining a preset DMRS port ordering rule;

S102: mapping a data layer onto a DMRS port for transmission according to the preset DMRS port ordering rule, and sending the data layer to the terminal.

In one embodiment, in an embodiment of the present application, the vector of DMRS ports is denoted as $$\begin{bmatrix} y^{(p_0)}(i) \\ \vdots \\ y^{(p_{v-1})}(i) \end{bmatrix},$$

and $\{P_0, \ldots, P_{v-1}\}$ represents a set of v DMRS port numbers. For example, the value of any element (i.e., the value of any port number) is an integer in the range of [0, 11].

In one embodiment, mapping a data layer onto a DMRS port for transmission according to the preset DMRS port ordering rule and then sending the data layer to the terminal, specifically includes:

mapping v data layers onto v DMRS ports according to the following formula and then sending the data layers to the terminal:

$$\begin{bmatrix} y^{(P_0)}(i) \\ \vdots \\ y^{(P_{v-1})}(i) \end{bmatrix} = \begin{bmatrix} x^{(0)}(i) \\ \vdots \\ x^{(v-1)}(i) \end{bmatrix}$$

where $i=0, 1, \ldots, M_{symb}^{layer}-1$, i represents the $i^{th}$ modulation symbol in $M_{symb}^{layer}$ modulation symbols for transmission in each data layer; $P_0, \ldots, P_{v-1}$ represent v DMRS port numbers;

$$\begin{bmatrix} y^{(P_0)}(i) \\ \vdots \\ y^{(P_{v-1})}(i) \end{bmatrix}$$

is a vector of v DMRS ports determined according to the preset DMRS port ordering rule, which is a vector of DMRS port signals obtained by sorting the DMRS port numbers;

$$\begin{bmatrix} x^{(0)}(i) \\ \vdots \\ x^{(v-1)}(i) \end{bmatrix}$$

is a vector of sending signals obtained by sorting the data layers by number according to the number of v of data layers in parallel transmission of Multiple-Input-Multiple-Output (MIMO);

$$\begin{bmatrix} y^{(P_0)}(i) \\ \vdots \\ y^{(P_{v-1})}(i) \end{bmatrix} = \begin{bmatrix} x^{(0)}(i) \\ \vdots \\ x^{(v-1)}(i) \end{bmatrix}$$

represents mapping a data layer $x^{(0)}(i)$ onto a DMRS port $y^{(P_0)}(i)$ for transmission for sending to the terminal, and so on, mapping a data layer $x^{(v-1)}(i)$ onto a DMRS port $y^{(P_{v-1})}(i)$ for transmission for sending to the terminal.

In one embodiment, the DMRS port ordering rule is preset in one of the following ways.

Way 1-1: sorting based on the order of DMRS port numbers contained in a DMRS port vector from smallest to largest.

Way 1-2: sorting CDM groups to which the DMRS ports contained in the DMRS port vector belong, based on the CDM group numbers; for example:

when two CDM groups are involved, the order may be 0, 1 or 1, 0;

when three CDM groups are involved, the order may be 0, 1, 2 or 0, 2, 1 or 1, 0, 2 or 1, 2, 0 or 2, 0, 1 or 2, 1, 0;

and for each CDM group, sorting the DMRS ports in the group based on the DMRS port numbers; for example, sorting in the order of the DMRS port numbers from smallest to largest.

Way 1-3:

During single-codeword transmission, the above way 1-1 or way 1-2 is adopted.

During dual-codeword transmission, two steps below are included.

Step 1: grouping DMRS ports among the DMRS ports allocated by the Downlink Control Information (DCI) according to the configured or indicated DMRS QCL grouping parameters, and for each DMRS group:

sorting DMRS ports in the order of DMRS port numbers from smallest to largest, or sorting CDM groups to which DMRS ports in the DMRS-group belong, based on the CDM group numbers, and sorting in the order of DMRS port numbers from smallest to largest in each CDM group.

Step 2: sorting across DMRS-groups.

When the number of data layers is odd:

placing groups containing a smaller number of DMRS ports in front positions, or sorting all DMRS groups based on the DMRS group number, for example: in an order of DMRS-group1, DMRS-group2 or DMRS-group2, DMRS-group1, and sorting the corresponding DMRS groups.

The "data layer" (i.e., layer) described in the embodiments of the present application refers to the data stream transmitted by MIMO.

When the number of data layers is even:

ensuring that a set of DMRS ports (corresponding to one DMRS-group) corresponding to the codeword 1 is the same as a set of DMRS ports (corresponding to one DMRS-group) corresponding to the codeword 1 when the number of layers minus 1, and a set of DMRS ports (corresponding to one DMRS-group) corresponding to the codeword 0 contains a set of DMRS ports (corresponding to one DMRS-group) corresponding to the codeword 0 when the number of layers minus 1. Taking the following table case 2-2-2 as an example, the cases of the dual-codeword and value=2 and 3 correspond to rank5 and rank6, respectively. In the case of rank5, the occupied ports are 0, 1, 2, 3, 6, and the order is 23016. According to the current mapping relationship between codewords and layers, the codeword 0 is mapped to ports 2 and 3, and the codeword 1 is mapped to ports 0, 1 and 6. Then in the case of rank6, the port order of 238016 should be selected, so that the codeword 1 still uses ports 0, 1 and 6, and a port 8 is added to a set of ports used by the codeword 0;

or, sorting all DMRS groups based on the DMRS group numbers, for example: DMRS-group1, DMRS-group2 or DMRS-group2, DMRS-group1, and sorting the corresponding DMRS groups.

Way 1-4:

When one DMRS group is used, the above way 1-1 or way 1-2 is adopted.

When two DMRS groups are used:

grouping DMRS ports among the DMRS ports allocated by the DCI based on the high-level configured DMRS QCL grouping parameters (for example, among the DMRS ports allocated by the DCI, those belonging to DMRS-group1 are divided into one group, and those belonging to DMRS-group2 are divided into one group), and for each DMRS group: sorting the DMRS ports in the order of DMRS port numbers from smallest to largest, or sorting the CDM groups to which the DMRS ports in the DMRS group belong, based on the CDM group numbers, and sorting in the order of DMRS port numbers from smallest to largest in each CDM group;

placing the DMRS groups containing a smaller number of DMRS ports in the front positions.

It should be noted that the above ways are also applicable to the method at the terminal side, that is, the terminal side may also determine the DMRS port ordering rule in the above ways, which will not be described in detail later.

In one embodiment, the method further includes:

sending the DCI to the terminal so that the terminal determines the configuration parameters of the DMRS port according to the DCI. The DCI includes, for example, current DMRS high-level configuration parameters, e.g., the DMRS configuration type and the maximum number of DMRS symbols (i.e., the maximum number of consecutive symbols used during the DMRS transmission). Here the DMRS configuration type is, for example, downlink DMRS configuration type (DL-DMRS-config-type), and of course, may be an uplink one. The maximum number of DMRS symbols is, for example, the maximum number of downlink DMRS symbols (DL-DMRS-max-len), and of course, may be an uplink one.

Figure 6:
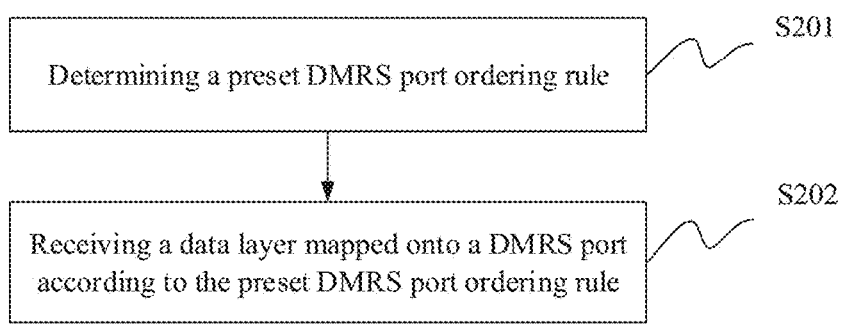
FIG. 6 is a flow schematic diagram of a method for receiving data provided by an embodiment of the present application.

Accordingly, at the terminal side, referring to FIG. 6, a method for receiving data provided by an embodiment of the present application includes:

S201: determining a preset DMRS port ordering rule;

S202: receiving a data layer mapped onto a DMRS port according to the preset DMRS port ordering rule.

In one embodiment, receiving the data layer mapped onto the DMRS port according to the preset DMRS port ordering rule, specifically includes:

receiving the data layer mapped onto the DMRS port for transmission according to the following formula:

$$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix}$$

where $i=0, 1, \ldots, M_{symb}^{layer}-1$, i represents the $i^{th}$ modulation symbol in $M_{symb}^{layer}$ modulation symbols for transmission in each data layer; $P_0, \ldots, P_{v-1}$ represent v DMRS port numbers;

$$\begin{bmatrix} y^{(p_0)}(i) \\ \vdots \\ y^{(p_{v-1})}(i) \end{bmatrix}$$

is a vector of v DMRS ports determined according to the preset DMRS port ordering rule;

$$\begin{bmatrix} x^{(0)}(i) \\ \vdots \\ x^{(v-1)}(i) \end{bmatrix}$$

is a vector of sent signals obtained by sorting data layers by number according to the number v of MIMO data layers transmitted in parallel;

$$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix}$$

refers to that receiving a data layer $x^{(0)}(i)$ on a DMRS port $y^{(p_0)}(i)$ used during transmission, and so on, receiving a data layer $x^{(v-1)}(i)$ on a DMRS port $y^{(p_v-1)}(i)$ used during transmission.

In one embodiment, the terminal may determine $$\begin{bmatrix} y^{(p_0)}(i) \\ \vdots \\ y^{(p_{v-1})}(i) \end{bmatrix}$$

in one of the following ways.

Way 3-1:

The terminal determines a set of DMRS ports used by the terminal for the DMRS configuration type (such as DL-DMRS-config-type) and the maximum number of downlink DMRS symbols (such as DL-DMRS-max-len) (i.e., the maximum number of consecutive symbols used during the DMRS transmission) in the current DMRS high-level configuration parameter according to the received DCI.

The terminal determines $$\begin{bmatrix} y^{(p_0)}(i) \\ \vdots \\ y^{(p_{v-1})}(i) \end{bmatrix}$$

according to the correspondence between the set of DMRS ports and $$\begin{bmatrix} y^{(p_0)}(i) \\ \vdots \\ y^{(p_{v-1})}(i) \end{bmatrix}$$

described and used above (for example, see the lists provided in case 1 or the lists provided in case 2 below).

Way 3-2:

The terminal determines the correspondence among the number of codewords, switch state of each codeword, antenna port indication information field and $$\begin{bmatrix} y^{(p_0)}(i) \\ \vdots \\ y^{(p_{v-1})}(i) \end{bmatrix}$$

for the DL-DMRS-config-type and DL-DMRS-max-len in the current DMRS high-level configuration parameters according to the received DCI, and determines $$\begin{bmatrix} y^{(p_0)}(i) \\ \vdots \\ y^{(p_{v-1})}(i) \end{bmatrix}.$$

Here, the antenna port indication information field is, for example, the value column in the lists provided in case 3 below, i.e., the information field used for indicating the DMRS port allocation in DCI, that is, each value in the value column of the lists in case 3 corresponds to a set of DMRS ports assigned to the terminal in a combination condition of the number of codewords and the switching state thereof, the number of occupied CDM groups, and the number of front-load DMRS symbols used. For example, in the case 3, a set of ranked DMRS ports is $P_0$ to $P_{v-1}$.

Three cases, i.e., case 1, case 2 and case 3, will be illustrated below respectively.

Case 1:

According to the high-level configuration parameters DL-DMRS-config-type and DL-DMRS-max-len, the specific values of $\{P_0, \ldots, P_{v-1}\}$ in the DMRS port vector $$\begin{bmatrix} y^{(p_0)}(i) \\ \vdots \\ y^{(p_{v-1})}(i) \end{bmatrix}$$

are determined respectively in the ways shown by the following tables case 1-1-1, case 1-1-2, case 1-2-1 and case 1-2-2.

Here, a set of DMRS ports (a column corresponding to the DMRS port(s) of each table in case 1) is determined by the DCI.

If the high-level configured DMRS configuration parameters are: DL-DMRS-config-type=1 and DL-DMRS-max-len=1, the specific values of $\{P_0, \ldots, P_{v-1}\}$ in the DMRS port vector $$\begin{bmatrix} y^{(p_0)}(i) \\ \vdots \\ y^{(p_{v-1})}(i) \end{bmatrix}$$

are shown in Table case 1-1-1 below.

In one embodiment, when the DMRS configuration type is the first type (e.g., DL-DMRS-config-type=1) and the maximum number of DMRS symbols is 1 (e.g., DL-DMRS-max-len=1), the values of $\{P_0, \ldots, P_{v-1}\}$ are determined by the Table case 1-1-1:

Table case 1-1-1

| DMRS port(s) | $\{P_0, \ldots, P_{v-1}\}$ |
|---|---|
| 0 | $p_0 = 0$ |
| 1 | $p_0 = 1$ |
| 0, 1 | $p_0 = 0$ |
|  | $p_1 = 1$ |
| 2 | $p_0 = 2$ |
| 3 | $p_0 = 3$ |
| 2, 3 | $p_0 = 2$ |
|  | $p_1 = 3$ |

-continued

Table case 1-1-1

| DMRS port(s) | $\{P_0, \ldots, P_{v-1}\}$ |
|---|---|
| 0-2 | $p_0 = 0$ |
|  | $p_1 = 1$ |
|  | $p_2 = 2$ |
|  | or |
|  | $p_0 = 2$ |
|  | $p_1 = 0$ |
|  | $p_2 = 1$ |
| 0-3 | $p_0 = 0$ |
|  | $p_1 = 1$ |
|  | $p_2 = 2$ |
|  | $p_3 = 3$ |
|  | or |
|  | $p_0 = 2$ |
|  | $p_1 = 3$ |
|  | $p_2 = 0$ |
|  | $p_3 = 1$ |
| 0, 2 | $p_0 = 0$ |
|  | $p_1 = 2$ |
|  | or |
|  | $p_0 = 2$ |
|  | $p_1 = 0$ | where DMRS port(s) represents a set of DMRS ports and is notified to a terminal through DCI.

0-2 in the table indicates that DMRS port 0, DMRS port 1 and DMRS port 2 are included. 0-3 in the table indicates that DMRS port 0, DMRS port 1, DMRS port 2 and DMRS port 3 are included. Those in the following tables are explained in the same way, and will not be described in detail later.

If the high-level configured DMRS configuration parameters are: DL-DMRS-config-type=1 and DL-DMRS-max-len=2, the specific values of $\{P_0, \ldots, P_{v-1}\}$ in the DMRS port vector $$\begin{bmatrix} y^{(p_0)}(i) \\ \vdots \\ y^{(p_{v-1})}(i) \end{bmatrix}$$

are shown in Table case 1-1-2.

That is, In one embodiment, when the DMRS configuration type is the first type (e.g., DL-DMRS-config-type=1) and the maximum number of DMRS symbols is 2 (e.g., DL-DMRS-max-len=2), the values of $\{P_0, \ldots, P_{v-1}\}$ are determined by the Table case 1-1-2 below:

Table case 1-1-2

| DMRS port(s) | $\{P_0, \ldots, P_{v-1}\}$ |
|---|---|
| 0 | $p_0 = 0$ |
| 1 | $p_0 = 1$ |
| 0, 1 | $p_0 = 0$ |
|  | $p_1 = 1$ |
| 2 | $p_0 = 2$ |
| 3 | $p_0 = 3$ |
| 2, 3 | $p_0 = 2$ |
|  | $p_1 = 3$ |
| 0-2 | $p_0 = 0$ |
|  | $p_1 = 1$ |
|  | $p_2 = 2$ |
|  | or |
|  | $p_0 = 2$ |
|  | $p_1 = 0$ |
|  | $p_2 = 1$ |

Table case 1-1-2

| DMRS port(s) | $\{P_0, \ldots, P_{v-1}\}$ |
|---|---|
| 0-3 | $p_0 = 0$ |
|  | $p_1 = 1$ |
|  | $p_2 = 2$ |
|  | $p_3 = 3$ |
|  | or |
|  | $p_0 = 2$ |
|  | $p_1 = 3$ |
|  | $p_2 = 0$ |
|  | $p_3 = 1$ |
| 0, 2 | $p_0 = 0$ |
|  | $p_1 = 2$ |
|  | or |
|  | $p_0 = 2$ |
|  | $p_1 = 0$ |
| 4 | $p_0 = 4$ |
| 5 | $p_0 = 5$ |
| 6 | $p_0 = 6$ |
| 7 | $p_0 = 7$ |
| 4, 5 | $p_0 = 4$ |
|  | $p_1 = 5$ |
| 6, 7 | $p_0 = 6$ |
|  | $p_1 = 7$ |
| 0, 4 | $p_0 = 0$ |
|  | $p_1 = 4$ |
| 2, 6 | $p_0 = 2$ |
|  | $p_1 = 6$ |
| 0, 1, 4 | $p_0 = 0$ |
|  | $p_1 = 1$ |
|  | $p_2 = 4$ |
| 2, 3, 6 | $p_0 = 2$ |
|  | $p_1 = 3$ |
|  | $p_2 = 6$ |
| 0, 1, 4, 5 | $p_0 = 0$ |
|  | $p_1 = 1$ |
|  | $p_2 = 4$ |
|  | $p_3 = 5$ |
| 2, 3, 6, 7 | $p_0 = 2$ |
|  | $p_1 = 3$ |
|  | $p_2 = 6$ |
|  | $p_3 = 7$ |
| 0, 2, 4, 6 | $p_0 = 0$ |
|  | $p_1 = 2$ |
|  | $p_2 = 4$ |
|  | $p_3 = 6$ |
|  | or |
|  | $p_0 = 2$ |
|  | $p_1 = 6$ |
|  | $p_2 = 0$ |
|  | $p_3 = 4$ |
|  | or |
|  | $p_0 = 0$ |
|  | $p_1 = 4$ |
|  | $p_2 = 2$ |
|  | $p_3 = 6$ |
| 0-4 | $p_0 = 2$ |
|  | $p_1 = 3$ |
|  | $p_2 = 0$ |
|  | $p_3 = 1$ |
|  | $p_4 = 4$ |
|  | or |
|  | $p_0 = 0$ |
|  | $p_1 = 1$ |
|  | $p_2 = 2$ |
|  | $p_3 = 3$ |
|  | $p_4 = 4$ |
| 0, 1, 2, 3, 4, 6 | $p_0 = 2$ |
|  | $p_1 = 3$ |
|  | $p_2 = 6$ |
|  | $P_3 = 0$ |
|  | $p_4 = 1$ |
|  | $p_5 = 4$ |
|  | or |
|  | $p_0 = 0$ |
|  | $p_1 = 1$ |
|  | $p_2 = 4$ |
|  | $p_3 = 2$ |
|  | $p_4 = 3$ |
|  | $p_5 = 6$ |
|  | or |
|  | $p_0 = 0$ |
|  | $p_1 = 1$ |
|  | $p_2 = 2$ |
|  | $p_3 = 3$ |
|  | $p_4 = 4$ |
|  | $p_5 = 6$ |
| 0, 1, 2, 3, 4, 5, 6 | $p_0 = 2$ |
|  | $p_1 = 3$ |
|  | $p_2 = 6$ |
|  | $p_3 = 0$ |
|  | $p_4 = 1$ |
|  | $p_5 = 4$ |
|  | $p_6 = 5$ |
|  | or |
|  | $p_0 = 0$ |
|  | $p_1 = 1$ |
|  | $p_2 = 2$ |
|  | $p_3 = 3$ |
|  | $p_4 = 4$ |
|  | $p_5 = 5$ |
|  | $p_6 = 6$ |
| 0, 1, 2, 3, 4, 5, 6, 7 | $p_0 = 2$ |
|  | $p_1 = 3$ |
|  | $p_2 = 6$ |
|  | $p_3 = 7$ |
|  | $p_4 = 0$ |
|  | $p_5 = 1$ |
|  | $p_6 = 4$ |
|  | $p_7 = 5$ |
|  | or |
|  | $p_0 = 0$ |
|  | $p_1 = 1$ |
|  | $p_2 = 4$ |
|  | $p_3 = 5$ |
|  | $p_4 = 2$ |
|  | $p_5 = 3$ |
|  | $p_6 = 6$ |
|  | $p_7 = 7$ |
|  | or |
|  | $p_0 = 0$ |
|  | $p_1 = 1$ |
|  | $p_2 = 2$ |
|  | $p_3 = 3$ |
|  | $p_4 = 4$ |
|  | $p_5 = 5$ |
|  | $p_6 = 6$ |
|  | $p_7 = 7$ | where DMRS port(s) represents a set of DMRS ports and is notified to a terminal through DCI.

If the high-level configured DMRS configuration parameters are: DL-DMRS-config-type=2 and DL-DMRS-max-len=1, the specific values of $\{P_0, \ldots, P_{v-1}\}$ in the DMRS port vector $$\begin{bmatrix} y^{(p_0)}(i) \\ \vdots \\ y^{(p_{v-1})}(i) \end{bmatrix}$$

are shown in Table case 1-2-1.

That is, In one embodiment, when the DMRS configuration type is the second type (e.g., DL-DMRS-config-type=2) and the maximum number of DMRS symbols is 1 (e.g., DL-DMRS-max-len=1), the values of $\{P_0, \ldots, P_{v-1}\}$ are determined by the Table case 1-2-1 below:

| Table case 1-2-1 | |
| --- | --- |
| DMRS port(s) | $\{P_0, \ldots, P_{v-1}\}$ |
| 0 | $p_0 = 0$ |
| 1 | $p_0 = 1$ |
| 0, 1 | $p_0 = 0$ |
|  | $p_1 = 1$ |
| 2 | $p_0 = 2$ |
| 3 | $p_0 = 3$ |
| 2, 3 | $p_0 = 2$ |
|  | $p_1 = 3$ |
| 0-2 | $p_0 = 0$ |
|  | $p_1 = 1$ |
|  | $p_2 = 2$ |
|  | or |
|  | $p_0 = 2$ |
|  | $p_1 = 0$ |
|  | $p_2 = 1$ |
| 0-3 | $p_0 = 0$ |
|  | $p_1 = 1$ |
|  | $p_2 = 2$ |
|  | $p_3 = 3$ |
|  | or |
|  | $p_0 = 2$ |
|  | $p_1 = 3$ |
|  | $p_2 = 0$ |
|  | $p_3 = 1$ |
| 4 | $p_0 = 4$ |
| 5 | $p_0 = 5$ |
| 4, 5 | $p_0 = 4$ |
|  | $p_1 = 5$ |
| 3-5 | $p_0 = 3$ |
|  | $p_1 = 4$ |
|  | $p_2 = 5$ |
|  | or |
|  | $p_0 = 4$ |
|  | $p_1 = 5$ |
|  | $p_2 = 3$ |
| 0-3 | $p_0 = 0$ |
|  | $p_1 = 1$ |
|  | $p_2 = 2$ |
|  | $p_3 = 3$ |
|  | or |
|  | $p_0 = 2$ |
|  | $p_1 = 3$ |
|  | $p_2 = 0$ |
|  | $p_3 = 1$ |
| 0, 2 | $p_0 = 0$ |
|  | $p_1 = 2$ |
|  | or |
|  | $p_0 = 2$ |
|  | $p_1 = 0$ |
| 0-4 | $p_0 = 0$ |
|  | $p_1 = 1$ |
|  | $p_2 = 2$ |
|  | $p_3 = 3$ |
|  | $p_4 = 4$ |
| 0-5 | $p_0 = 0$ |
|  | $p_1 = 1$ |
|  | $p_2 = 2$ |
|  | $p_3 = 3$ |
|  | $p_4 = 4$ |
|  | $p_4 = 5$ |
|  | or |
|  | $p_0 = 0$ |
|  | $p_1 = 1$ |
|  | $p_2 = 4$ |
|  | $p_3 = 5$ |
|  | $p_4 = 2$ |
|  | $p_4 = 3$ |
|  | or |
|  | $p_0 = 2$ |
|  | $p_1 = 3$ |
|  | $p_2 = 0$ |
|  | $p_3 = 1$ |
|  | $p_4 = 4$ |
|  | $p_4 = 5$ |
|  | or |
|  | $p_0 = 2$ |
|  | $p_1 = 3$ |
|  | $p_2 = 4$ |
|  | $p_3 = 5$ |
|  | $p_4 = 0$ |
|  | $p_4 = 1$ |
|  | or |
|  | $p_0 = 4$ |
|  | $p_1 = 5$ |
|  | $p_2 = 0$ |
|  | $p_3 = 1$ |
|  | $p_4 = 2$ |
|  | $p_4 = 3$ |
|  | or |
|  | $p_0 = 4$ |
|  | $p_1 = 5$ |
|  | $p_2 = 2$ |
|  | $p_3 = 3$ |
|  | $p_4 = 0$ |
|  | $p_4 = 1$ | where DMRS port(s) represents a set of DMRS ports and is notified to a terminal through DCI.

If the high-level configured DMRS configuration parameters are: DL-DMRS-config-type=2 and DL-DMRS-max-len=2, the specific values of $\{P_0, \ldots, P_{v-1}\}$ in the DMRS port vector $$\begin{bmatrix} y^{(p_0)}(i) \\ \vdots \\ y^{(p_{v-1})}(i) \end{bmatrix}$$

are shown in Table case 1-2-2.

That is, In one embodiment, when the DMRS configuration type is the second type (e.g., DL-DMRS-config-type=2) and the maximum number of DMRS symbols is 2 (e.g., DL-DMRS-max-len=2), the values of $\{P_0, \ldots, P_{v-1}\}$ are determined by the Table case 1-2-2 below:

| Table case 1-2-2 | |
| --- | --- |
| DMRS port(s) | $\{P_0, \ldots, P_{v-1}\}$ |
| 0 | $p_0 = 0$ |
| 1 | $p_0 = 1$ |
| 0, 1 | $p_0 = 0$ |
|  | $p_1 = 1$ |
| 2 | $p_0 = 2$ |
| 3 | $p_0 = 3$ |
| 0, 1 | $p_0 = 0$ |
|  | $p_1 = 1$ |
| 2, 3 | $p_0 = 2$ |
|  | $p_1 = 3$ |
| 0-2 | $p_0 = 0$ |
|  | $p_1 = 1$ |
|  | $p_2 = 2$ |
|  | or |
|  | $p_0 = 2$ |
|  | $p_1 = 0$ |
|  | $p_2 = 1$ |
| 0-3 | $p_0 = 0$ |
|  | $p_1 = 1$ |
|  | $p_2 = 2$ |
|  | $p_3 = 3$ |
|  | or |
|  | $p_0 = 2$ |
|  | $p_1 = 3$ |

-continued

| Table case 1-2-2 | |
|---|---|
| DMRS port(s) | $\{P_0, \ldots, P_{v-1}\}$ |
| | $p_2 = 0$ |
| | $p_3 = 1$ |
| 4 | $p_0 = 4$ |
| 5 | $p_0 = 5$ |
| 4, 5 | $p_0 = 4$ |
| | $p_1 = 5$ |
| 3-5 | $p_0 = 3$ |
| | $p_1 = 4$ |
| | $p_2 = 5$ |
| | or |
| | $p_0 = 5$ |
| | $p_1 = 3$ |
| | $p_2 = 4$ |
| 0-3 | $p_0 = 0$ |
| | $p_1 = 1$ |
| | $p_2 = 2$ |
| | $p_3 = 3$ |
| | or |
| | $p_0 = 2$ |
| | $p_1 = 3$ |
| | $p_2 = 0$ |
| | $p_3 = 1$ |
| 0, 2 | $p_0 = 0$ |
| | $p_1 = 2$ |
| | or |
| | $p_0 = 2$ |
| | $p_1 = 0$ |
| 6 | $p_0 = 6$ |
| 7 | $p_0 = 7$ |
| 8 | $p_0 = 8$ |
| 9 | $p_0 = 9$ |
| 10 | $p_0 = 10$ |
| 11 | $p_0 = 11$ |
| 6, 7 | $p_0 = 6$ |
| | $p_1 = 7$ |
| 8, 9 | $p_0 = 8$ |
| | $p_1 = 9$ |
| 10, 11 | $p_0 = 10$ |
| | $p_1 = 11$ |
| 0, 1, 6 | $p_0 = 0$ |
| | $p_1 = 1$ |
| | $p_2 = 6$ |
| 2, 3, 8 | $p_0 = 2$ |
| | $p_1 = 3$ |
| | $p_2 = 8$ |
| 4, 5, 10 | $p_0 = 4$ |
| | $p_1 = 5$ |
| | $p_2 = 10$ |
| 0, 1, 6, 7 | $p_0 = 0$ |
| | $p_1 = 1$ |
| | $p_2 = 6$ |
| | $p_3 = 7$ |
| 2, 3, 8, 9 | $p_0 = 2$ |
| | $p_1 = 3$ |
| | $p_2 = 8$ |
| | $p_3 = 9$ |
| 4, 5, 10, 11 | $p_0 = 4$ |
| | $p_1 = 5$ |
| | $p_2 = 10$ |
| | $p_3 = 11$ |
| 0-4 | $p_0 = 0$ |
| | $p_1 = 1$ |
| | $p_2 = 2$ |
| | $p_3 = 3$ |
| | $p_4 = 4$ |
| 0-5 | $p_0 = 0$ |
| | $p_1 = 1$ |
| | $p_2 = 2$ |
| | $p_3 = 3$ |
| | $p_4 = 4$ |
| | $p_4 = 5$ |
| | or |
| | $p_0 = 0$ |
| | $p_1 = 1$ |
| | $p_2 = 4$ |
| | $p_3 = 5$ |
| | $p_4 = 2$ |
| | $p_4 = 3$ |
| | or |
| | $p_0 = 2$ |
| | $p_1 = 3$ |
| | $p_2 = 0$ |
| | $p_3 = 1$ |
| | $p_4 = 4$ |
| | $p_4 = 5$ |
| | or |
| | $p_0 = 2$ |
| | $p_1 = 3$ |
| | $p_2 = 4$ |
| | $p_3 = 5$ |
| | $p_4 = 0$ |
| | $p_4 = 1$ |
| | or |
| | $p_0 = 4$ |
| | $p_1 = 5$ |
| | $p_2 = 0$ |
| | $p_3 = 1$ |
| | $p_4 = 2$ |
| | $p_4 = 3$ |
| | or |
| | $p_0 = 4$ |
| | $p_1 = 5$ |
| | $p_2 = 2$ |
| | $p_3 = 3$ |
| | $p_4 = 0$ |
| | $p_4 = 1$ |
| 0, 1, 2, 3, 6 | $p_0 = 2$ |
| | $p_1 = 3$ |
| | $p_2 = 0$ |
| | $p_3 = 1$ |
| | $p_4 = 6$ |
| | or |
| | $p_0 = 0$ |
| | $p_1 = 1$ |
| | $p_2 = 2$ |
| | $p_3 = 3$ |
| | $p_4 = 6$ |
| 0, 1, 2, 3, 6, 8 | $p_0 = 2$ |
| | $p_1 = 3$ |
| | $p_2 = 8$ |
| | $p_3 = 0$ |
| | $p_4 = 1$ |
| | $p_5 = 6$ |
| | or |
| | $p_0 = 0$ |
| | $p_1 = 1$ |
| | $p_2 = 6$ |
| | $p_3 = 2$ |
| | $p_4 = 3$ |
| | $p_5 = 8$ |
| | or |
| | $p_0 = 0$ |
| | $p_1 = 1$ |
| | $p_2 = 2$ |
| | $p_3 = 3$ |
| | $p_4 = 6$ |
| | $p_5 = 8$ |
| 0, 1, 2, 3, 6, 7, 8 | $p_0 = 2$ |
| | $p_1 = 3$ |
| | $p_2 = 8$ |
| | $p_3 = 0$ |
| | $p_4 = 1$ |
| | $p_5 = 6$ |
| | $p_6 = 7$ |
| | or |
| | $p_0 = 0$ |
| | $p_1 = 1$ |
| | $p_2 = 2$ |
| | $p_3 = 3$ |
| | $p_4 = 6$ |

-continued

Table case 1-2-2

| DMRS port(s) | $\{P_0, \ldots, P_{v-1}\}$ |
|---|---|
| 0, 1, 2, 3, 6, 7, 8, 9 | $p_5 = 7$ |
| | $p_6 = 8$ |
| | $p_0 = 2$ |
| | $p_1 = 3$ |
| | $p_2 = 8$ |
| | $p_3 = 9$ |
| | $p_4 = 0$ |
| | $p_5 = 1$ |
| | $p_6 = 6$ |
| | $p_7 = 7$ |
| | or |
| | $p_0 = 0$ |
| | $p_1 = 1$ |
| | $p_2 = 6$ |
| | $p_3 = 7$ |
| | $p_4 = 2$ |
| | $p_5 = 3$ |
| | $p_6 = 8$ |
| | $p_7 = 9$ |
| | or |
| | $p_0 = 0$ |
| | $p_1 = 1$ |
| | $p_2 = 2$ |
| | $p_3 = 3$ |
| | $p_4 = 6$ |
| | $p_5 = 7$ |
| | $p_6 = 8$ |
| | $p_7 = 9$ | where DMRS port(s) represents a set of DMRS ports and is notified to a terminal through DCI.

Case 2:

According to the high-level configuration parameters DL-DMRS-config-type and DL-DMRS-max-len, the specific values of $\{P_0, \ldots, P_{v-1}\}$ in the DMRS port vector $$\begin{bmatrix} y^{(P_0)}(i) \\ \vdots \\ y^{(P_{v-1})}(i) \end{bmatrix}$$

are determined respectively in the ways shown by the tables case 2-1-1, case 2-1-2, case 2-2-1 and case 2-2-2.

Here, the value of the antenna port indication information field and a set of DMRS ports (a column corresponding to the DMRS port (s) of each table in case 2) are determined by the DCI.

If the high-level configured DMRS configuration parameters are: DL-DMRS-config-type=1 and DL-DMRS-max-len=1, the specific values of $\{P_0, \ldots, P_{v-1}\}$ in the DMRS port vector $$\begin{bmatrix} y^{(P_0)}(i) \\ \vdots \\ y^{(P_{v-1})}(i) \end{bmatrix}$$

are shown in Table case 2-1-1.

That is, In one embodiment, when the DMRS configuration type is the first type and the maximum number of DMRS symbols is 1, the values of $\{P_0, \ldots, P_{v-1}\}$ are determined by the Table case 2-1-1:

Table case 2-1-1
One Codeword: Codeword 0 enabled, Codeword 1 disabled

| Value | Number of DMRS CDM group(s) without data | DMRS port(s) | $\{P_0, \ldots, P_{v-1}\}$ |
|---|---|---|---|
| 0 | 1 | 0 | $p_0 = 0$ |
| 1 | 1 | 1 | $p_0 = 1$ |
| 2 | 1 | 0, 1 | $p_0 = 0$ |
| | | | $p_1 = 1$ |
| 3 | 2 | 0 | $p_0 = 0$ |
| 4 | 2 | 1 | $p_0 = 1$ |
| 5 | 2 | 2 | $p_0 = 2$ |
| 6 | 2 | 3 | $p_0 = 3$ |
| 7 | 2 | 0, 1 | $p_0 = 0$ |
| | | | $p_1 = 1$ |
| 8 | 2 | 2, 3 | $p_0 = 2$ |
| | | | $p_1 = 3$ |
| 9 | 2 | 0-2 | $p_0 = 0$ |
| | | | $p_1 = 1$ |
| | | | $p_2 = 2$ |
| | | | or |
| | | | $p_0 = 2$ |
| | | | $p_1 = 0$ |
| | | | $p_2 = 1$ |
| 10 | 2 | 0-3 | $p_0 = 0$ |
| | | | $p_1 = 1$ |
| | | | $p_2 = 2$ |
| | | | $p_3 = 3$ |
| | | | or |
| | | | $p_0 = 2$ |
| | | | $p_1 = 3$ |
| | | | $p_2 = 0$ |
| | | | $p_3 = 1$ |
| 11 | 2 | 0, 2 | $p_0 = 0$ |
| | | | $p_1 = 2$ |
| | | | or |
| | | | $p_0 = 2$ |
| | | | $p_1 = 0$ |
| 12-15 | Reserved | Reserved | | here, "Value" represents the value of the DMRS port indication information field, "Number of DMRS CDM group(s) without data" represents the quantity of DMRS CDM groups without data, and DMRS port(s) represents a set of DMRS ports and is notified to a terminal through DCI.

If the high-level configured DMRS configuration parameters are: DL-DMRS-config-type=1 and DL-DMRS-max-len=2, the specific values of $\{P_0, \ldots, P_{v-1}\}$ in the DMRS port vector $$\begin{bmatrix} y^{(P_0)}(i) \\ \vdots \\ y^{(P_{v-1})}(i) \end{bmatrix}$$

are shown in Table case 2-1-2.

That is, In one embodiment, when the DMRS configuration type is the first type and the maximum number of DMRS symbols is 2, the values of $\{P_0, \ldots, P_{v-1}\}$ are determined by the Table case 2-1-2:

| Table case 2-1-2 | | | | | | | | | |
|---|---|---|---|---|---|---|---|---|---|
| One Codeword: Codeword 0 enabled, Codeword 1 disabled | | | | | Two Codewords: Codeword 0 enabled, Codeword 1 enabled | | | | |
| Value | Number of DMRS CDM group(s) without data | DMRS port(s) | $\{P_0, \ldots, P_{v-1}\}$ | Number of front-load symbols | Value | Number of DMRS CDM group(s) without data | DMRS port(s) | $\{P_0, \ldots, P_{v-1}\}$ | Number of front-load symbols |
| 0 | 1 | 0 | $p_0 = 0$ | 1 | 0 | 2 | 0-4 | $p_0 = 2$<br>$p_1 = 3$<br>$p_2 = 0$<br>$p_3 = 1$<br>$p_4 = 4$<br>or<br>$p_0 = 0$<br>$p_1 = 1$<br>$p_2 = 2$<br>$p_3 = 3$<br>$p_4 = 4$ | 2 |
| 1 | 1 | 1 | $p_0 = 1$ | 1 | 1 | 2 | 0, 1, 2, 3, 4, 6 | $p_0 = 2$<br>$p_1 = 3$<br>$p_2 = 6$<br>$p_3 = 0$<br>$p_4 = 1$<br>$p_5 = 4$<br>or<br>$p_0 = 0$<br>$p_1 = 1$<br>$p_2 = 4$<br>$p_3 = 2$<br>$p_4 = 3$<br>$p_5 = 6$<br>or<br>$p_0 = 0$<br>$p_1 = 1$<br>$p_2 = 2$<br>$p_3 = 3$<br>$p_4 = 4$<br>$p_5 = 6$ | 2 |
| 2 | 1 | 0, 1 | $p_0 = 0$<br>$p_1 = 1$ | 1 | 2 | 2 | 0, 1, 2, 3, 4, 5, 6 | $p_0 = 2$<br>$p_1 = 3$<br>$p_2 = 6$<br>$p_3 = 0$<br>$p_4 = 1$<br>$p_5 = 4$<br>$p_6 = 5$<br>or<br>$p_0 = 0$<br>$p_1 = 1$<br>$p_2 = 2$<br>$p_3 = 3$<br>$p_4 = 4$<br>$p_5 = 5$<br>$p_6 = 6$ | 2 |
| 3 | 2 | 0 | $p_0 = 0$ | 1 | 3 | 2 | 0, 1, 2, 3, 4, 5, 6, 7 | $p_0 = 2$<br>$p_1 = 3$<br>$p_2 = 6$<br>$p_3 = 7$<br>$p_4 = 0$<br>$p_5 = 1$<br>$p_6 = 4$<br>$p_7 = 5$<br>or<br>$p_0 = 0$<br>$p_1 = 1$<br>$p_2 = 4$<br>$p_3 = 5$<br>$p_4 = 2$<br>$p_5 = 3$<br>$p_6 = 6$<br>$p_7 = 7$<br>or<br>$p_0 = 0$<br>$p_1 = 1$<br>$p_2 = 2$ | 2 |

-continued

Table case 2-1-2

| | One Codeword: Codeword 0 enabled, Codeword 1 disabled | | | | Two Codewords: Codeword 0 enabled, Codeword 1 enabled | | | |
|---|---|---|---|---|---|---|---|---|
| Value | Number of DMRS CDM group(s) without data | DMRS port(s) | $\{P_0, \ldots, P_{v-1}\}$ | Number of front-load symbols | Value | Number of DMRS CDM group(s) without data | DMRS port(s) | $\{P_0, \ldots, P_{v-1}\}$ | Number of front-load symbols |
| | | | | | | | | $p_3 = 3$ $p_4 = 4$ $p_5 = 5$ $p_6 = 6$ $p_7 = 7$ | |
| 4 | 2 | 1 | $p_0 = 1$ | 1 | 4-31 | reserved | reserved | reserved |
| 5 | 2 | 2 | $p_0 = 2$ | 1 | | | | |
| 6 | 2 | 3 | $p_0 = 3$ | 1 | | | | |
| 7 | 2 | 0, 1 | $p_0 = 0$ $p_1 = 1$ | 1 | | | | |
| 8 | 2 | 2, 3 | $p_0 = 2$ $p_1 = 3$ | 1 | | | | |
| 9 | 2 | 0-2 | $p_0 = 0$ $p_1 = 1$ $p_2 = 2$ or $p_0 = 2$ $p_1 = 0$ $p_2 = 1$ | 1 | | | | |
| 10 | 2 | 0-3 | $p_0 = 0$ $p_1 = 1$ $p_2 = 2$ $p_3 = 3$ or $p_0 = 2$ $p_1 = 3$ $p_2 = 0$ $p_3 = 1$ | 1 | | | | |
| 11 | 2 | 0, 2 | $p_0 = 0$ $p_1 = 2$ or $p_0 = 2$ $p_1 = 0$ | 1 | | | | |
| 12 | 2 | 0 | $p_0 = 0$ | 2 | | | | |
| 13 | 2 | 1 | $p_0 = 1$ | 2 | | | | |
| 14 | 2 | 2 | $p_0 = 2$ | 2 | | | | |
| 15 | 2 | 3 | $p_0 = 3$ | 2 | | | | |
| 16 | 2 | 4 | $p_0 = 4$ | 2 | | | | |
| 17 | 2 | 5 | $p_0 = 5$ | 2 | | | | |
| 18 | 2 | 6 | $p_0 = 6$ | 2 | | | | |
| 19 | 2 | 7 | $p_0 = 7$ | 2 | | | | |
| 20 | 2 | 0, 1 | $p_0 = 0$ $p_1 = 1$ | 2 | | | | |
| 21 | 2 | 2, 3 | $p_0 = 2$ $p_1 = 3$ | 2 | | | | |
| 22 | 2 | 4, 5 | $p_0 = 4$ $p_1 = 5$ | 2 | | | | |
| 23 | 2 | 6, 7 | $p_0 = 6$ $p_1 = 7$ | 2 | | | | |
| 24 | 2 | 0, 4 | $p_0 = 0$ $p_1 = 4$ | 2 | | | | |
| 25 | 2 | 2, 6 | $p_0 = 2$ $p_1 = 6$ | 2 | | | | |
| 26 | 2 | 0, 1, 4 | $p_0 = 0$ $p_1 = 1$ $p_2 = 4$ | 2 | | | | |
| 27 | 2 | 2, 3, 6 | $p_0 = 2$ $p_1 = 3$ $p_2 = 6$ | 2 | | | | |
| 28 | 2 | 0, 1, 4, 5 | $p_0 = 0$ $p_1 = 1$ $p_2 = 4$ $p_3 = 5$ | 2 | | | | |
| 29 | 2 | 2, 3, 6, 7 | $p_0 = 2$ $p_1 = 3$ | 2 | | | | |

-continued

Table case 2-1-2

| | One Codeword: Codeword 0 enabled, Codeword 1 disabled ||| | Two Codewords: Codeword 0 enabled, Codeword 1 enabled ||||
| --- | --- | --- | --- | --- | --- | --- | --- | --- |
| Value | Number of DMRS CDM group(s) without data | DMRS port(s) | $\{P_0, \ldots, P_{v-1}\}$ | Number of front-load symbols | Value | Number of DMRS CDM group(s) without data | DMRS port(s) | $\{P_0, \ldots, P_{v-1}\}$ | Number of front-load symbols |
| 30 | 2 | 0, 2, 4, 6 | $p_2 = 6$ $p_3 = 7$ $p_0 = 0$ $p_1 = 2$ $p_2 = 4$ $p_3 = 6$ or $p_0 = 2$ $p_1 = 6$ $p_2 = 0$ $p_3 = 4$ or $p_0 = 0$ $p_1 = 4$ $p_2 = 2$ $p_3 = 6$ | 2 | | | | |
| 31 | Reserved | Reserved | | | Reserved | | | | here "Value" represents the value of the DMRS port indication information field, and DMRS port(s) represents a set of DMRS ports and is notified to a terminal through DCI.

If the high-level configured DMRS configuration parameters are: DL-DMRS-config-type=2 and DL-DMRS-maxlen=1, the specific values of $\{P_0, \ldots, P_{v-1}\}$ in the DMRS port vector $$\begin{bmatrix} y^{(P_0)}(i) \\ \vdots \\ y^{(P_{v-1})}(i) \end{bmatrix}$$

are shown in Table case 2-2-1.

That is, In one embodiment, when the DMRS configuration type is the second type and the maximum number of DMRS symbols is 1, the values of $\{P_0, \ldots, P_{v-1}\}$ are determined by the Table case 2-2-1:

Table case 2-2-1

| | One codeword: Codeword 0 enabled, Codeword 1 disabled ||| One codeword: Codeword 0 enabled, Codeword 1 enabled |||
| --- | --- | --- | --- | --- | --- | --- |
| Value | Number of DMRS CDM group(s) without data | DMRS port(s) | $\{P_0, \ldots, P_{v-1}\}$ | Value | Number of DMRS CDM group(s) without data | DMRS port(s) | $\{P_0, \ldots, P_{v-1}\}$ |
| 0 | 1 | 0 | $p_0 = 0$ | 0 | 3 | 0-4 | $p_0 = 0$ $p_1 = 1$ $p_2 = 2$ $p_3 = 3$ $p_4 = 4$ |
| 1 | 1 | 1 | $p_0 = 1$ | 1 | 3 | 0-5 | $p_0 = 0$ $p_1 = 1$ $p_2 = 2$ |

-continued

| Table case 2-2-1 | | | | | | | |
|---|---|---|---|---|---|---|---|
| One codeword: Codeword 0 enabled, Codeword 1 disabled | | | | Two codewords: Codeword 0 enabled, Codeword 1 enabled | | | |
| Value | Number of DMRS CDM group(s) without data | DMRS port(s) | $\{P_0, \ldots, P_{v-1}\}$ | Value | Number of DMRS CDM group(s) without data | DMRS port(s) | $\{P_0, \ldots, P_{v-1}\}$ |
| | | | | | | | $p_3 = 3$ $p_4 = 4$ $p_4 = 5$ or $p_0 = 0$ $p_1 = 1$ $p_2 = 4$ $p_3 = 5$ $p_4 = 2$ $p_4 = 3$ or $p_0 = 2$ $p_1 = 3$ $p_2 = 0$ $p_3 = 1$ $p_4 = 4$ $p_4 = 5$ or $p_0 = 2$ $p_1 = 3$ $p_2 = 4$ $p_3 = 5$ $p_4 = 0$ $p_4 = 1$ or $p_0 = 4$ $p_1 = 5$ $p_2 = 0$ $p_3 = 1$ $p_4 = 2$ $p_4 = 3$ or $p_0 = 4$ $p_1 = 5$ $p_2 = 2$ $p_3 = 3$ $p_4 = 0$ $p_4 = 1$ |
| 2 | 1 | 0, 1 | $p_0 = 0$ $p_1 = 1$ | 2-31 | reserved | reserved | |
| 3 | 2 | 0 | $p_0 = 0$ | | | | |
| 4 | 2 | 1 | $p_0 = 1$ | | | | |
| 5 | 2 | 2 | $p_0 = 2$ | | | | |
| 6 | 2 | 3 | $p_0 = 3$ | | | | |
| 7 | 2 | 0, 1 | $p_0 = 0$ $p_1 = 1$ | | | | |
| 8 | 2 | 2, 3 | $p_0 = 2$ $p_1 = 3$ | | | | |
| 9 | 2 | 0-2 | $p_0 = 0$ $p_1 = 1$ $p_2 = 2$ or $p_0 = 2$ $p_1 = 0$ $p_2 = 1$ | | | | |
| 10 | 2 | 0-3 | $p_0 = 0$ $p_1 = 1$ $p_2 = 2$ $p_3 = 3$ or $p_0 = 2$ $p_1 = 3$ $p_2 = 0$ $p_3 = 1$ | | | | |
| 11 | 3 | 0 | $p_0 = 0$ | | | | |
| 12 | 3 | 1 | $p_0 = 1$ | | | | |
| 13 | 3 | 2 | $p_0 = 2$ | | | | |

-continued

| Table case 2-2-1 | | | | | | | |
|---|---|---|---|---|---|---|---|
| One codeword: Codeword 0 enabled, Codeword 1 disabled | | | | Two codewords: Codeword 0 enabled, Codeword 1 enabled | | | |
| Value | Number of DMRS CDM group(s) without data | DMRS port(s) | $\{P_0, \ldots, P_{v-1}\}$ | Value | Number of DMRS CDM group(s) without data | DMRS port(s) | $\{P_0, \ldots, P_{v-1}\}$ |
| 14 | 3 | 3 | $p_0 = 3$ | | | | |
| 15 | 3 | 4 | $p_0 = 4$ | | | | |
| 16 | 3 | 5 | $p_0 = 5$ | | | | |
| 17 | 3 | 0, 1 | $p_0 = 0$ $p_1 = 1$ | | | | |
| 18 | 3 | 2, 3 | $p_0 = 2$ $p_1 = 3$ | | | | |
| 19 | 3 | 4, 5 | $p_0 = 4$ $p_1 = 5$ | | | | |
| 20 | 3 | 0-2 | $p_0 = 0$ $p_1 = 1$ $p_2 = 2$ or $p_0 = 2$ $p_1 = 0$ $p_2 = 1$ | | | | |
| 21 | 3 | 3-5 | $p_0 = 3$ $p_1 = 4$ $p_2 = 5$ or $p_0 = 4$ $p_1 = 5$ $p_2 = 3$ | | | | |
| 22 | 3 | 0-3 | $p_0 = 0$ $p_1 = 1$ $p_2 = 2$ $p_3 = 3$ or $p_0 = 2$ $p_1 = 3$ $p_2 = 0$ $p_3 = 1$ | | | | |
| 23 | 2 | 0, 2 | $p_0 = 0$ $p_1 = 2$ or $p_0 = 2$ $p_1 = 0$ | | | | |
| 24-31 | Reserved | Reserved | | | | | | here "Value" represents the value of the DMRS port indication information field, and DMRS port(s) represents a set of DMRS ports and is notified to a terminal through DCI.

If the high-level configured DMRS configuration parameters are: DL-DMRS-config-type=2 and DL-DMRS-maxlen=2, the specific values of $\{P_0, \ldots, P_{v-1}\}$ in the DMRS port vector $$\begin{bmatrix} y^{(p_0)}(i) \\ \vdots \\ y^{(p_{v-1})}(i) \end{bmatrix}$$

are shown in Table case 2-2-2.

That is, In one embodiment, when the DMRS configuration type is the second type and the maximum number of DMRS symbols is 2, the values of $\{P_0, \ldots, P_{v-1}\}$ are determined by the Table case 2-2-2:

Table case 2-2-2

| | One codeword: Codeword 0 enabled, Codeword 1 disabled | | | | | Two Codewords: Codeword 0 enabled, Codeword 1 enabled | | | |
|---|---|---|---|---|---|---|---|---|---|
| Value | Number of DMRS CDM group(s) without data | DMRS port(s) | $\{P_0, \ldots, P_{\nu-1}\}$ | Number of front-load symbols | Value | Number of DMRS CDM group(s) without data | DMRS port(s) | $\{P_0, \ldots, P_{\nu-1}\}$ | Number of front-load symbols |
| 0 | 1 | 0 | $p_0 = 0$ | 1 | 0 | 3 | 0-4 | $p_0 = 0$ $p_1 = 1$ $p_2 = 2$ $p_3 = 3$ $p_4 = 4$ | 1 |
| 1 | 1 | 1 | $p_0 = 1$ | 1 | 1 | 3 | 0-5 | $p_0 = 0$ $p_1 = 1$ $p_2 = 2$ $p_3 = 3$ $p_4 = 4$ $p_4 = 5$ or $p_0 = 0$ $p_1 = 1$ $p_2 = 4$ $p_3 = 5$ $p_4 = 2$ $p_4 = 3$ or $p_0 = 2$ $p_1 = 3$ $p_2 = 0$ $p_3 = 1$ $p_4 = 4$ $p_4 = 5$ or $p_0 = 2$ $p_1 = 3$ $p_2 = 4$ $p_3 = 5$ $p_4 = 0$ $p_4 = 1$ or $p_0 = 4$ $p_1 = 5$ $p_2 = 0$ $p_3 = 1$ $p_4 = 2$ $p_4 = 3$ or $p_0 = 4$ $p_1 = 5$ $p_2 = 2$ $p_3 = 3$ $p_4 = 0$ $p_4 = 1$ | 1 |
| 2 | 1 | 0, 1 | $p_0 = 0$ $p_1 = 1$ | 1 | 2 | 2 | 0, 1, 2, 3, 6 | $p_0 = 2$ $p_1 = 3$ $p_2 = 0$ $p_3 = 1$ $p_4 = 6$ or $p_0 = 0$ $p_1 = 1$ $p_2 = 2$ $p_3 = 3$ $p_4 = 6$ | 2 |
| 3 | 2 | 0 | $p_0 = 0$ | 1 | 3 | 2 | 0, 1, 2, 3, 6, 8 | $p_0 = 2$ $p_1 = 3$ $p_2 = 8$ $p_3 = 0$ $p_4 = 1$ $p_5 = 6$ or $p_0 = 0$ $p_1 = 1$ $p_2 = 6$ | 2 |

-continued

Table case 2-2-2

| | One codeword: Codeword 0 enabled, Codeword 1 disabled | | | | Two Codewords: Codeword 0 enabled, Codeword 1 enabled | | | | |
|---|---|---|---|---|---|---|---|---|---|
| Value | Number of DMRS CDM group(s) without data | DMRS port(s) | $\{P_0, \ldots, P_{v-1}\}$ | Number of front-load symbols | Value | Number of DMRS CDM group(s) without data | DMRS port(s) | $\{P_0, \ldots, P_{v-1}\}$ | Number of front-load symbols |
| 4 | 2 | 1 | $p_0 = 1$ | 1 | 4 | 2 | 0, 1, 2, 3, 6, 7, 8 | $p_3 = 2$ $p_4 = 3$ $p_5 = 8$ or $p_0 = 0$ $p_1 = 1$ $p_2 = 2$ $p_3 = 3$ $p_4 = 6$ $p_5 = 8$ $p_0 = 2$ $p_1 = 3$ $p_2 = 8$ $p_3 = 0$ $p_4 = 1$ $p_5 = 6$ $p_6 = 7$ or $p_0 = 0$ $p_1 = 1$ $p_2 = 2$ $p_3 = 3$ $p_4 = 6$ $p_5 = 7$ $p_6 = 8$ | 2 |
| 5 | 2 | 2 | $p_0 = 2$ | 1 | 5 | 2 | 0, 1, 2, 3, 6, 7, 8, 9 | $p_0 = 2$ $p_1 = 3$ $p_2 = 8$ $p_3 = 9$ $p_4 = 0$ $p_5 = 1$ $p_6 = 6$ $p_7 = 7$ or $p_0 = 0$ $p_1 = 1$ $p_2 = 6$ $p_3 = 7$ $p_4 = 2$ $p_5 = 3$ $p_6 = 8$ $p_7 = 9$ or $p_0 = 0$ $p_1 = 1$ $p_2 = 2$ $p_3 = 3$ $p_4 = 6$ $p_5 = 7$ $p_6 = 8$ $p_7 = 9$ | 2 |
| 6 | 2 | 3 | $p_0 = 3$ | 1 | 6-63 | Reserved | Reserved | | Reserved |
| 7 | 2 | 0, 1 | $p_0 = 0$ $p_1 = 1$ | 1 | | | | | |
| 8 | 2 | 2, 3 | $p_0 = 2$ $p_1 = 3$ | 1 | | | | | |
| 9 | 2 | 0-2 | $p_0 = 0$ $p_1 = 1$ $p_2 = 2$ or $p_0 = 2$ $p_1 = 0$ $p_2 = 1$ | 1 | | | | | |
| 10 | 2 | 0-3 | $p_0 = 0$ $p_1 = 1$ | 1 | | | | | |

-continued

Table case 2-2-2

| | One codeword: Codeword 0 enabled, Codeword 1 disabled | | | | Two Codewords: Codeword 0 enabled, Codeword 1 enabled | | | |
|---|---|---|---|---|---|---|---|---|
| Value | Number of DMRS CDM group(s) without data | DMRS port(s) | $\{P_0, \ldots, P_{v-1}\}$ | Number of front-load symbols | Value | Number of DMRS CDM group(s) without data | DMRS port(s) | $\{P_0, \ldots, P_{v-1}\}$ | Number of front-load symbols |
| | | | $p_2 = 2$ $p_3 = 3$ or $p_0 = 2$ $p_1 = 3$ $p_2 = 0$ $p_3 = 1$ | | | | | | |
| 11 | 3 | 0 | $p_0 = 0$ | 1 | | | | | |
| 12 | 3 | 1 | $p_0 = 1$ | 1 | | | | | |
| 13 | 3 | 2 | $p_0 = 2$ | 1 | | | | | |
| 14 | 3 | 3 | $p_0 = 3$ | 1 | | | | | |
| 15 | 3 | 4 | $p_0 = 4$ | 1 | | | | | |
| 16 | 3 | 5 | $p_0 = 5$ | 1 | | | | | |
| 17 | 3 | 0, 1 | $p_0 = 0$ $p_1 = 1$ | 1 | | | | | |
| 18 | 3 | 2, 3 | $p_0 = 2$ $p_1 = 3$ | 1 | | | | | |
| 19 | 3 | 4, 5 | $p_0 = 4$ $p_1 = 1$ | 1 | | | | | |
| 20 | 3 | 0-2 | $p_0 = 0$ $p_1 = 1$ $p_2 = 2$ or $p_0 = 2$ $p_1 = 0$ $p_2 = 1$ | 1 | | | | | |
| 21 | 3 | 3-5 | $p_0 = 3$ $p_1 = 4$ $p_2 = 5$ or $p_0 = 5$ $p_1 = 3$ $p_2 = 4$ | 1 | | | | | |
| 22 | 3 | 0-3 | $p_0 = 0$ $p_1 = 1$ $p_2 = 2$ $p_3 = 3$ or $p_0 = 2$ $p_1 = 3$ $p_2 = 0$ $p_3 = 1$ | 1 | | | | | |
| 23 | 2 | 0, 2 | $p_0 = 0$ $p_1 = 2$ or $p_0 = 2$ $p_1 = 0$ | 1 | | | | | |
| 24 | 3 | 0 | $p_0 = 0$ | 2 | | | | | |
| 25 | 3 | 1 | $p_0 = 1$ | 2 | | | | | |
| 26 | 3 | 2 | $p_0 = 2$ | 2 | | | | | |
| 27 | 3 | 3 | $p_0 = 3$ | 2 | | | | | |
| 28 | 3 | 4 | $p_0 = 4$ | 2 | | | | | |
| 29 | 3 | 5 | $p_0 = 5$ | 2 | | | | | |
| 30 | 3 | 6 | $p_0 = 6$ | 2 | | | | | |
| 31 | 3 | 7 | $p_0 = 7$ | 2 | | | | | |
| 32 | 3 | 8 | $p_0 = 8$ | 2 | | | | | |
| 33 | 3 | 9 | $p_0 = 9$ | 2 | | | | | |
| 34 | 3 | 10 | $p_0 = 10$ | 2 | | | | | |
| 35 | 3 | 11 | $p_0 = 11$ | 2 | | | | | |
| 36 | 3 | 0, 1 | $p_0 = 0$ $p_1 = 1$ | 2 | | | | | |
| 37 | 3 | 2, 3 | $p_0 = 2$ $p_1 = 3$ | 2 | | | | | |
| 38 | 3 | 4, 5 | $p_0 = 4$ $p_1 = 5$ | 2 | | | | | |

-continued

Table case 2-2-2

| | One codeword: Codeword 0 enabled, Codeword 1 disabled | | | | Two Codewords: Codeword 0 enabled, Codeword 1 enabled | | | |
|---|---|---|---|---|---|---|---|---|
| Value | Number of DMRS CDM group(s) without data | DMRS port(s) | $\{P_0, \ldots, P_{v-1}\}$ | Number of front-load symbols | Value | Number of DMRS CDM group(s) without data | DMRS port(s) | $\{P_0, \ldots, P_{v-1}\}$ | Number of front-load symbols |
| 39 | 3 | 6, 7 | $p_0 = 6$ $p_1 = 7$ | 2 | | | | |
| 40 | 3 | 8, 9 | $p_0 = 8$ $p_1 = 9$ | 2 | | | | |
| 41 | 3 | 10, 11 | $p_0 = 10$ $p_1 = 11$ | 2 | | | | |
| 42 | 3 | 0, 1, 6 | $p_0 = 0$ $p_1 = 1$ $p_2 = 6$ | 2 | | | | |
| 43 | 3 | 2, 3, 8 | $p_0 = 2$ $p_1 = 3$ $p_2 = 8$ | 2 | | | | |
| 44 | 3 | 4, 5, 10 | $p_0 = 4$ $p_1 = 5$ $p_2 = 10$ | 2 | | | | |
| 45 | 3 | 0, 1, 6, 7 | $p_0 = 0$ $p_1 = 1$ $p_2 = 6$ $p_3 = 7$ | 2 | | | | |
| 46 | 3 | 2, 3, 8, 9 | $p_0 = 2$ $p_1 = 3$ $p_2 = 8$ $p_3 = 9$ | 2 | | | | |
| 47 | 3 | 4, 5, 10, 11 | $p_0 = 4$ $p_1 = 5$ $p_2 = 10$ $p_3 = 11$ | 2 | | | | |
| 48 | 1 | 0 | $p_0 = 0$ | 2 | | | | |
| 49 | 1 | 1 | $p_0 = 1$ | 2 | | | | |
| 50 | 1 | 6 | $p_0 = 6$ | 2 | | | | |
| 51 | 1 | 7 | $p_0 = 7$ | 2 | | | | |
| 52 | 1 | 0, 1 | $p_0 = 0$ $p_1 = 1$ | 2 | | | | |
| 53 | 1 | 6, 7 | $p_0 = 6$ $p_1 = 7$ | 2 | | | | |
| 54 | 2 | 0, 1 | $p_0 = 0$ $p_1 = 1$ | 2 | | | | |
| 55 | 2 | 2, 3 | $p_0 = 2$ $p_1 = 3$ | 2 | | | | |
| 56 | 2 | 6, 7 | $p_0 = 6$ $p_1 = 7$ | 2 | | | | |
| 57 | 2 | 8, 9 | $p_0 = 8$ $p_1 = 9$ | 2 | | | | |
| 58-63 | Reserved | Reserved | | Reserved | | | | | here, "Value" represents the value of the DMRS port indication information field, and DMRS port(s) represents a set of DMRS ports and is notified to a terminal through DCI.

Case 3:

According to the high-level configuration parameters DL-DMRS-config-type and DL-DMRS-max-len, the specific values of $\{P_0, \ldots, P_{v-1}\}$ in the DMRS port vector $$\begin{bmatrix} y^{(p_0)}(i) \\ \vdots \\ y^{(p_{v-1})}(i) \end{bmatrix}$$

are determined through the correspondence among the number of code words, switch state of each code word, antenna port indication information field (the value column of each table in case 3) and DMRS port vector $$\begin{bmatrix} y^{(p_0)}(i) \\ \vdots \\ y^{(p_{v-1})}(i) \end{bmatrix}$$

in the DCI respectively in the ways shown by the tables case 3-1-1, case 3-1-2, case 3-2-1 and case 3-2-2.

If the high-level configured DMRS configuration parameters are: DL-DMRS-config-type=1 and DL-DMRS-max-len=1, the specific values of $\{P_0, \ldots, P_{v-1}\}$ in the DMRS port vector $$\begin{bmatrix} y^{(p_0)}(i) \\ \vdots \\ y^{(p_{v-1})}(i) \end{bmatrix}$$

are shown in Table case 3-1-1.

That is, In one embodiment, when the DMRS configuration type is the first type and the maximum number of DMRS symbols is 1, the values of $\{P_0, \ldots, P_{v=1}\}$ are determined by the Table case 3-1-1:

TABLE

| | case 3-1-1 One Codeword: Codeword 0 enabled. Codeword 1 disabled | |
|---|---|---|
| Value | Number of DMRS CDM group(s) without data | $\{P_0, \ldots, P_{v-1}\}$ |
| 0 | 1 | $p_0 = 0$ |
| 1 | 1 | $p_0 = 1$ |
| 2 | 1 | $p_0 = 0$ $p_1 = 1$ |
| 3 | 2 | $p_0 = 0$ |
| 4 | 2 | $p_0 = 1$ |
| 5 | 2 | $p_0 = 2$ |
| 6 | 2 | $p_0 = 3$ |
| 7 | 2 | $p_0 = 0$ $p_1 = 1$ |
| 8 | 2 | $p_0 = 2$ $p_1 = 3$ |
| 9 | 2 | $p_0 = 0$ $p_1 = 1$ $p_2 = 2$ or $p_0 = 2$ $p_1 = 0$ $p_2 = 1$ |
| 10 | 2 | $p_0 = 0$ $p_1 = 1$ $p_2 = 2$ $p_3 = 3$ or $p_0 = 2$ $p_1 = 3$ $p_2 = 0$ $p_3 = 1$ |
| 11 | 2 | $p_0 = 0$ $p_1 = 2$ or $p_0 = 2$ $p_1 = 0$ |
| 12-15 | Reserved | | here, "Value" represents the value of the DMRS port indication information field.

If the high-level configured DMRS configuration parameters are: DL-DMRS-config-type=1 and DL-DMRS-max-len=2, the specific values of $\{P_0, \ldots, P_{v-1}\}$ in the DMRS port vector $$\begin{bmatrix} y^{(p_0)}(i) \\ \vdots \\ y^{(p_{v-1})}(i) \end{bmatrix}$$

are shown in Table case 3-1-2.

That is, In one embodiment, when the DMRS configuration type is the first type and the maximum number of DMRS symbols is 2, the values of $\{P_0, \ldots, P_{v-1}\}$ are determined by the Table case 3-1-2:

| | Table case 3-1-2 | | | | | | |
|---|---|---|---|---|---|---|---|
| | One Codeword: Codeword 0 enabled, Codeword 1 disabled | | | Two Codewords: Codeword 0 enabled, Codeword 1 enabled | | | |
| Value | Number of DMRS CDM group(s) without data | $\{P_0, \ldots, P_{v-1}\}$ | Number of front-load symbols | Value | Number of DMRS CDM group(s) without data | $\{P_0, \ldots, P_{v-1}\}$ | Number of front-load symbols |
| 0 | 1 | $p_0 = 0$ | 1 | 0 | 2 | $p_0 = 2$ $p_1 = 3$ $p_2 = 0$ $p_3 = 1$ $p_4 = 4$ or $p_0 = 0$ $p_1 = 1$ $p_2 = 2$ $p_3 = 3$ $p_4 = 4$ | 2 |
| 1 | 1 | $p_0 = 1$ | 1 | 1 | 2 | $p_0 = 2$ $p_1 = 3$ $p_2 = 6$ $p_3 = 0$ | 2 |

Table case 3-1-2

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | $\{P_0, \ldots, P_{v-1}\}$ | Number of front-load symbols | Value | Number of DMRS CDM group(s) without data | $\{P_0, \ldots, P_{v-1}\}$ | Number of front-load symbols |
| | | | | | | $p_4 = 1$ $p_5 = 4$ or $p_0 = 0$ $p_1 = 1$ $p_2 = 4$ $p_3 = 2$ $p_4 = 3$ $p_5 = 6$ or $p_0 = 0$ $p_1 = 1$ $p_2 = 2$ $p_3 = 3$ $p_4 = 4$ $p_5 = 6$ | |
| 2 | 1 | $p_0 = 0$ $p_1 = 1$ | 1 | 2 | 2 | $p_0 = 2$ $p_1 = 3$ $p_2 = 6$ $p_3 = 0$ $p_4 = 1$ $p_5 = 4$ $p_6 = 5$ or $p_0 = 0$ $p_1 = 1$ $p_2 = 2$ $p_3 = 3$ $p_4 = 4$ $p_5 = 5$ $p_6 = 6$ | 2 |
| 3 | 2 | $p_0 = 0$ | 1 | 3 | 2 | $p_0 = 2$ $p_1 = 3$ $p_2 = 6$ $p_3 = 7$ $p_4 = 0$ $p_5 = 1$ $p_6 = 4$ $p_7 = 5$ or $p_0 = 0$ $p_1 = 1$ $p_2 = 4$ $p_3 = 5$ $p_4 = 2$ $p_5 = 3$ $p_6 = 6$ $p_7 = 7$ or $p_0 = 0$ $p_1 = 1$ $p_2 = 2$ $p_3 = 3$ $p_4 = 4$ $p_5 = 5$ $p_6 = 6$ $p_7 = 7$ | 2 |
| 4 | 2 | $p_0 = 1$ | 1 | 4-31 | reserved | | reserved |
| 5 | 2 | $p_0 = 2$ | 1 | | | | |
| 6 | 2 | $p_0 = 3$ | 1 | | | | |
| 7 | 2 | $p_0 = 0$ $p_1 = 1$ | 1 | | | | |
| 8 | 2 | $p_0 = 2$ $p_1 = 3$ | 1 | | | | |
| 9 | 2 | $p_0 = 0$ $p_1 = 1$ $p_2 = 2$ | 1 | | | | |

TABLE-continued

Table case 3-1-2

| | One Codeword: Codeword 0 enabled, Codeword 1 disabled | | | Two Codewords: Codeword 0 enabled, Codeword 1 enabled | | |
|---|---|---|---|---|---|---|
| Value | Number of DMRS CDM group(s) without data | $\{P_0, \ldots, P_{\nu-1}\}$ | Number of front-load symbols | Value | Number of DMRS CDM group(s) without data | $\{P_0, \ldots, P_{\nu-1}\}$ | Number of front-load symbols |
| | | or $p_0 = 2$ $p_1 = 0$ $p_2 = 1$ | | | | |
| 10 | 2 | $p_0 = 0$ $p_1 = 1$ $p_2 = 2$ $p_3 = 3$ or $p_0 = 2$ $p_1 = 3$ $p_2 = 0$ $p_3 = 1$ | 1 | | | |
| 11 | 2 | $p_0 = 0$ $p_1 = 2$ or $p_0 = 2$ $p_1 = 0$ | 1 | | | |
| 12 | 2 | $p_0 = 0$ | 2 | | | |
| 13 | 2 | $p_0 = 1$ | 2 | | | |
| 14 | 2 | $p_0 = 2$ | 2 | | | |
| 15 | 2 | $p_0 = 3$ | 2 | | | |
| 16 | 2 | $p_0 = 4$ | 2 | | | |
| 17 | 2 | $p_0 = 5$ | 2 | | | |
| 18 | 2 | $p_0 = 6$ | 2 | | | |
| 19 | 2 | $p_0 = 7$ | 2 | | | |
| 20 | 2 | $p_0 = 0$ $p_1 = 1$ | 2 | | | |
| 21 | 2 | $p_0 = 2$ $p_1 = 3$ | 2 | | | |
| 22 | 2 | $p_0 = 4$ $p_1 = 3$ | 2 | | | |
| 23 | 2 | $p_0 = 6$ $p_1 = 7$ | 2 | | | |
| 24 | 2 | $p_0 = 0$ $p_1 = 4$ | 2 | | | |
| 25 | 2 | $p_0 = 2$ $p_1 = 6$ | 2 | | | |
| 26 | 2 | $p_0 = 0$ $p_1 = 1$ $p_2 = 4$ | 2 | | | |
| 27 | 2 | $p_0 = 2$ $p_1 = 3$ $p_2 = 6$ | 2 | | | |
| 28 | 2 | $p_0 = 0$ $p_1 = 1$ $p_2 = 4$ $p_3 = 5$ | 2 | | | |
| 29 | 2 | $p_0 = 2$ $p_1 = 3$ $p_2 = 6$ $p_3 = 7$ | 2 | | | |
| 30 | 2 | $p_0 = 0$ $p_1 = 2$ $p_2 = 4$ $p_3 = 6$ or $p_0 = 2$ $p_1 = 6$ $p_2 = 0$ $p_3 = 4$ | | | | |

Table case 3-1-2

| | One Codeword: Codeword 0 enabled, Codeword 1 disabled | | | Two Codewords: Codeword 0 enabled, Codeword 1 enabled | |
|---|---|---|---|---|---|
| Value | Number of DMRS CDM group(s) without data | {P$_0$, ..., P$_{v-1}$} | Number of front-load symbols | Value | Number of DMRS CDM group(s) without data | {P$_0$, ..., P$_{v-1}$} | Number of front-load symbols |
| 31 | | or<br>p$_0$ = 0<br>p$_1$ = 4<br>p$_2$ = 2<br>p$_3$ = 6<br>Reserved | | | Reserved | | here, "Value" represents the value of the DMRS port indication information field.

If the high-level configured DMRS configuration parameters are: DL-DMRS-config-type=2 and DL-DMRS-max-len=1, the specific values of $\{P_0, \ldots, P_{v-1}\}$ in the DMRS port vector $$\begin{bmatrix} y^{(P_0)}(i) \\ \vdots \\ y^{(P_{v-1})}(i) \end{bmatrix}$$

are shown in Table case 3-2-1.

That is, In one embodiment, when the DMRS configuration type is the second type and the maximum number of DMRS symbols is 1, the values of $\{P_0, \ldots, P_{v-1}\}$ are determined by the Table case 3-2-1:

TABLE case 3-2-1

| | One Codeword: Codeword 0 enabled, Codeword 1 disabled | | | Two Codewords: Codeword 0 enabled, Codeword 1 enabled | |
|---|---|---|---|---|---|
| Value | Number of DMRS CDM group(s) without data | {P$_0$, ..., P$_{v-1}$} | Value | Number of DMRS CDM group(s) without data | {P$_0$, ..., P$_{v-1}$} |
| 0 | 1 | p$_0$ = 0 | 0 | 3 | p$_0$ = 0<br>p$_1$ = 1<br>p$_1$ = 2<br>p$_3$ = 3<br>p$_4$ = 4 |
| 1 | 1 | p$_0$ = 1 | 1 | 3 | p$_0$ = 0<br>p$_1$ = 1<br>p$_1$ = 2<br>p$_3$ = 2<br>p$_4$ = 4<br>p$_4$ = 5<br>or<br>p$_0$ = 0<br>p$_1$ = 1<br>p$_2$ = 4<br>p$_3$ = 5<br>p$_4$ = 2<br>p$_4$ = 3 |

TABLE-continued
case 3-2-1

| | One Codeword: Codeword 0 enabled, Codeword 1 disabled | | | Two Codewords: Codeword 0 enabled, Codeword 1 enabled | |
|---|---|---|---|---|---|
| Value | Number of DMRS CDM group(s) without data | {P$_0$, ..., P$_{v-1}$} | Value | Number of DMRS CDM group(s) without data | {P$_0$, ..., P$_{v-1}$} |
| | | | | | or<br>p$_0$ = 2<br>p$_1$ = 3<br>p$_2$ = 0<br>p$_3$ = 1<br>p$_4$ = 4<br>p$_4$ = 5<br>or<br>p$_0$ = 2<br>p$_1$ = 3<br>p$_2$ = 4<br>p$_3$ = 5<br>p$_4$ = 0<br>p$_4$ = 1<br>or<br>p$_0$ = 4<br>p$_1$ = 5<br>p$_2$ = 0<br>p$_3$ = 1<br>p$_4$ = 2<br>p$_4$ = 3<br>or<br>p$_0$ = 4<br>p$_1$ = 5<br>p$_2$ = 2<br>p$_3$ = 3<br>p$_4$ = 0<br>p$_4$ = 1 |
| 2 | 1 | p$_0$ = 0<br>p$_1$ = 1 | 2-31 | | reserved |
| 3 | 2 | p$_0$ = 0 | | | |
| 4 | 2 | p$_0$ = 1 | | | |
| 5 | 2 | p$_0$ = 2 | | | |
| 6 | 2 | p$_0$ = 3 | | | |
| 7 | 2 | p$_0$ = 0<br>p$_1$ = 1 | | | |
| 8 | 2 | p$_0$ = 2<br>p$_1$ = 3 | | | |
| 9 | 2 | p$_0$ = 0<br>p$_1$ = 1<br>p$_2$ = 2 | | | |

TABLE-continued case 3-2-1

| | One Codeword: Codeword 0 enabled, Codeword 1 disabled | | Two Codewords: Codeword 0 enabled, Codeword 1 enabled | |
|---|---|---|---|---|
| Value | Number of DMRS CDM group(s) without data | $\{P_0, \ldots, P_{v-1}\}$ | Value | Number of DMRS CDM group(s) without data | $\{P_0, \ldots, P_{v-1}\}$ |
| | | or $p_0 = 2$ $p_1 = 0$ $p_2 = 1$ | | | |
| 10 | 2 | $p_0 = 0$ $p_1 = 1$ $p_2 = 2$ $p_3 = 3$ or $p_0 = 2$ $p_1 = 3$ $p_2 = 0$ $p_3 = 1$ | | | |
| 11 | 3 | $p_0 = 0$ | | | |
| 12 | 3 | $p_0 = 1$ | | | |
| 13 | 3 | $p_0 = 2$ | | | |
| 14 | 3 | $p_0 = 3$ | | | |
| 15 | 3 | $p_0 = 4$ | | | |
| 16 | 3 | $p_0 = 5$ | | | |
| 17 | 3 | $p_0 = 0$ $p_1 = 1$ | | | |
| 18 | 3 | $p_0 = 2$ $p_1 = 3$ | | | |
| 19 | 3 | $p_0 = 4$ $p_1 = 5$ | | | |
| 20 | 3 | $p_0 = 0$ $p_1 = 1$ $p_2 = 2$ or $p_0 = 2$ $p_1 = 0$ $p_2 = 1$ | | | |
| 21 | 3 | $p_0 = 3$ $p_1 = 4$ $p_2 = 5$ or $p_0 = 4$ $p_1 = 5$ $p_2 = 3$ | | | |
| 22 | 3 | $p_0 = 0$ $p_1 = 1$ $p_2 = 2$ $p_3 = 3$ or $p_0 = 2$ $p_1 = 3$ $p_2 = 0$ $p_3 = 1$ | | | |
| 23 | 2 | $p_0 = 0$ $p_1 = 2$ or $p_0 = 2$ $p_1 = 0$ | | | |
| 24-31 | Reserved | | | | | here, "Value" represents the value of the DMRS port indication information field.

If the high-level configured DMRS configuration parameters are: DL-DMRS-config-type=2 and DL-DMRS-max-len=2, the specific values of $\{P_0, \ldots, P_{v-1}\}$ in the DMRS port vector $$\begin{bmatrix} y^{(p_0)}(i) \\ \vdots \\ y^{(p_{v-1})}(i) \end{bmatrix}$$

are shown in Table case 3-2-2.

That is, In one embodiment, when the DMRS configuration type is the second type and the maximum number of DMRS symbols is 2, the values of $\{P_0, \ldots, P_{v-1}\}$ are determined by the Table case 3-2-2:

Table case 3-2-2

| | One Codeword: Codeword 0 enabled, Codeword 1 disabled | | | Two Codewords: Codeword 0 enabled, Codeword 1 enabled | | |
|---|---|---|---|---|---|---|
| Value | Number of DMRS CDM group(s) without data | $\{P_0, \ldots, P_{v-1}\}$ | Number of front-load symbols | Value | Number of DMRS CDM group(s) without data | $\{P_0, \ldots, P_{v-1}\}$ | Number of front-load symbols |
| 0 | 1 | $p_0 = 0$ | 1 | 0 | 3 | $p_0 = 0$ $p_1 = 1$ $p_2 = 2$ $p_3 = 3$ $p_4 = 4$ | 1 |
| 1 | 1 | $p_0 = 1$ | 1 | 1 | 3 | $p_0 = 0$ $p_1 = 1$ $p_2 = 2$ $p_3 = 3$ $p_4 = 4$ $p_4 = 5$ or | 1 |

-continued

| Table case 3-2-2 | | | | | | | |
|---|---|---|---|---|---|---|---|
| One Codeword: Codeword 0 enabled, Codeword 1 disabled | | | | Two Codewords: Codeword 0 enabled, Codeword 1 enabled | | | |
| Value | Number of DMRS CDM group(s) without data | $\{P_0, \ldots, P_{v-1}\}$ | Number of front-load symbols | Value | Number of DMRS CDM group(s) without data | $\{P_0, \ldots, P_{v-1}\}$ | Number of front-load symbols |
| | | | | | | $p_0 = 0$ $p_1 = 1$ $p_2 = 4$ $p_3 = 5$ $p_4 = 2$ $p_4 = 3$ or $p_0 = 2$ $p_1 = 3$ $p_2 = 0$ $p_3 = 1$ $p_4 = 4$ $p_4 = 5$ or $p_0 = 2$ $p_1 = 3$ $p_2 = 4$ $p_3 = 5$ $p_4 = 0$ $p_4 = 1$ or $p_0 = 4$ $p_1 = 5$ $p_2 = 0$ $p_3 = 1$ $p_4 = 2$ $p_4 = 3$ or $p_0 = 4$ $p_1 = 5$ $p_2 = 2$ $p_3 = 3$ $p_4 = 0$ $p_4 = 1$ | |
| 2 | 1 | $p_0 = 0$ $p_1 = 1$ | 1 | 2 | 2 | $p_0 = 2$ $p_1 = 3$ $p2 = 0$ $p_3 = 1$ $p_4 = 1$ or $p_0 = 0$ $p_1 = 1$ $p_2 = 2$ $p_3 = 3$ $p_4 = 6$ | 2 |
| 3 | 2 | $p_0 = 0$ | 1 | 3 | 2 | $p_0 = 2$ $p_1 = 3$ $p_2 = 8$ $p_3 = 0$ $p_4 = 1$ $p_5 = 6$ or $p_0 = 0$ $p_1 = 1$ $p_2 = 6$ $p_3 = 2$ $p_4 = 3$ $p_5 = 8$ or $p_0 = 0$ $p_1 = 1$ $p_2 = 2$ $p_3 = 3$ $p_4 = 6$ $p_5 = 8$ | 2 |

| Table case 3-2-2 | | | | | | | |
|---|---|---|---|---|---|---|---|
| One Codeword: Codeword 0 enabled, Codeword 1 disabled ||| Two Codewords: Codeword 0 enabled, Codeword 1 enabled ||||
| Value | Number of DMRS CDM group(s) without data | $\{P_0, \ldots, P_{v-1}\}$ | Number of front-load symbols | Value | Number of DMRS CDM group(s) without data | $\{P_0, \ldots, P_{v-1}\}$ | Number of front-load symbols |
| 4 | 2 | $p_0 = 1$ | 1 | 4 | 2 | $p_0 = 2$<br>$p_1 = 3$<br>$p_2 = 8$<br>$p_3 = 0$<br>$p_4 = 1$<br>$p_5 = 6$<br>$p_6 = 7$<br>or<br>$p_0 = 0$<br>$p_1 = 1$<br>$p_2 = 2$<br>$p_3 = 3$<br>$p_4 = 6$<br>$p_5 = 7$<br>$p_6 = 8$ | 2 |
| 5 | 2 | $p_0 = 2$ | 1 | 5 | 2 | $p_0 = 2$<br>$p_1 = 3$<br>$p_2 = 8$<br>$p_3 = 9$<br>$p_4 = 0$<br>$p_5 = 1$<br>$p_6 = 6$<br>$p_7 = 7$<br>or<br>$p_0 = 0$<br>$p_1 = 1$<br>$p_2 = 6$<br>$p_3 = 7$<br>$p_4 = 2$<br>$p_5 = 3$<br>$p_6 = 8$<br>$p_7 = 9$<br>or<br>$p_0 = 0$<br>$p_1 = 1$<br>$p_2 = 2$<br>$p_3 = 3$<br>$p_4 = 6$<br>$p_5 = 7$<br>$p_6 = 8$<br>$p_7 = 9$ | 2 |
| 6 | 2 | $p_0 = 3$ | 1 | 6-63 | Reserved | | Reserved |
| 7 | 2 | $p_0 = 0$<br>$p_1 = 1$ | 1 | | | | |
| 8 | 2 | $p_0 = 2$<br>$p_1 = 3$ | 1 | | | | |
| 9 | 2 | $p_0 = 0$<br>$p_1 = 1$<br>$p_2 = 2$<br>or<br>$p_0 = 2$<br>$p_1 = 0$<br>$p_2 = 1$ | 1 | | | | |
| 10 | 2 | $p_0 = 0$<br>$p_1 = 1$<br>$p_2 = 2$<br>$p_3 = 3$<br>or<br>$p_0 = 2$<br>$p_1 = 3$<br>$p_2 = 0$<br>$p_3 = 1$ | 1 | | | | |
| 11 | 3 | $p_0 = 0$ | 1 | | | | |
| 12 | 3 | $p_0 = 1$ | 1 | | | | |
| 13 | 3 | $p_0 = 2$ | 1 | | | | |
| 14 | 3 | $p_0 = 3$ | 1 | | | | |
| 15 | 3 | $p_0 = 4$ | 1 | | | | |

Table case 3-2-2

| | One Codeword: Codeword 0 enabled, Codeword 1 disabled | | | Two Codewords: Codeword 0 enabled, Codeword 1 enabled | | |
|---|---|---|---|---|---|---|
| Value | Number of DMRS CDM group(s) without data | $\{P_0, \ldots, P_{\nu-1}\}$ | Number of front-load symbols | Value | Number of DMRS CDM group(s) without data $\{P_0, \ldots, P_{\nu-1}\}$ | Number of front-load symbols |
| 16 | 3 | $p_0 = 5$ | 1 | | | |
| 17 | 3 | $p_0 = 0$ $p_1 = 1$ | 1 | | | |
| 18 | 3 | $p_0 = 2$ $p_1 = 3$ | 1 | | | |
| 19 | 3 | $p_0 = 4$ $p_1 = 0$ | 1 | | | |
| 20 | 3 | $p_0 = 0$ $p_1 = 1$ $p_2 = 2$ or $p_0 = 2$ $p_1 = 0$ $p_2 = 1$ | 1 | | | |
| 21 | 3 | $p_0 = 3$ $p_1 = 4$ $p_2 = 5$ or $p_0 = 5$ $p_1 = 3$ $p_2 = 4$ | 1 | | | |
| 22 | 3 | $p_0 = 0$ $p_1 = 1$ $p_2 = 2$ $p_3 = 3$ or $p_0 = 2$ $p_1 = 3$ $p_2 = 0$ $p_3 = 1$ | 1 | | | |
| 23 | 2 | $p_0 = 0$ $p_1 = 2$ or $p_0 = 2$ $p_1 = 0$ | 1 | | | |
| 24 | 3 | $p_0 = 0$ | 2 | | | |
| 25 | 3 | $p_0 = 1$ | 2 | | | |
| 26 | 3 | $p_0 = 2$ | 2 | | | |
| 27 | 3 | $p_0 = 3$ | 2 | | | |
| 28 | 3 | $p_0 = 4$ | 2 | | | |
| 29 | 3 | $p_0 = 5$ | 2 | | | |
| 30 | 3 | $p_0 = 6$ | 2 | | | |
| 31 | 3 | $p_0 = 7$ | 2 | | | |
| 32 | 3 | $p_0 = 8$ | 2 | | | |
| 33 | 3 | $p_0 = 9$ | 2 | | | |
| 34 | 3 | $p_0 = 10$ | 2 | | | |
| 35 | 3 | $p_0 = 11$ | 2 | | | |
| 36 | 3 | $p_0 = 0$ $p_1 = 1$ | 2 | | | |
| 37 | 3 | $p_0 = 2$ $p_1 = 3$ | 2 | | | |
| 38 | 3 | $p_0 = 4$ $p_1 = 5$ | 2 | | | |
| 39 | 3 | $p_0 = 6$ $p_1 = 7$ | 2 | | | |
| 40 | 3 | $p_0 = 8$ $p_1 = 9$ | 2 | | | |
| 41 | 3 | $p_0 = 10$ $p_1 = 11$ | 2 | | | |
| 42 | 3 | $p_0 = 0$ $p_1 = 1$ $p_2 = 6$ | 2 | | | |
| 43 | 3 | $p_0 = 2$ $p_1 = 3$ $p_2 = 8$ | 2 | | | |

Table case 3-2-2

| | One Codeword: Codeword 0 enabled, Codeword 1 disabled | | | Two Codewords: Codeword 0 enabled, Codeword 1 enabled | | |
|---|---|---|---|---|---|---|
| Value | Number of DMRS CDM group(s) without data | $\{P_0, \ldots, P_{v-1}\}$ | Number of front-load symbols | Value | Number of DMRS CDM group(s) without data | $\{P_0, \ldots, P_{v-1}\}$ | Number of front-load symbols |
| 44 | 3 | $p_0 = 4$, $p_1 = 5$, $p_2 = 10$ | 2 | | | |
| 45 | 3 | $p_0 = 0$, $p_1 = 1$, $p_2 = 6$, $p_3 = 7$ | 2 | | | |
| 46 | 3 | $p_0 = 2$, $p_1 = 3$, $p_2 = 8$, $p_3 = 9$ | 2 | | | |
| 47 | 3 | $p_0 = 4$, $p_1 = 5$, $p_2 = 10$, $p_3 = 11$ | 2 | | | |
| 48 | 1 | $p_0 = 0$ | 2 | | | |
| 49 | 1 | $p_0 = 1$ | 2 | | | |
| 50 | 1 | $p_0 = 6$ | 2 | | | |
| 51 | 1 | $p_0 = 7$ | 2 | | | |
| 52 | 1 | $p_0 = 0$, $p_1 = 1$ | 2 | | | |
| 53 | 1 | $p_0 = 6$, $p_1 = 7$ | 2 | | | |
| 54 | 2 | $p_0 = 0$, $p_1 = 1$ | 2 | | | |
| 55 | 2 | $p_0 = 2$, $p_1 = 3$ | 2 | | | |
| 56 | 2 | $p_0 = 6$, $p_1 = 7$ | 2 | | | |
| 57 | 2 | $p_0 = 8$, $p_1 = 9$ | 2 | | | |
| 58-63 | Reserved | | | Reserved | | | here, "Value" represents the value of the DMRS port indication information field.

Figure 7:
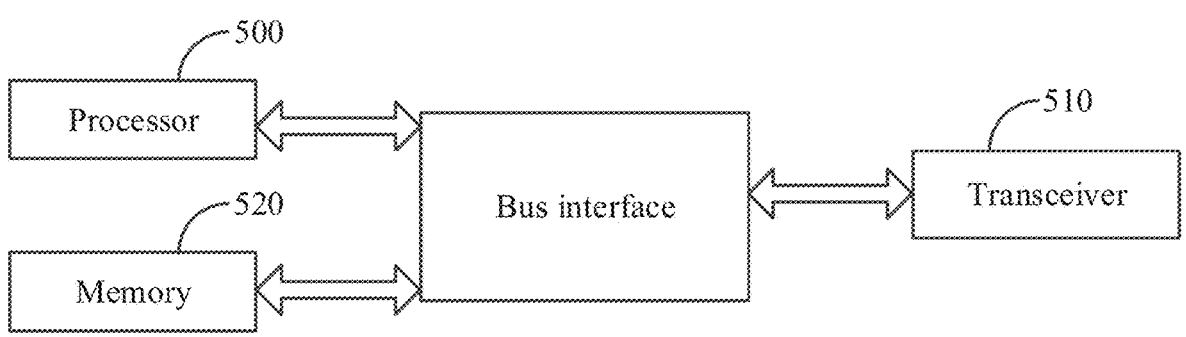
FIG. 7 is a structural schematic diagram of an apparatus for sending data provided by an embodiment of the present application.

At the network side, referring to FIG. 7, a data sending apparatus provided by an embodiment of the present application includes: a memory 520 and a processor 500, where the memory is configured to store the program instructions, and the processor is configured to invoke the program instructions stored in the memory and, in accordance with the obtained program, perform:

determining a preset DMRS port ordering rule;

mapping a data layer onto a DMRS port for transmission according to the preset DMRS port ordering rule, and sending the data layer to a terminal via a transceiver 510.

Here, it should be noted that all of the bus interface, the transceiver 510 and the like shown in FIG. 7 may be present as optional elements in the data sending apparatus provided by the embodiment of the present application, and are not necessary.

In one embodiment, the DMRS port ordering rule is preset in one of the following ways:

way 1-1: sorting based on the order of DMRS port numbers contained in a DMRS port vector from smallest to largest;

way 1-2: sorting CDM groups to which the DMRS ports contained in the DMRS port vector belong, based on the CDM group numbers, and for each CDM group, sorting DMRS ports in the group according to the DMRS port numbers;

way 1-3:

adopting the above way 1-1 or way 1-2 for single-codeword transmission;

for dual-codeword transmission:

grouping DMRS ports among the DMRS ports allocated by the DCI according to the configured or indicated DMRS QCL grouping parameters, and for each DMRS group:

sorting DMRS ports in the order of DMRS port numbers from smallest to largest, or sorting CDM groups to which DMRS ports in the group belong according to the CDM group numbers, and sorting in the order of DMRS port numbers from smallest to largest in each CDM group;

when the number of data layers is odd:

placing the groups containing a smaller number of DMRS ports in the front positions, or sorting all DMRS groups according to the DMRS group numbers;

when the number of data layers is even:

ensuring that a set of DMRS ports corresponding to codeword 1 is the same as a set of DMRS ports corresponding to codeword 1 when the number of layers minus 1, and a set of DMRS ports corresponding to codeword 0 contains a set of DMRS ports corresponding to codeword 0 when the number of layers minus 1, or sorting all DMRS groups according to the DMRS group numbers;

way 1-4:

adopting the above way 1-1 or way 1-2 when one DMRS group is used;

when two DMRS groups are used:

grouping DMRS ports among the DMRS ports allocated by the DCI according to the high-level configured DMRS QCL grouping parameters, and for each DMRS group:

sorting DMRS ports in the order of DMRS port numbers from smallest to largest, or sorting CDM groups to which DMRS ports in the DMRS group belong, according to the CDM group numbers, and sorting in the order of DMRS port numbers from smallest to largest in each CDM group;

placing the DMRS groups containing a smaller number of DMRS ports in the front positions.

In one embodiment, the processor is further configured to: send the DCI to the terminal via the transceiver so that the terminal determines the configuration parameters of the DMRS port according to the DCI.

The transceiver 510 is configured to receive and send the data under the control of the processor 500.

Here, in FIG. 7, the bus architecture can include any numbers of interconnected buses and bridges, and specifically link various circuits of one or more processors represented by the processor 500 and the memory represented by the memory 520. The bus architecture may further link various other circuits such as peripheral device, voltage regulator and power management circuit, which are all well known in the art and thus will not be further described again herein. The bus interface provides an interface. The transceiver 510 may be a plurality of elements, i.e., include a transmitter and a receiver, and provide the devices for communicating with various other devices over the transmission media. The processor 500 is responsible for managing the bus architecture and general processing, and the memory 520 may store the data used by the processor 500 when performing the operations.

The processor 500 may be Central Processing Device (CPU), Application Specific Integrated Circuit (ASIC), Field-Programmable Gate Array (FPGA) or Complex Programmable Logic Device (CPLD).

Figure 8:
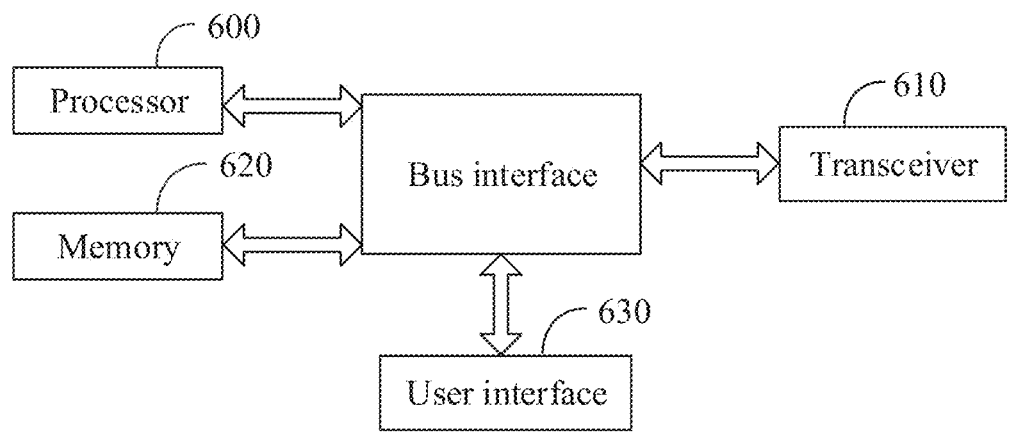
FIG. 8 is a structural schematic diagram of an apparatus for receiving data provided by an embodiment of the present application.

Referring to FIG. 8, at the terminal side, an apparatus for receiving data provided by an embodiment of the present application includes: a memory 620 and a processor 600, where the memory is configured to store the program instructions, and the processor is configured to invoke the program instructions stored in the memory and, in accordance with the obtained program, perform:

determining a preset DMRS port ordering rule;

receiving a data layer mapped onto a DMRS port via a transceiver 610 according to the preset DMRS port ordering rule.

It should be noted that the devices other than the memory 620 and the processor 600 in FIG. 8 are present as optional elements in the data receiving apparatus provided by the embodiment of the present application, and are not required devices.

The processor 600 in the apparatus at the terminal side provided in the embodiments of the present application may execute any step described in the above data receiving method at the terminal side, and the detailed description thereof will be omitted here.

The transceiver 610 is configured to receive and send the data under the control of the processor 600.

Here, in FIG. 8, the bus architecture may include any numbers of interconnected buses and bridges, and specifically link various circuits of one or more processors represented by the processor 600 and the memory represented by the memory 620. The bus architecture may further link various other circuits such as peripheral device, voltage regulator and power management circuit, which are all well known in the art and thus will not be further described again herein. The bus interface provides an interface. The transceiver 610 may be a plurality of elements, i.e., include a transmitter and a receiver, and provide the devices for communicating with various other devices over the transmission media. For different user equipments, the user interface 630 may also be the interface capable of interconnecting or exter-connecting with the required devices, and the connected devices include but not limited to keypad, display, loudspeaker, microphone, joystick and the like.

The processor 600 is responsible for managing the bus architecture and general processing, and the memory 620 may store the data used by the processor 600 when performing the operations.

In one embodiment, the processor 600 may be CPU (Central Processing Device), ASIC (Application Specific Integrated Circuit), FPGA (Field-Programmable Gate Array) or CPLD (Complex Programmable Logic Device).

Figure 9:
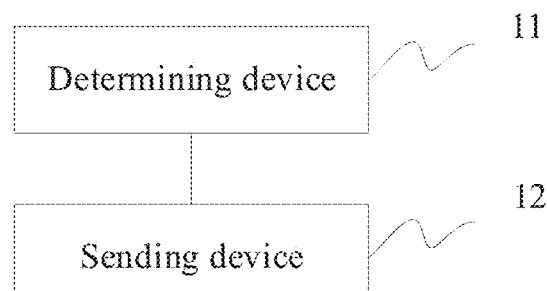
FIG. 9 is a structural schematic diagram of another apparatus for sending data provided by an embodiment of the present application.

At the network side, referring to FIG. 9, another data sending apparatus provided by an embodiment of the present application includes:

a determining device 11 configured to determine a preset DMRS port ordering rule;

a sending device 12 configured to map a data layer onto a DMRS port for transmission according to the preset DMRS port ordering rule, and send the data layer to a terminal.

Figure 10:
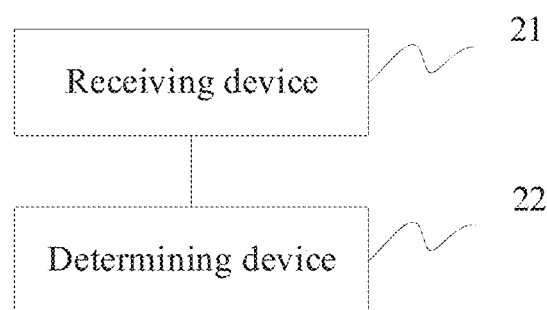
FIG. 10 is a structural schematic diagram of another apparatus for receiving data provided by an embodiment of the present application.

At the terminal side, referring to FIG. 10, another apparatus for receiving data provided by an embodiment of the present application includes:

a determining device 21 configured to determine a preset DMRS port ordering rule;

a receiving device 22 configured to receive a data layer mapped onto a DMRS port according to the preset DMRS port ordering rule.

An embodiment of the present application provides a computer storage medium which is configured to store the computer program instructions used by the above-mentioned computing device, where the computer program instructions contain the program for performing the information indicating or determining method described above.

The computer storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

The methods provided by the embodiments of the present application may be applied to the terminal devices, and may also be applied to the network devices.

Here, the terminal device may also referred to as the User Equipment ("UE" for short), Mobile Station ("MS" for short), Mobile Terminal ("MT" for short) or the like. In one embodiment, the terminal can has the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

The network device may be a base station (e.g., access point), which means the device in the access network communicating with the wireless terminal via one or more sectors over the air interface. The base station may be used to perform the inter-conversion between the received air frame and the IP packet, and used as the router between the wireless terminal and the rest of the access network, and the rest of the access network may include Internet Protocol (IP) networks. The base station may further coordinate the attribute management of the air interface. For example, the base station may be the Base Transceiver Station (BTS) in the GSM or CDMA, or may be the NodeB in the WCDMA, or may be the evolutional Node B (NodeB or eNB or e-NodeB) in the LTE, which is not limited in the embodiments of the disclosure. The embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A non-transitory computer storage medium wherein, the computer storage medium stores computer executable instructions which are configured to cause the computer to:

determine a preset Demodulation Reference Signal, DMRS, port ordering rule; and map a data layer onto a DMRS port for transmission according to the preset DMRS port ordering rule, and sending the data layer to a terminal;

wherein, the DMRS port ordering rule is preset in one of following ways:

way 1-3:

two steps as follows are comprised for dual-codeword transmission:

step 1: grouping DMRS ports among DMRS ports allocated by DCI according to configured or indicated DMRS QCL grouping parameters, and for each DMRS group:

sorting DMRS ports in an order of DMRS port numbers from smallest to largest, or sorting CDM groups to which DMRS ports in the group belong according to CDM group numbers, and sorting in an order of DMRS port numbers from smallest to largest in each CDM group;

step 2: sorting across DMRS-groups, comprising:

when a quantity of data layers is odd:

place groups containing a smaller number of DMRS ports in front positions, or sort all DMRS groups according to DMRS group numbers;

when the quantity of data layers is even:

ensure that a set of DMRS ports corresponding to codeword 1 is same as a set of DMRS ports corresponding to codeword 1 when the quantity of data layers minus 1, and a set of DMRS ports corresponding to codeword 0 contains a set of DMRS ports corresponding to codeword 0 when the quantity of data layers minus 1, or sort all DMRS groups according to the DMRS group numbers;

or way 1-4:

when two DMRS groups are used:

group DMRS ports among DMRS ports allocated by DCI according to high-level configured DMRS QCL grouping parameters, and for each DMRS group: sorting DMRS ports in an order of DMRS port numbers from smallest to largest, or sorting CDM groups to which DMRS ports in the DMRS group belong according to the CDM group numbers, and sorting in an order of DMRS port numbers from smallest to largest in each CDM group;

place DMRS groups containing a smaller number of DMRS ports in front positions.

2. The non-transitory computer storage medium according to claim 1, wherein, the computer storage medium stores computer executable instructions which are configured to further causes the computer to:

send DCI to the terminal so that the terminal determines configuration parameters of the DMRS port according to the DCI.

3. A non-transitory computer storage medium wherein, the computer storage medium stores computer executable instructions which are configured to cause the computer to:

determine a preset Demodulation Reference Signal, DMRS, port ordering rule; and receive a data layer mapped onto a DMRS port according to the preset DMRS port ordering rule;

wherein, the DMRS port ordering rule is preset in one of following ways:

way 1-3:

two steps as follows are comprised for dual-codeword transmission:

step 1: grouping DMRS ports among DMRS ports allocated by DCI according to configured or indicated DMRS QCL grouping parameters, and for each DMRS group:

sort DMRS ports in an order of DMRS port numbers from smallest to largest, or sort CDM groups to which DMRS ports in the group belong according to CDM group numbers, and sorting in an order of DMRS port numbers from smallest to largest in each CDM group;

step 2: sorting across DMRS-groups, comprising:

when a quantity of data layers is odd:

place groups containing a smaller number of DMRS ports in front positions, or sort all DMRS groups according to DMRS group numbers;

when the quantity of data layers is even:

ensure that a set of DMRS ports corresponding to codeword 1 is same as a set of DMRS ports corresponding to codeword 1 when the quantity of data layers minus 1, and a set of DMRS ports corresponding to codeword 0 contains a set of DMRS ports corresponding to codeword 0 when the quantity of data layers minus 1, or sort all DMRS groups according to the DMRS group numbers;

or way 1-4:

when two DMRS groups are used:

group DMRS ports among DMRS ports allocated by DCI according to high-level configured DMRS QCL grouping parameters, and for each DMRS group: sorting DMRS ports in an order of DMRS port numbers from smallest to largest, or sorting CDM groups to which DMRS ports in the DMRS group belong according to the CDM group numbers, and sorting in an order of DMRS port numbers from smallest to largest in each CDM group;

place DMRS groups containing a smaller number of DMRS ports in front positions.

4. The non-transitory computer storage medium method according to claim 3, wherein, receiving a data layer mapped onto a DMRS port according to the preset DMRS port ordering rule, comprises:

receiving the data layer mapped onto a DMRS port for transmission according to a following formula:

$$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix}$$

wherein $i=0, 1, \ldots, M_{symb}^{layer}-1$, i represents an ith modulation symbol in $M_{symb}^{layer}$ modulation symbols for transmission in each data layer; $P0, \ldots, Pv-1$ represent v DMRS port numbers;

$$\begin{bmatrix} y^{(p_0)}(i) \\ \vdots \\ y^{(p_{v-1})}(i) \end{bmatrix}$$

is a vector of v DMRS ports determined according to the preset DMRS port ordering rule;

$$\begin{bmatrix} x^{(0)}(i) \\ \vdots \\ x^{(v-1)}(i) \end{bmatrix}$$

is a vector of sent signals obtained by sorting data layers by number according to the quantity v of Multiple-Input-Multiple-Output, MIMO, data layers transmitted in parallel;

$$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix}$$

represents receiving a data layer $x^{(0)}(i)$ on a DMRS port $y^{(p_0)}(i)$ used during transmission, and so on, receiving a data layer $x^{(v-1)}(i)$ on a DMRS port $y^{(p_{v-1})}(i)$ used during transmission.

5. The non-transitory computer storage medium method according to claim 4, wherein, when a DMRS configuration type is a first type and a maximum quantity of DMRS symbols is 1, values of $\{P0, \ldots, Pv-1\}$ are determined by a following table:

| DMRS port(s) | $\{P0, \ldots, Pv-1\}$ |
|---|---|
| 0 | $p_0 = 0$ |
| 1 | $p_0 = 1$ |
| 0, 1 | $p_0 = 0$ |
|  | $p_1 = 1$ |
| 2 | $p_0 = 2$ |
| 3 | $p_0 = 3$ |
| 2, 3 | $p_0 = 2$ |
|  | $p_1 = 3$ |
| 0-2 | $p_0 = 0$ |
|  | $p_1 = 1$ |
|  | $p_2 = 2$ |
|  | or |
|  | $p_0 = 2$ |
|  | $p_1 = 0$ |
|  | $p_2 = 1$ |
| 0-3 | $p_0 = 0$ |
|  | $p_1 = 1$ |
|  | $p_2 = 2$ |
|  | $p_3 = 3$ |
|  | or |
|  | $p_0 = 2$ |
|  | $p_1 = 3$ |
|  | $p_2 = 0$ |
|  | $p_3 = 1$ |
| 0, 2 | $p_0 = 0$ |
|  | $p_1 = 2$ |
|  | or |
|  | $p_0 = 2$ |
|  | $p_1 = 0$ | wherein item of DMRS port(s) represents a set of DMRS ports and is notified to a terminal through DCI.

6. The non-transitory computer storage medium method according to claim 4, wherein, when a DMRS configuration type is a first type and a maximum quantity of DMRS symbols is 2, values of $\{P0, \ldots, Pv-1\}$ are determined by a following table:

| DMRS port(s) | {P0, ..., Pv-1} |
|---|---|
| 0 | $p_0 = 0$ |
| 1 | $p_0 = 1$ |
| 0, 1 | $p_0 = 0$ |
|  | $p_1 = 1$ |
| 2 | $p_0 = 2$ |
| 3 | $p_0 = 3$ |
| 2, 3 | $p_0 = 2$ |
|  | $p_1 = 3$ |
| 0-2 | $p_0 = 0$ |
|  | $p_1 = 1$ |
|  | $p_2 = 2$ |
|  | or |
|  | $p_0 = 2$ |
|  | $p_1 = 0$ |
|  | $p_2 = 1$ |
| 0-3 | $p_0 = 0$ |
|  | $p_1 = 1$ |
|  | $p_2 = 2$ |
|  | $p_3 = 3$ |
|  | or |
|  | $p_0 = 2$ |
|  | $p_1 = 3$ |
|  | $p_2 = 0$ |
|  | $p_3 = 1$ |
| 0, 2 | $p_0 = 0$ |
|  | $p_1 = 2$ |
|  | or |
|  | $p_0 = 2$ |
|  | $p_1 = 0$ |
| 4 | $p_0 = 4$ |
| 5 | $p_0 = 5$ |
| 6 | $p_0 = 6$ |
| 7 | $p_0 = 7$ |
| 4, 5 | $p_0 = 4$ |
|  | $p_1 = 5$ |
| 6, 7 | $p_0 = 6$ |
|  | $p_1 = 7$ |
| 0, 4 | $p_0 = 0$ |
|  | $p_1 = 4$ |
| 2, 6 | $p_0 = 2$ |
|  | $p_1 = 6$ |
| 0, 1, 4 | $p_0 = 0$ |
|  | $p_1 = 1$ |
|  | $p_2 = 4$ |
| 2, 3, 6 | $p_0 = 2$ |
|  | $p_1 = 3$ |
|  | $p_2 = 6$ |
| 0, 1, 4, 5 | $p_0 = 0$ |
|  | $p_1 = 1$ |
|  | $p_2 = 4$ |
|  | $p_3 = 5$ |
| 2, 3, 6, 7 | $p_0 = 2$ |
|  | $p_1 = 3$ |
|  | $p_2 = 6$ |
|  | $p_3 = 7$ |
| 0, 2, 4, 6 | $p_0 = 0$ |
|  | $p_1 = 2$ |
|  | $p_2 = 4$ |
|  | $p_3 = 6$ |
|  | or |
|  | $p_0 = 2$ |
|  | $p_1 = 6$ |
|  | $p_2 = 0$ |
|  | $p_3 = 4$ |
|  | or |
|  | $p_0 = 0$ |
|  | $p_1 = 4$ |
|  | $p_2 = 2$ |
|  | $p_3 = 6$ |
| 0-4 | $p_0 = 2$ |
|  | $p_1 = 3$ |
|  | $p_2 = 0$ |
|  | $p_3 = 1$ |
|  | $p_4 = 4$ |
|  | or |
|  | $p_0 = 0$ |
|  | $p_1 = 1$ |
|  | $p_2 = 2$ |
|  | $p_3 = 3$ |
|  | $p_4 = 4$ |
| 0, 1, 2, 3, 4, 6 | $p_0 = 2$ |
|  | $p_1 = 3$ |
|  | $p_2 = 6$ |
|  | $p_3 = 0$ |
|  | $p_4 = 1$ |
|  | $p_5 = 4$ |
|  | or |
|  | $p_0 = 0$ |
|  | $p_1 = 1$ |
|  | $p_2 = 4$ |
|  | $p_3 = 2$ |
|  | $p_4 = 3$ |
|  | $p_5 = 6$ |
|  | or |
|  | $p_0 = 0$ |
|  | $p_1 = 1$ |
|  | $p_2 = 2$ |
|  | $p_3 = 3$ |
|  | $p_4 = 4$ |
|  | $p_5 = 6$ |
| 0, 1, 2, 3, 4, 5, 6 | $p_0 = 2$ |
|  | $p_1 = 3$ |
|  | $p_2 = 6$ |
|  | $p_3 = 0$ |
|  | $p_4 = 1$ |
|  | $p_5 = 4$ |
|  | $p_0 = 5$ |
|  | or |
|  | $p_0 = 0$ |
|  | $p_1 = 1$ |
|  | $p_2 = 2$ |
|  | $p_3 = 3$ |
|  | $p_4 = 4$ |
|  | $p_3 = 5$ |
|  | $p_6 = 6$ |
| 0, 1, 2, 3, 4, 5, 6, 7 | $p_0 = 2$ |
|  | $p_1 = 3$ |
|  | $p_2 = 6$ |
|  | $p_3 = 7$ |
|  | $p_4 = 0$ |
|  | $p_3 = 1$ |
|  | $p_6 = 4$ |
|  | $p_7 = 5$ |
|  | or |
|  | $p_0 = 0$ |
|  | $p_1 = 1$ |
|  | $p_2 = 4$ |
|  | $p_3 = 5$ |
|  | $p_4 = 2$ |
|  | $p_3 = 3$ |
|  | $p_6 = 6$ |
|  | $p_7 = 7$ |
|  | or |
|  | $p_0 = 0$ |
|  | $p_1 = 1$ |
|  | $p_2 = 2$ |
|  | $p_3 = 3$ |
|  | $p_4 = 4$ |
|  | $p_5 = 5$ |
|  | $p_6 = 6$ |
|  | $p_7 = 7$ | wherein item of DMRS port(s) represents a set of DMRS ports and is notified to a terminal through DCI.

7. The non-transitory computer storage medium method according to claim 4, wherein, when a DMRS configuration type is a second type and a maximum quantity of DMRS symbols is 1, values of {P0, ..., Pv-1} are determined by a following table:

| DMRS port(s) | {P0, . . . , Pv-1} |
|---|---|
| 0 | $p_0 = 0$ |
| 1 | $p_0 = 1$ |
| 0, 1 | $p_0 = 0$<br>$p_1 = 1$ |
| 2 | $p_0 = 2$ |
| 3 | $p_0 = 3$ |
| 2, 3 | $p_0 = 2$<br>$p_1 = 3$ |
| 0-2 | $p_0 = 0$<br>$p_1 = 1$<br>$p_2 = 2$<br>or<br>$p_0 = 2$<br>$p_1 = 0$<br>$p_2 = 1$ |
| 0-3 | $p_0 = 0$<br>$p_1 = 1$<br>$p_2 = 2$<br>$p_3 = 3$<br>or<br>$p_0 = 2$<br>$p_1 = 3$<br>$p_2 = 0$<br>$p_3 = 1$ |
| 4 | $p_0 = 4$ |
| 5 | $p_0 = 5$ |
| 4, 5 | $p_0 = 4$<br>$p_1 = 5$ |
| 3-5 | $p_0 = 3$<br>$p_1 = 4$<br>$p_2 = 5$<br>or<br>$p_0 = 4$<br>$p_1 = 5$<br>$p_2 = 3$ |
| 0-3 | $p_0 = 0$<br>$p_1 = 1$<br>$p_2 = 2$<br>$p_3 = 3$<br>or<br>$p_0 = 2$<br>$p_1 = 3$<br>$p_2 = 0$<br>$p_3 = 1$ |
| 0, 2 | $p_0 = 0$<br>$p_1 = 2$<br>or<br>$p_0 = 2$<br>$p_1 = 0$ |
| 0-4 | $p_0 = 0$<br>$p_1 = 1$<br>$p_2 = 2$<br>$p_3 = 3$<br>$p_4 = 4$ |
| 0-5 | $p_0 = 0$<br>$p_1 = 1$<br>$p_2 = 2$<br>$p_3 = 3$<br>$P_4 = 4$<br>$p_4 = 5$<br>or<br>$p_0 = 0$<br>$p_1 = 1$<br>$p_2 = 4$<br>$p_3 = 5$<br>$p_4 = 2$<br>$p_4 = 3$<br>or<br>$p_0 = 2$<br>$p_1 = 3$<br>$p_2 = 0$<br>$p_3 = 1$<br>$P_4 = 4$<br>$p_4 = 5$<br>or<br>$p_0 = 2$<br>$p_1 = 3$<br>$p_2 = 4$<br>$p_3 = 5$<br>$p_4 = 0$<br>$p_4 = 1$<br>or<br>$p_0 = 4$<br>$p_1 = 5$<br>$p_2 = 0$<br>$p_3 = 1$<br>$p_4 = 2$<br>$p_4 = 3$<br>or<br>$p_0 = 4$<br>$p_1 = 5$<br>$p_2 = 2$<br>$p_3 = 3$<br>$p_4 = 0$<br>$p_4 = 1$ | wherein item of DMRS port(s) represents a set of DMRS ports and is notified to a terminal through DCI.

8. The non-transitory computer storage medium method according to claim 4, wherein, when a DMRS configuration type is a second type and a maximum quantity of DMRS symbols is 2, values of {P0, . . . , Pv−1} are determined by a following table:

| DMRS port(s) | {P0, . . . , Pv-1} |
|---|---|
| 0 | $p_0 = 0$ |
| 1 | $p_0 = 1$ |
| 0, 1 | $p_0 = 0$<br>$p_1 = 1$ |
| 2 | $p_0 = 2$ |
| 3 | $p_0 = 3$ |
| 0, 1 | $p_0 = 0$<br>$p_1 = 1$ |
| 2, 3 | $p_0 = 2$<br>$p_1 = 3$ |
| 0-2 | $p_0 = 0$<br>$p_1 = 1$<br>$p_2 = 2$<br>or<br>$p_0 = 2$<br>$p_1 = 0$<br>$p_2 = 1$ |
| 0-3 | $p_0 = 0$<br>$p_1 = 1$<br>$p_2 = 2$<br>$p_3 = 3$<br>or<br>$p_0 = 2$<br>$p_1 = 3$<br>$p_2 = 0$<br>$p_3 = 1$ |
| 4 | $p_0 = 4$ |
| 5 | $p_0 = 5$ |
| 4, 5 | $p_0 = 4$<br>$p_1 = 5$ |
| 3-5 | $p_0 = 3$<br>$p_1 = 4$<br>$p_2 = 5$<br>or<br>$p_0 = 5$<br>$p_1 = 3$<br>$p_2 = 4$ |
| 0-3 | $p_0 = 0$<br>$p_1 = 1$<br>$p_2 = 2$<br>$p_3 = 3$<br>or<br>$p_0 = 2$<br>$p_1 = 3$ |

| DMRS port(s) | {P0, . . . , Pv-1} |
|---|---|
| 0, 2 | $p_2 = 0$<br>$p_3 = 1$<br>$p_0 = 0$<br>$p_1 = 2$<br>or<br>$p_0 = 2$<br>$p_1 = 0$ |
| 6 | $p_0 = 6$ |
| 7 | $p_0 = 7$ |
| 8 | $p_0 = 8$ |
| 9 | $p_0 = 9$ |
| 10 | $p_0 = 10$ |
| 11 | $p_0 = 11$ |
| 6, 7 | $p_0 = 6$<br>$p_1 = 7$ |
| 8, 9 | $p_0 = 8$<br>$p_1 = 9$ |
| 10, 11 | $p_0 = 10$<br>$p_1 = 11$ |
| 0, 1, 6 | $p_0 = 0$<br>$p_1 = 1$<br>$p_2 = 6$ |
| 2, 3, 8 | $p_0 = 2$<br>$p_1 = 3$<br>$p_2 = 8$ |
| 4, 5, 10 | $p_0 = 4$<br>$p_1 = 5$<br>$p_2 = 10$ |
| 0, 1, 6, 7 | $p_0 = 0$<br>$p_1 = 1$<br>$p_2 = 6$<br>$p_3 = 7$ |
| 2, 3, 8, 9 | $p_0 = 2$<br>$p_1 = 3$<br>$p_2 = 8$<br>$p_3 = 9$ |
| 4, 5, 10, 11 | $p_0 = 4$<br>$p_1 = 5$<br>$p_2 = 10$<br>$p_3 = 11$ |
| 0-4 | $p_0 = 0$<br>$p_1 = 1$<br>$p_2 = 2$<br>$p_3 = 3$<br>$P_4 = 4$ |
| 0-5 | $p_0 = 0$<br>$p_1 = 1$<br>$p_2 = 2$<br>$p_3 = 3$<br>$p_4 = 4$<br>$p_4 = 5$<br>or<br>$p_0 = 0$<br>$p_1 = 1$<br>$p_2 = 4$<br>$p_3 = 5$<br>$p_4 = 2$<br>$p_4 = 3$<br>or<br>$p_0 = 2$<br>$p_1 = 3$<br>$p_2 = 0$<br>$p_3 = 1$<br>$p_4 = 4$<br>$p_4 = 5$<br>or<br>$p_0 = 2$<br>$p_1 = 3$<br>$p_2 = 4$<br>$p_3 = 5$<br>$p_4 = 0$<br>$p_4 = 1$<br>or<br>$p_0 = 4$<br>$p_1 = 5$<br>$p_2 = 0$ |

| DMRS port(s) | {P0, . . . , Pv-1} |
|---|---|
| | $p_3 = 1$<br>$p_4 = 2$<br>$p_4 = 3$<br>or<br>$p_0 = 4$<br>$p_1 = 5$<br>$p_2 = 2$<br>$p_3 = 3$<br>$p_4 = 0$<br>$p_4 = 1$ |
| 0, 1, 2, 3, 6 | $p_0 = 2$<br>$p_1 = 3$<br>$p_2 = 0$<br>$p_3 = 1$<br>$p_4 = 6$<br>or<br>$p_0 = 0$<br>$p_1 = 1$<br>$p_2 = 2$<br>$p_3 = 3$<br>$p_4 = 6$ |
| 0, 1, 2, 3, 6, 8 | $p_0 = 2$<br>$p_1 = 3$<br>$p_2 = 8$<br>$p_3 = 0$<br>$p_4 = 1$<br>$p_5 = 6$<br>or<br>$p_0 = 0$<br>$p_1 = 1$<br>$p_2 = 6$<br>$p_3 = 2$<br>$p_4 = 3$<br>$p_5 = 8$<br>or<br>$p_0 = 0$<br>$p_1 = 1$<br>$p_2 = 2$<br>$p_3 = 3$<br>$p_4 = 6$<br>$p_5 = 8$ |
| 0, 1, 2, 3, 6, 7, 8 | $p_0 = 2$<br>$p_1 = 3$<br>$p_2 = 8$<br>$p_3 = 0$<br>$p_4 = 1$<br>$p_5 = 6$<br>$p_6 = 7$<br>or<br>$p_0 = 0$<br>$p_1 = 1$<br>$p_2 = 2$<br>$p_3 = 3$<br>$p_4 = 6$<br>$p_5 = 7$<br>$p_6 = 8$ |
| 0, 1, 2, 3, 6, 7, 8, 9 | $p_0 = 2$<br>$p_1 = 3$<br>$p_2 = 8$<br>$p_3 = 9$<br>$p_4 = 0$<br>$p_5 = 1$<br>$p_6 = 6$<br>$p_7 = 7$<br>or<br>$p_0 = 0$<br>$p_1 = 1$<br>$p_2 = 6$<br>$p_3 = 7$<br>$P_4 = 2$<br>$p_5 = 3$<br>$p_6 = 8$<br>$p_7 = 9$<br>or<br>$p_0 = 0$<br>$p_1 = 1$ |

-continued

| DMRS port(s) | $\{P_0, \ldots, P_{v-1}\}$ |
|---|---|
| | $p_2 = 2$ |
| | $p_3 = 3$ |
| | $p_4 = 6$ |
| | $p_5 = 7$ |
| | $p_6 = 8$ |
| | $p_7 = 9$ | wherein item of DMRS port(s) represents a set of DMRS ports and is notified to a terminal through DCI.

9. The non-transitory computer storage medium method according to claim 4, wherein, when a DMRS configuration type is a first type and a maximum quantity of DMRS symbols is 1, values of $\{P_0, \ldots, P_{v-1}\}$ are determined by a following table:

| | One Codeword: Codeword 0 enabled, Codeword 1 disabled | | |
|---|---|---|---|
| Value | Number of DMRS CDM group(s) without data | DMRS port(s) | $\{P_0, \ldots, P_{v-1}\}$ |
| 0 | 1 | 0 | $p_0 = 0$ |
| 1 | 1 | 1 | $p_0 = 1$ |
| 2 | 1 | 0, 1 | $p_0 = 0$ |
| | | | $p_1 = 1$ |
| 3 | 2 | 0 | $p_0 = 0$ |
| 4 | 2 | 1 | $p_0 = 1$ |
| 5 | 2 | 2 | $p_0 = 2$ |
| 6 | 2 | 3 | $p_0 = 3$ |
| 7 | 2 | 0, 1 | $p_0 = 0$ |
| | | | $p_1 = 1$ |
| 8 | 2 | 2, 3 | $p_0 = 2$ |
| | | | $p_1 = 3$ |
| 9 | 2 | 0-2 | $p_0 = 0$ |
| | | | $p_1 = 1$ |
| | | | $p_2 = 2$ |
| 10 | 2 | 0-3 | $p_0 = 2$ |
| | | | $p_1 = 0$ |
| | | | $p_2 = 1$ |
| | | | or |
| | | | $p_0 = 0$ |
| | | | $p_1 = 1$ |
| | | | $p_2 = 2$ |
| | | | $p_3 = 3$ |
| | | | or |
| | | | $p_0 = 2$ |
| | | | $p_1 = 3$ |
| | | | $p_2 = 0$ |
| | | | $p_3 = 1$ |
| 11 | 2 | 0, 2 | $p_0 = 0$ |
| | | | $p_1 = 2$ |
| | | | or |
| | | | $p_0 = 2$ |
| | | | $p_1 = 0$ |
| 12-15 | Reserved | Reserved | | wherein item of One Codeword: Codeword 0 enabled, Codeword 1 disabled represents one codeword, with codeword 0 being enabled and codeword 1 being disabled; item of Value represents a value of a DMRS port indication information field, item of Number of DMRS CDM group(s) without data represents a quantity of DMRS CDM groups without data, and item of DMRS port(s) represents a set of DMRS ports and is notified to a terminal through DCI.

10. The non-transitory computer storage medium method according to claim 4, wherein, when a DMRS configuration type is a first type and a maximum quantity of DMRS symbols is 2, values of $\{P_0, \ldots, P_{v-1}\}$ are determined by a following table:

| | One Codeword: Codeword 0 enabled, Codeword 1 disabled | | | | Two Codewords: Codeword 0 enabled, Codeword 1 enabled | | | |
|---|---|---|---|---|---|---|---|---|
| Value | Number of DMRS CDM group(s) without data | DMRS port(s) | $\{P_0, \ldots, P_{v-1}\}$ | Number of front-load symbols | Value | Number of DMRS CDM group(s) without data | DMRS port(s) | $\{P_0, \ldots, P_{v-1}\}$ | Number of front-load symbols |
| 0 | 1 | 0 | $p_0 = 0$ | 1 | 0 | 2 | 0-4 | $p_0 = 2$ $p_1 = 3$ $p_2 = 0$ $p_3 = 1$ $p_4 = 4$ or $p_0 = 0$ $p_1 = 1$ $p_2 = 2$ $p_3 = 3$ $p_4 = 4$ | 2 |
| 1 | 1 | 1 | $p_0 = 1$ | 1 | 1 | 2 | 0, 1, 2, 3, 4, 6 | $p_0 = 2$ $p_1 = 3$ $p_2 = 6$ $p_3 = 0$ | 2 |

-continued

| One Codeword: Codeword 0 enabled, Codeword 1 disabled | | | | Two Codewords: Codeword 0 enabled, Codeword 1 enabled | | | | |
|---|---|---|---|---|---|---|---|---|
| Value | Number of DMRS CDM group(s) without data | DMRS port(s) | $\{P0, \ldots, Pv-1\}$ | Number of front-load symbols | Value | Number of DMRS CDM group(s) without data | DMRS port(s) | $\{P0, \ldots, Pv-1\}$ | Number of front-load symbols |
| | | | | | | | | $p_4 = 1$ $p_5 = 4$ or $p_0 = 0$ $p_1 = 1$ $p_2 = 4$ $p_3 = 2$ $p_4 = 3$ $p_5 = 6$ or $p_0 = 0$ $p_1 = 1$ $p_2 = 2$ $p_3 = 3$ $p_4 = 4$ $p_5 = 6$ | |
| 2 | 1 | 0, 1 | $p_0 = 0$ $p_1 = 1$ | 1 | 2 | 2 | 0, 1, 2, 3, 4, 6 | $p_0 = 2$ $p_1 = 3$ $p_2 = 6$ $p_3 = 0$ $p_4 = 1$ $p_6 = 5$ or $p_0 = 0$ $p_1 = 1$ $p_2 = 2$ $p_3 = 3$ $p_4 = 4$ $p_5 = 5$ $p_6 = 6$ | 2 |
| 3 | 2 | 0 | $p_0 = 0$ | 1 | 3 | 2 | 0, 1, 2, 3, 4, 6, 7 | $p_0 = 2$ $p_1 = 3$ $p_2 = 6$ $p_3 = 7$ $p_4 = 0$ $p_5 = 1$ $p_6 = 4$ $p_7 = 5$ or $p_0 = 0$ $p_1 = 1$ $p_2 = 4$ $p_3 = 5$ $p_4 = 2$ $p_5 = 3$ $p_6 = 6$ $p_7 = 7$ or $p_0 = 0$ $p_1 = 1$ $p_2 = 2$ $p_3 = 3$ $p_4 = 4$ $p_5 = 5$ $p_6 = 6$ $p_7 = 7$ | 2 |
| 4 | 2 | 1 | $p_0 = 1$ | 1 | 4-31 | reserved | reserved | reserved | |
| 5 | 2 | 2 | $p_0 = 2$ | 1 | | | | | |
| 6 | 2 | 3 | $p_0 = 3$ | 1 | | | | | |
| 7 | 2 | 0, 1 | $p_0 = 0$ $p_1 = 1$ | 1 | | | | | |
| 8 | 2 | 2, 3 | $p_0 = 2$ $p_1 = 3$ | 1 | | | | | |

-continued

| | One Codeword: Codeword 0 enabled, Codeword 1 disabled | | | | Two Codewords: Codeword 0 enabled, Codeword 1 enabled | | | |
|---|---|---|---|---|---|---|---|---|
| Value | Number of DMRS CDM group(s) without data | DMRS port(s) | $\{P_0, \ldots, P_{v-1}\}$ | Number of front-load symbols | Value | Number of DMRS CDM group(s) without data | DMRS port(s) | $\{P_0, \ldots, P_{v-1}\}$ | Number of front-load symbols |
| 9 | 2 | 0-2 | $p_0 = 0$<br>$p_1 = 1$<br>$p_2 = 2$<br>or<br>$p_0 = 2$<br>$p_1 = 0$<br>$p_2 = 1$ | 1 | | | | |
| 10 | 2 | 0-3 | $p_0 = 0$<br>$p_1 = 1$<br>$p_2 = 2$<br>$p_3 = 3$<br>or<br>$p_0 = 2$<br>$p_1 = 3$<br>$p_2 = 0$<br>$p_3 = 1$ | 1 | | | | |
| 11 | 2 | 0, 2 | $p_0 = 0$<br>$p_1 = 2$<br>or<br>$p_0 = 2$<br>$p_1 = 0$ | 1 | | | | |
| 12 | 2 | 0 | $p_0 = 0$ | 2 | | | | |
| 13 | 2 | 1 | $p_0 = 1$ | 2 | | | | |
| 14 | 2 | 2 | $p_0 = 2$ | 2 | | | | |
| 15 | 2 | 3 | $p_0 = 3$ | 2 | | | | |
| 16 | 2 | 4 | $p_0 = 4$ | 2 | | | | |
| 17 | 2 | 5 | $p_0 = 5$ | 2 | | | | |
| 18 | 2 | 6 | $p_0 = 6$ | 2 | | | | |
| 19 | 2 | 7 | $p_0 = 7$ | 2 | | | | |
| 20 | 2 | 0, 1 | $p_0 = 0$<br>$p_1 = 1$ | 2 | | | | |
| 21 | 2 | 2, 3 | $p_2 = 2$<br>$p_3 = 3$ | 2 | | | | |
| 22 | 2 | 4, 5 | $p_4 = 4$<br>$p_1 = 5$ | 2 | | | | |
| 23 | 2 | 6, 7 | $p_0 = 6$<br>$p_1 = 7$ | 2 | | | | |
| 24 | 2 | 0, 4 | $p_0 = 0$<br>$p_1 = 4$ | 2 | | | | |
| 25 | 2 | 2, 6 | $p_0 = 2$<br>$p_1 = 6$ | 2 | | | | |
| 26 | 2 | 0, 1, 4 | $p_0 = 0$<br>$p_1 = 1$<br>$p_2 = 4$ | 2 | | | | |
| 27 | 2 | 2, 3, 6 | $p_0 = 2$<br>$p_1 = 3$<br>$p_2 = 6$ | 2 | | | | |
| 28 | 2 | 0, 1, 4, 5 | $p_0 = 0$<br>$p_1 = 1$<br>$p_2 = 4$<br>$p_3 = 5$ | 2 | | | | |
| 29 | 2 | 2, 3, 6, 7 | $p_0 = 2$<br>$p_1 = 3$<br>$p_2 = 6$<br>$p_3 = 7$ | 2 | | | | |
| 30 | 2 | 0, 2, 4, 6 | $p_0 = 0$<br>$p_1 = 2$<br>$p_2 = 4$<br>$p_3 = 6$<br>or<br>$p_0 = 2$<br>$p_1 = 6$<br>$p_2 = 0$<br>$p_3 = 4$ | 2 | | | | |

-continued

| One Codeword: Codeword 0 enabled, Codeword 1 disabled | | | | Two Codewords: Codeword 0 enabled, Codeword 1 enabled | | | |
|---|---|---|---|---|---|---|---|
| Value | Number of DMRS CDM group(s) without data | DMRS port(s) | {P0, ..., Pv-1} | Value | Number of DMRS CDM group(s) without data | DMRS port(s) | {P0, ..., Pv-1} | Number of front-load symbols |
| | | | or $p_0 = 0$ $p_1 = 4$ $p_2 = 2$ $p_3 = 6$ | | | | |
| 31 | Reserved | Reserved | Reserved | | | | | wherein item of One Codeword: Codeword 0 enabled, Codeword 1 disabled represents one codeword, with codeword 0 being enabled and codeword 1 being disabled; item of Two Codewords: Codeword 0 enabled, Codeword 1 enabled represents two codewords, with codeword 0 being enabled and codeword 1 being disabled; item of Value represents a value of a DMRS port indication information field, item of Number of DMRS CDM group(s) without data represents a quantity of DMRS CDM groups without data, item of Number of front-load symbols represents a quantity of front-load DMRS symbols, and item of DMRS port(s) represents a set of DMRS ports and is notified to a terminal through DCI.

11. The non-transitory computer storage medium method according to claim 4, wherein, when a DMRS configuration type is a second type and the maximum number of DMRS symbols is 1, values of {P0, ..., Pv-1} are determined by a following table:

| One codeword: Codeword 0 enabled, Codeword 1 disabled | | | | Two codewords: Codeword 0 enabled, Codeword 1 enabled | | | |
|---|---|---|---|---|---|---|---|
| Value | Number of DMRS CDM group(s) without data | DMRS port(s) | {P0, ..., Pv-1} | Value | Number of DMRS CDM group(s) without data | DMRS port(s) | {P0, ..., Pv-1} |
| 0 | 1 | 0 | $p_0 = 0$ | 0 | 3 | 0-4 | $p_0 = 0$ $p_1 = 1$ $p_2 = 2$ $p_3 = 3$ $p_4 = 4$ |
| 1 | 1 | 1 | $p_0 = 1$ | 1 | 3 | 0-5 | $p_0 = 0$ $p_1 = 1$ $p_2 = 2$ $p_3 = 3$ $p_4 = 4$ $p_4 = 5$ or $p_0 = 0$ $p_1 = 1$ $p_2 = 4$ $p_3 = 5$ $p_4 = 2$ $p_4 = 3$ or $p_0 = 2$ $p_1 = 3$ $p_2 = 0$ $p_3 = 1$ $p_4 = 4$ $p_4 = 5$ or $p_0 = 2$ $p_1 = 3$ $p_2 = 4$ $p_3 = 5$ $p_4 = 0$ $p_4 = 1$ or $p_0 = 4$ $p_1 = 5$ $p_2 = 0$ $p_3 = 1$ $p_4 = 2$ $p_4 = 3$ or $p_0 = 4$ $p_0 = 5$ $p_1 = 0$ $p_2 = 2$ $p_3 = 3$ $p_4 = 0$ $p_4 = 1$ |
| 2 | 1 | 0, 1 | $p_0 = 0$ $p_1 = 1$ | 2-31 | reserved | reserved | |
| 3 | 2 | 0 | $p_0 = 0$ | | | | |
| 4 | 2 | 1 | $p_0 = 1$ | | | | |
| 5 | 2 | 2 | $p_0 = 2$ | | | | |
| 6 | 2 | 3 | $p_0 = 3$ | | | | |
| 7 | 2 | 0, 1 | $p_0 = 0$ $p_1 = 1$ | | | | |
| 8 | 2 | 2, 3 | $p_0 = 2$ $p_1 = 3$ | | | | |
| 9 | 2 | 0-2 | $p_0 = 0$ $p_1 = 1$ $P_2 = 2$ | | | | |

-continued

| One codeword: Codeword 0 enabled, Codeword 1 disabled | | | | Two codewords: Codeword 0 enabled, Codeword 1 enabled | | | |
|---|---|---|---|---|---|---|---|
| Value | Number of DMRS CDM group(s) without data | DMRS port(s) | $\{P0, \ldots, Pv-1\}$ | Value | Number of DMRS CDM group(s) without data | DMRS port(s) | $\{P0, \ldots, Pv-1\}$ |
| | | | or $p_0 = 2$ $p_1 = 0$ $p_2 = 1$ | | | | |
| 10 | 2 | 0-3 | $p_0 = 0$ $p_1 = 1$ $p_2 = 2$ $p_3 = 3$ or $p_0 = 2$ $p_1 = 3$ $p_2 = 0$ $p_3 = 1$ | | | | |
| 11 | 3 | 0 | $p_0 = 0$ | | | | |
| 12 | 3 | 1 | $p_0 = 1$ | | | | |
| 13 | 3 | 2 | $p_0 = 2$ | | | | |
| 14 | 3 | 3 | $p_0 = 3$ | | | | |
| 15 | 3 | 4 | $p_0 = 4$ | | | | |
| 16 | 3 | 5 | $p_0 = 5$ | | | | |
| 17 | 3 | 0, 1 | $p_0 = 0$ $p_1 = 1$ | | | | |
| 18 | 3 | 2, 3 | $p_0 = 2$ $p_1 = 3$ | | | | |
| 19 | 3 | 4, 5 | $p_0 = 4$ $p_1 = 5$ | | | | |
| 20 | 3 | 0-2 | $p_0 = 0$ $p_1 = 1$ $p_2 = 2$ or $p_0 = 2$ $p_1 = 0$ $p_2 = 1$ | | | | |
| 21 | 3 | 3-5 | $p_0 = 3$ $p_1 = 4$ $p_2 = 5$ or $p_0 = 4$ $p_1 = 5$ $p_2 = 3$ | | | | |
| 22 | 3 | 0-3 | $p_0 = 0$ $p_1 = 1$ $p_2 = 2$ $p_3 = 3$ or $p_0 = 2$ $p_1 = 3$ $p_2 = 0$ $p_3 = 1$ | | | | |
| 23 | 2 | 0, 2 | $p_0 = 0$ $p_1 = 2$ or $p_0 = 2$ $p_1 = 0$ | | | | |
| 24-31 | Reserved | Reserved | | | | | | wherein item of One Codeword: Codeword 0 enabled, Codeword 1 disabled represents one codeword, with codeword 0 being enabled and codeword 1 being disabled; item of Two Codewords: Codeword 0 enabled, Codeword 1 enabled represents two codewords, with codeword 0 being enabled and codeword 1 being disabled; item of Value represents a value of a DMRS port indication information field, item of Number of DMRS CDM group(s) without data represents a quantity of DMRS CDM groups without data, item of Number of front-load symbols represents a quantity of front-load DMRS symbols, and DMRS port(s) represents a set of DMRS ports and is notified to a terminal through DCI.

12. The non-transitory computer storage medium method according to claim 4, wherein, when a DMRS configuration type is a second type and a maximum quantity of DMRS symbols is 2, values of $\{P0, \ldots, Pv-1\}$ are determined by a following table:

| One codeword: Codeword 0 enabled, Codeword 1 disabled | | | | | Two Codewords: Codeword 0 enabled, Codeword 1 enabled | | | | |
|---|---|---|---|---|---|---|---|---|---|
| Value | Number of DMRS CDM group(s) without data | DMRS port(s) | $\{P0, \ldots, Pv-1\}$ | Number of front-load symbols | Value | Number of DMRS CDM group(s) without data | DMRS port(s) | $\{P0, \ldots, Pv-1\}$ | Number of front-load symbols |
| 0 | 1 | 0 | $p_0 = 0$ | 1 | 0 | 3 | 0-4 | $p_0 = 0$ $p_1 = 1$ $p_2 = 2$ $p_3 = 3$ $p_4 = 4$ | 1 |
| 1 | 1 | 1 | $p_0 = 1$ | 1 | 1 | 3 | 0-5 | $p_0 = 0$ $p_1 = 1$ $p_2 = 2$ $p_3 = 3$ $p_4 = 4$ $p_4 = 5$ | 1 |

-continued

| One codeword: Codeword 0 enabled, Codeword 1 disabled | | | | | Two Codewords: Codeword 0 enabled, Codeword 1 enabled | | | | |
|---|---|---|---|---|---|---|---|---|---|
| Value | Number of DMRS CDM group(s) without data | DMRS port(s) | $\{P_0, \ldots, P_{v-1}\}$ | Number of front-load symbols | Value | Number of DMRS CDM group(s) without data | DMRS port(s) | $\{P_0, \ldots, P_{v-1}\}$ | Number of front-load symbols |
| | | | | | | | | or $p_0 = 0$ $p_1 = 1$ $p_2 = 4$ $p_3 = 5$ $p_4 = 2$ $p_4 = 3$ or $p_0 = 2$ $p_1 = 3$ $p_2 = 0$ $p_3 = 1$ $p_4 = 4$ $p_4 = 5$ or $p_0 = 2$ $p_1 = 3$ $p_2 = 4$ $p_3 = 5$ $p_4 = 0$ $p_4 = 1$ or $p_0 = 4$ $p_1 = 5$ $p_2 = 0$ $p_3 = 1$ $p_4 = 2$ $p_4 = 3$ or $p_0 = 4$ $p_1 = 5$ $p_2 = 2$ $p_3 = 3$ $p_4 = 0$ $p_4 = 1$ | |
| 2 | 1 | 0, 1 | $p_0 = 0$ $p_1 = 1$ | 1 | 2 | 2 | 0, 1, 2, 3, 6 | $p_0 = 2$ $p_1 = 3$ $p_2 = 0$ $p_3 = 1$ $p_4 = 6$ or $p_0 = 0$ $p_1 = 1$ $p_2 = 2$ $p_3 = 3$ $p_4 = 6$ | 2 |
| 3 | 2 | 0 | $p_0 = 0$ | 1 | 3 | 2 | 0, 1, 2, 3, 6, 8 | $p_0 = 2$ $p_1 = 3$ $p_2 = 8$ $p_3 = 0$ $p_4 = 1$ $p_5 = 6$ or $p_0 = 0$ $p_1 = 1$ $p_2 = 6$ $p_3 = 2$ $p_4 = 3$ $p_5 = 8$ or $p_0 = 0$ $p_1 = 1$ $p_2 = 2$ $p_3 = 3$ $p_4 = 6$ $p_s = 8$ | 2 |

-continued

| | One codeword: Codeword 0 enabled, Codeword 1 disabled | | | | Two Codewords: Codeword 0 enabled, Codeword 1 enabled | | | |
|---|---|---|---|---|---|---|---|---|
| Value | Number of DMRS CDM group(s) without data | DMRS port(s) | {P0, ..., Pv-1} | Number of front-load symbols | Value | Number of DMRS CDM group(s) without data | DMRS port(s) | {P0, ..., Pv-1} | Number of front-load symbols |
| 4 | 2 | 1 | $p_0 = 1$ | 1 | 4 | 2 | 0, 1, 2, 3, 6, 7, 8 | $p_0 = 2$<br>$p_1 = 3$<br>$p_2 = 8$<br>$p_3 = 0$<br>$p_4 = 1$<br>$p_5 = 6$<br>$p_7 = 7$<br>or<br>$p_0 = 0$<br>$p_1 = 1$<br>$p_2 = 2$<br>$p_3 = 3$<br>$p_4 = 6$<br>$p_5 = 7$<br>$p_6 = 8$ | 2 |
| 5 | 2 | 2 | $p_0 = 2$ | 1 | 5 | 2 | 0, 1, 2, 3, 6, 7, 8, 9 | $p_0 = 2$<br>$p_1 = 3$<br>$p_2 = 8$<br>$p_3 = 9$<br>$p_4 = 0$<br>$p_5 = 1$<br>$p_6 = 6$<br>$p_7 = 7$<br>or<br>$p_0 = 0$<br>$p_1 = 1$<br>$p_2 = 6$<br>$p_3 = 7$<br>$p_4 = 2$<br>$p_5 = 3$<br>$p_6 = 8$<br>$p_7 = 9$<br>or<br>$p_0 = 0$<br>$p_1 = 1$<br>$p_2 = 2$<br>$p_3 = 3$<br>$p_4 = 6$<br>$p_5 = 7$<br>$p_6 = 8$<br>$p_7 = 9$ | 2 |
| 6 | 2 | 3 | $p_0 = 3$ | 1 | 6-63 | Reserved | Reserved | Reserved | |
| 7 | 2 | 0, 1 | $p_0 = 0$<br>$p_1 = 1$ | 1 | | | | | |
| 8 | 2 | 2, 3 | $p_0 = 2$<br>$p_1 = 3$ | 1 | | | | | |
| 9 | 2 | 0-2 | $p_0 = 0$<br>$p_1 = 1$<br>$p_2 = 2$<br>or<br>$p_0 = 2$<br>$p_1 = 0$<br>$p_2 = 1$ | 1 | | | | | |
| 10 | 2 | 0-3 | $p_0 = 0$<br>$p_1 = 1$<br>$p_2 = 2$<br>$p_3 = 3$<br>or<br>$p_0 = 2$<br>$p_1 = 3$<br>$p_2 = 0$<br>$p_3 = 1$ | 1 | | | | | |
| 11 | 3 | 0 | $p_0 = 0$ | 1 | | | | | |
| 12 | 3 | 1 | $p_0 = 1$ | 1 | | | | | |
| 13 | 3 | 2 | $p_0 = 2$ | 1 | | | | | |
| 14 | 3 | 3 | $p_0 = 3$ | 1 | | | | | |
| 15 | 3 | 4 | $p_0 = 4$ | 1 | | | | | |

-continued

| | One codeword: Codeword 0 enabled, Codeword 1 disabled | | | | Two Codewords: Codeword 0 enabled, Codeword 1 enabled | | | |
|---|---|---|---|---|---|---|---|---|
| Value | Number of DMRS CDM group(s) without data | DMRS port(s) | $\{P_0, \ldots, P_{v-1}\}$ | Number of front-load symbols | Value | Number of DMRS CDM group(s) without data | DMRS port(s) | $\{P_0, \ldots, P_{v-1}\}$ | Number of front-load symbols |
| 16 | 3 | 5 | $p_0 = 5$ | 1 | | | | |
| 17 | 3 | 0, 1 | $p_0 = 0$ $p_1 = 1$ | 1 | | | | |
| 18 | 3 | 2, 3 | $p_0 = 2$ $p_1 = 3$ | 1 | | | | |
| 19 | 3 | 4, 5 | $p_0 = 4$ $p_1 = 5$ | 1 | | | | |
| 20 | 3 | 0-2 | $p_0 = 0$ $p_1 = 1$ $p_2 = 2$ or $p_0 = 2$ $p_1 = 0$ $p_2 = 1$ | 1 | | | | |
| 21 | 3 | 3-5 | $p_0 = 3$ $p_1 = 4$ $p_2 = 5$ or $p_0 = 5$ $p_1 = 3$ $p_2 = 4$ | 1 | | | | |
| 22 | 3 | 0-3 | $p_0 = 0$ $p_1 = 1$ $p_2 = 2$ $p_3 = 3$ or $p_0 = 2$ $p_1 = 3$ $p_2 = 0$ $p_3 = 1$ | 1 | | | | |
| 23 | 2 | 0, 2 | $p_0 = 0$ $p_1 = 2$ or $p_0 = 2$ $p_1 = 0$ | 1 | | | | |
| 24 | 3 | 0 | $p_0 = 0$ | 2 | | | | |
| 25 | 3 | 1 | $p_0 = 1$ | 2 | | | | |
| 26 | 3 | 2 | $p_0 = 2$ | 2 | | | | |
| 27 | 3 | 3 | $p_0 = 3$ | 2 | | | | |
| 28 | 3 | 4 | $p_0 = 4$ | 2 | | | | |
| 29 | 3 | 5 | $p_0 = 5$ | 2 | | | | |
| 30 | 3 | 6 | $p_0 = 6$ | 2 | | | | |
| 31 | 3 | 7 | $p_0 = 7$ | 2 | | | | |
| 32 | 3 | 8 | $p_0 = 8$ | 2 | | | | |
| 33 | 3 | 9 | $p_0 = 9$ | 2 | | | | |
| 34 | 3 | 10 | $p_0 = 10$ | 2 | | | | |
| 35 | 3 | 11 | $p_0 = 11$ | 2 | | | | |
| 36 | 3 | 0 | $p_0 = 0$ $p_1 = 1$ | 2 | | | | |
| 37 | 3 | 2 | $p_0 = 2$ $p_1 = 3$ | 2 | | | | |
| 38 | 3 | 4 | $p_0 = 4$ $p_1 = 5$ | 2 | | | | |
| 39 | 3 | 6 | $p_0 = 6$ $p_1 = 7$ | 2 | | | | |
| 40 | 3 | 8, 9 | $p_0 = 8$ $p_1 = 9$ | | | | | |

-continued

| Value | One codeword: Codeword 0 enabled, Codeword 1 disabled | | | | Value | Two Codewords: Codeword 0 enabled, Codeword 1 enabled | | | |
|---|---|---|---|---|---|---|---|---|---|
| | Number of DMRS CDM group(s) without data | DMRS port(s) | $\{P_0, \ldots, P_{v-1}\}$ | Number of front-load symbols | | Number of DMRS CDM group(s) without data | DMRS port(s) | $\{P_0, \ldots, P_{v-1}\}$ | Number of front-load symbols |
| 41 | 3 | 10, 11 | $p_0 = 10$, $p_1 = 11$ | 2 | | | | | |
| 42 | 3 | 0, 1, 6 | $p_0 = 0$, $p_1 = 1$, $p_2 = 6$ | 2 | | | | | |
| 43 | 3 | 2, 3, 8 | $p_0 = 2$, $p_1 = 3$, $p_2 = 8$ | 2 | | | | | |
| 44 | 3 | 4, 5, 10 | $p_0 = 4$, $p_1 = 5$, $p_2 = 10$ | 2 | | | | | |
| 45 | 3 | 0, 1, 6, 7 | $p_0 = 0$, $p_1 = 1$, $p_2 = 6$, $p_3 = 7$ | 2 | | | | | |
| 46 | 3 | 2, 3, 8, 9 | $p_0 = 2$, $p_1 = 3$, $p_2 = 8$, $p_3 = 9$ | 2 | | | | | |
| 47 | 3 | 4, 5, 10, 11 | $p_0 = 4$, $p_1 = 5$, $p_2 = 10$, $p_3 = 11$ | 2 | | | | | |
| 48 | 1 | 0 | $p_0 = 0$ | 2 | | | | | |
| 49 | 1 | 1 | $p_0 = 1$ | 2 | | | | | |
| 50 | 1 | 6 | $p_0 = 6$ | 2 | | | | | |
| 51 | 1 | 7 | $p_0 = 7$ | 2 | | | | | |
| 52 | 1 | 0, 1 | $p_0 = 0$, $p_1 = 1$ | 2 | | | | | |
| 53 | 1 | 6, 7 | $p_0 = 6$, $p_1 = 7$ | 2 | | | | | |
| 54 | 2 | 0 1 | $p_0 = 0$, $p_1 = 1$ | 2 | | | | | |
| 55 | 2 | 2, 3 | $p_0 = 2$, $p_1 = 3$ | 2 | | | | | |
| 56 | 2 | 6, 7 | $p_0 = 6$, $p_1 = 7$ | 2 | | | | | |
| 57 | 2 | 8, 9 | $p_0 = 8$, $p_1 = 9$ | 2 | | | | | |
| 58-63 | Reserved | Reserved | Reserved | | | | | | | wherein item of One Codeword: Codeword 0 enabled, Codeword 1 disabled represents one codeword, with codeword 0 being enabled and codeword 1 being disabled; item of Two Codewords: Codeword 0 enabled, Codeword 1 enabled represents two codewords, with codeword 0 being enabled and codeword 1 being disabled; item of Value represents a value of a DMRS port indication information field, item of Number of DMRS CDM group(s) without data represents a quantity of DMRS CDM groups without data, item of Number of front-load symbols represents a quantity of front-load DMRS symbols, and item of DMRS port(s) represents a set of DMRS ports and is notified to a terminal through DCI.

13. The non-transitory computer storage medium method according to claim 4, wherein, when a DMRS configuration type is a first type and a maximum quantity of DMRS symbols is 1, values of $\{P_0, \ldots, P_{v-1}\}$ are determined by a following table:

| | One Codeword: Codeword 0 enabled, Codeword 1 disabled | | |
|---|---|---|---|
| Value | Number of DMRS CDM group(s) without data | $\{P_0, \ldots, P_{v-1}\}$ | |
| 0 | 1 | $p_0 = 0$ | |
| 1 | 1 | $p_0 = 1$ | |
| 2 | 1 | $p_0 = 0$, $p_1 = 1$ | |
| 3 | 2 | $p_0 = 0$ | |
| 4 | 2 | $p_0 = 1$ | |
| 5 | 2 | $p_0 = 2$ | |
| 6 | 2 | $p_0 = 3$ | |
| 7 | 2 | $p_0 = 0$, $p_1 = 1$ | |
| 8 | 2 | $p_0 = 2$, $p_1 = 3$ | |

| One Codeword: Codeword 0 enabled, Codeword 1 disabled | | |
|---|---|---|
| Value | Number of DMRS CDM group(s) without data | $\{P_0, \ldots, P_{v-1}\}$ |
| 9 | 2 | $p_0 = 0$ $p_1 = 1$ $p_2 = 2$ or $p_0 = 2$ $p_1 = 0$ $p_2 = 1$ |
| 10 | 2 | $p_0 = 0$ $p_1 = 1$ $p_2 = 2$ $p_3 = 3$ or $p_0 = 2$ $p_1 = 3$ $p_2 = 0$ $p_3 = 1$ |
| 11 | 2 | $p_0 = 0$ $p_1 = 2$ or $p_0 = 2$ $p_1 = 0$ |
| 12-15 | Reserved | | wherein item of One Codeword: Codeword 0 enabled, Codeword 1 disabled represents one codeword, with codeword 0 being enabled and codeword 1 being disabled; item of Value represents a value of a DMRS port indication information field; and item of Number of DMRS CDM group(s) without data represents a quantity of DMRS CDM groups without data.

14. The non-transitory computer storage medium method according to claim 4, wherein, when a DMRS configuration type is a first type and a maximum quantity of DMRS symbols is 2, values of $\{P_0, \ldots, P_{v-1}\}$ are determined by a following table:

| One Codeword: Codeword 0 enabled, Codeword 1 disabled | | | | Two Codewords: Codeword 0 enabled, Codeword 1 enabled | | | |
|---|---|---|---|---|---|---|---|
| Value | Number of DMRS CDM group(s) without data | $\{P_0, \ldots, P_{v-1}\}$ | Number of front-load symbols | Value | Number of DMRS CDM group(s) without data | $\{P_0, \ldots, P_{v-1}\}$ | Number of front-load symbols |
| 0 | 1 | $p_0 = 0$ | 1 | 0 | 2 | $p_0 = 2$ $p_1 = 3$ $p_2 = 0$ $p_3 = 1$ $p_4 = 4$ or $p_0 = 0$ $p_1 = 1$ $p_2 = 2$ $p_3 = 3$ $p_4 = 4$ | 2 |
| 1 | 1 | $p_0 = 1$ | 1 | 1 | 2 | $p_0 = 2$ $p_1 = 3$ $p_2 = 6$ $p_3 = 0$ $p_4 = 1$ $p_5 = 4$ | 2 |
| 2 | 1 | $p_0 = 0$ $p_1 = 1$ | 1 | 2 | 2 | $p_0 = 2$ $p_1 = 3$ $p_2 = 6$ $p_3 = 0$ $p_4 = 1$ $p_5 = 4$ $p_6 = 5$ or $p_0 = 0$ $p_1 = 1$ $p_2 = 2$ $p_3 = 3$ $p_4 = 4$ $p_5 = 5$ $p_6 = 6$ | 2 |
| 3 | 2 | $p_0 = 0$ | 1 | 3 | 2 | $p_0 = 2$ $p_1 = 3$ $p_2 = 6$ $p_3 = 7$ $p_4 = 0$ $p_5 = 1$ $p_6 = 4$ $p_7 = 5$ or $p_0 = 0$ $p_1 = 1$ $p_2 = 4$ $p_3 = 5$ $p_4 = 2$ $p_5 = 3$ $p_6 = 6$ $p_7 = 7$ or $p_0 = 0$ $p_1 = 1$ $p_2 = 2$ $p_3 = 3$ $p_4 = 4$ $p_5 = 5$ $p_6 = 6$ $p_7 = 7$ | 2 |
| 4 | 2 | $p_0 = 1$ | 1 | 4-31 | reserved | | reserved |
| 5 | 2 | $p_0 = 2$ | 1 | | | | |
| 6 | 2 | $p_0 = 3$ | 1 | | | | |
| 7 | 2 | $p_0 = 0$ $p_0 = 1$ | 1 | | | | |
| 8 | 2 | $p_0 = 2$ $p_1 = 3$ | 1 | | | | |

| | One Codeword: Codeword 0 enabled, Codeword 1 disabled | | | Two Codewords: Codeword 0 enabled, Codeword 1 enabled | | |
|---|---|---|---|---|---|---|
| Value | Number of DMRS CDM group(s) without data | {P0, ..., Pv-1} | Number of front-load symbols | Value | Number of DMRS CDM group(s) without data | {P0, ..., Pv-1} | Number of front-load symbols |
| 9 | 2 | $p_0 = 0$<br>$p_1 = 1$<br>$p_2 = 2$<br>or<br>$p_0 = 2$<br>$p_1 = 0$<br>$p_2 = 1$ | 1 | | | |
| 10 | 2 | $p_0 = 0$<br>$p_1 = 1$<br>$p_2 = 2$<br>$p_3 = 3$<br>or<br>$p_0 = 2$<br>$p_1 = 3$<br>$p_2 = 0$<br>$p_3 = 1$ | 1 | | | |
| 11 | 2 | $p_0 = 0$<br>$p_1 = 2$<br>or<br>$p_0 = 2$<br>$p_1 = 0$ | 1 | | | |
| 12 | 2 | $p_0 = 0$ | 2 | | | |
| 13 | 2 | $p_0 = 1$ | 2 | | | |
| 14 | 2 | $p_0 = 2$ | 2 | | | |
| 15 | 2 | $p_0 = 3$ | 2 | | | |
| 16 | 2 | $p_0 = 4$ | 2 | | | |
| 17 | 2 | $p_0 = 5$ | 2 | | | |
| 18 | 2 | $p_0 = 6$ | 2 | | | |
| 19 | 2 | $p_0 = 7$ | 2 | | | |
| 20 | 2 | $p_0 = 0$<br>$p_1 = 1$ | 2 | | | |
| 21 | 2 | $p_0 = 2$<br>$p_1 = 3$ | 2 | | | |
| 22 | 2 | $p_0 = 4$<br>$p_1 = 5$ | 2 | | | |
| 23 | 2 | $p_0 = 6$<br>$p_1 = 7$ | 2 | | | |
| 24 | 2 | $p_0 = 0$<br>$p_1 = 4$ | 2 | | | |
| 25 | 2 | $p_0 = 2$<br>$p_1 = 6$ | 2 | | | |
| 26 | 2 | $p_0 = 0$<br>$p_1 = 1$<br>$p_2 = 4$ | 2 | | | |
| 27 | 2 | $p_0 = 2$<br>$p_1 = 3$<br>$p_2 = 6$ | 2 | | | |
| 28 | 2 | $p_0 = 0$<br>$p_1 = 1$<br>$p_2 = 4$<br>$p_3 = 5$ | 2 | | | |
| 29 | 2 | $p_0 = 2$<br>$p_1 = 3$<br>$p_2 = 6$<br>$p_3 = 7$ | 2 | | | |
| 30 | 2 | $p_0 = 0$<br>$p_1 = 2$<br>$p_2 = 4$<br>$p_3 = 6$<br>or<br>$p_0 = 2$<br>$p_1 = 6$<br>$p_2 = 0$<br>$p_3 = 4$<br>or<br>$p_0 = 0$<br>$p_1 = 4$<br>$p_2 = 2$<br>$p_3 = 6$ | 2 | 31 | Reserved | Reserved | wherein item of One Codeword: Codeword 0 enabled, Codeword 1 disabled represents one codeword, with codeword 0 being enabled and codeword 1 being disabled; item of Two Codewords: Codeword 0 enabled, Codeword 1 enabled represents two codewords, with codeword 0 being enabled and codeword 1 is disabled; item of Value represents a value of a DMRS port indication information field; item of Number of DMRS CDM group(s) without data represents a quantity of DMRS CDM groups without data; and item of Number of front-load symbols represents a quantity of front-load DMRS symbols.

15. The non-transitory computer storage medium method according to claim 4, wherein, when a DMRS configuration type is a second type and a maximum quantity of DMRS symbols is 1, values of {P0, ..., Pv-1} are determined by a following table:

| One Codeword: Codeword 0 enabled, Codeword 1 disabled | | | Two Codewords: Codeword 0 enabled, Codeword 1 enabled | | |
|---|---|---|---|---|---|
| Value | Number of DMRS CDM group(s) without data | {P0, ..., Pv-1} | Value | Number of DMRS CDM group(s) without data | {P0, ..., Pv-1} |
| 0 | 1 | $p_0 = 0$ | 0 | 3 | $p_0 = 0$<br>$p_1 = 1$<br>$p_2 = 2$<br>$p_3 = 3$<br>$p_4 = 4$ |
| 1 | 1 | $p_0 = 1$ | 1 | 3 | $p_0 = 0$<br>$p_1 = 1$<br>$p_2 = 2$<br>$p_3 = 3$<br>$p_4 = 4$<br>$p_4 = 5$<br>or<br>$p_0 = 0$<br>$p_1 = 1$<br>$p_2 = 4$<br>$p_3 = 5$<br>$p_4 = 2$<br>$p_4 = 3$<br>or<br>$p_0 = 2$<br>$p_1 = 3$<br>$p_2 = 0$<br>$p_3 = 1$<br>$p_4 = 4$<br>$p_4 = 5$ |

| One Codeword: Codeword 0 enabled, Codeword 1 disabled | | | Two Codewords: Codeword 0 enabled, Codeword 1 enabled | | |
|---|---|---|---|---|---|
| Value | Number of DMRS CDM group(s) without data | {P0, ..., Pv-1} | Value | Number of DMRS CDM group(s) without data | {P0, ..., Pv-1} |
| | | | | | or $p_0 = 2$ $p_1 = 3$ $p_2 = 4$ $p_3 = 5$ $p_4 = 0$ $p_4 = 1$ or $p_0 = 4$ $p_1 = 5$ $p_2 = 0$ $p_3 = 1$ $p_4 = 2$ $p_4 = 3$ or $p_0 = 4$ $p_1 = 5$ $p_2 = 2$ $p_3 = 3$ $p_4 = 0$ $p_4 = 1$ |
| 2 | 1 | $p_0 = 0$ $p_1 = 1$ | 2-31 | reserved | |
| 3 | 2 | $p_0 = 0$ | | | |
| 4 | 2 | $p_0 = 1$ | | | |
| 5 | 2 | $p_0 = 2$ | | | |
| 6 | 2 | $p_0 = 3$ | | | |
| 7 | 2 | $p_0 = 0$ $p_1 = 1$ | | | |
| 8 | 2 | $p_0 = 2$ $p_1 = 3$ | | | |
| 9 | 2 | $p_0 = 0$ $p_1 = 1$ $p_2 = 2$ or $p_0 = 2$ $p_1 = 0$ $p_2 = 1$ | | | |
| 10 | 2 | $p_0 = 0$ $p_1 = 1$ $p_2 = 2$ $p_3 = 3$ or $p_0 = 2$ $p_1 = 3$ $p_2 = 0$ $p_3 = 1$ | | | |
| 11 | 3 | $p_0 = 0$ | | | |
| 12 | 3 | $p_0 = 1$ | | | |
| 13 | 3 | $p_0 = 2$ | | | |
| 14 | 3 | $p_0 = 3$ | | | |
| 15 | 3 | $p_0 = 4$ | | | |
| 16 | 3 | $p_0 = 5$ | | | |
| 17 | 3 | $p_0 = 0$ $p_1 = 1$ | | | |
| 18 | 3 | $p_0 = 2$ $p_1 = 3$ | | | |
| 19 | 3 | $p_0 = 4$ $p_1 = 5$ | | | |
| 20 | 3 | $p_0 = 0$ $p_1 = 1$ $p_2 = 2$ or $p_0 = 2$ $p_1 = 0$ $p_2 = 1$ | | | |
| 21 | 3 | $p_0 = 3$ $p_1 = 4$ $p_2 = 5$ or $p_0 = 4$ $p_1 = 5$ $p_2 = 3$ | | | |
| 22 | 3 | $p_0 = 0$ $p_1 = 1$ $p_2 = 2$ $p_3 = 3$ or $p_0 = 2$ $p_1 = 3$ $p_2 = 0$ $p_3 = 1$ | | | |
| 23 | 2 | $p_0 = 0$ $p_1 = 2$ or $p_0 = 2$ $p_1 = 0$ | | | |
| 24-31 | Reserved | | | | | wherein item of One Codeword: Codeword 0 enabled, Codeword 1 disabled represents one codeword, with codeword 0 being enabled and codeword 1 being disabled; item of Two Codewords: Codeword 0 enabled, Codeword 1 enabled represents two codewords, with codeword 0 being enabled and codeword 1 being disabled; item of Value represents a value of a DMRS port indication information field; and item of Number of DMRS CDM group(s) without data represents a quantity of DMRS CDM groups without data.

16. The non-transitory computer storage medium method according to claim 4, wherein, when a DMRS configuration type is a second type and a maximum quantity of DMRS symbols is 2, values of {P0, ..., Pv-1} are determined by a following table:

| One Codeword: Codeword 0 enabled, Codeword 1 disabled | | | | Two Codewords: Codeword 0 enabled, Codeword 1 enabled | | | |
|---|---|---|---|---|---|---|---|
| Value | Number of DMRS CDM group(s) without data | {P0, ..., Pv-1} | Number of front-load symbols | Value | Number of DMRS CDM group(s) without data | {P0, ..., Pv-1} | Number of front-load symbols |
| 0 | 1 | $p_0 = 0$ | 1 | 0 | 3 | $p_0 = 0$ $p_1 = 1$ $p_2 = 2$ $p_3 = 3$ $p_4 = 4$ | 1 |

-continued

| One Codeword: Codeword 0 enabled, Codeword 1 disabled | | | | Two Codewords: Codeword 0 enabled, Codeword 1 enabled | | | |
|---|---|---|---|---|---|---|---|
| Value | Number of DMRS CDM group(s) without data | {P0, ..., Pv-1} | Number of front-load symbols | Value | Number of DMRS CDM group(s) without data | {P0, ..., Pv-1} | Number of front-load symbols |
| 1 | 1 | $p_0 = 1$ | 1 | 1 | 3 | $p_0 = 0$<br>$p_1 = 1$<br>$p_2 = 2$<br>$p_3 = 3$<br>$p_4 = 4$<br>$p_4 = 5$<br>or<br>$p_0 = 0$<br>$p_1 = 1$<br>$p_2 = 4$<br>$p_3 = 5$<br>$p_4 = 2$<br>$p_4 = 3$<br>or<br>$p_0 = 2$<br>$p_1 = 3$<br>$p_2 = 0$<br>$p_3 = 1$<br>$p_4 = 4$<br>$p_4 = 5$<br>or<br>$p_0 = 2$<br>$p_1 = 3$<br>$p_2 = 4$<br>$p_3 = 5$<br>$p_4 = 0$<br>$p_4 = 1$<br>or<br>$p_0 = 4$<br>$p_1 = 5$<br>$p_2 = 0$<br>$p_3 = 1$<br>$p_4 = 2$<br>$p_4 = 3$<br>or<br>$p_0 = 4$<br>$p_1 = 5$<br>$p_2 = 2$<br>$p_3 = 3$<br>$p_4 = 0$<br>$p_4 = 1$ | 1 |
| 2 | 1 | $p_0 = 0$<br>$p_1 = 1$ | 1 | 2 | 2 | $p_0 = 2$<br>$p_1 = 3$<br>$p_2 = 0$<br>$p_3 = 1$<br>or<br>$p_1 = 1$<br>$p_0 = 0$<br>$p_1 = 1$<br>$p_2 = 2$<br>$p_3 = 3$<br>$p_4 = 6$ | 2 |
| 3 | 2 | $p_0 = 0$ | 1 | 3 | 2 | $p_0 = 2$<br>$p_1 = 3$<br>$p_2 = 8$<br>$p_3 = 0$<br>$p_1 = 1$<br>$p_5 = 6$<br>or<br>$p_0 = 0$<br>$p_1 = 1$<br>$p_2 = 6$<br>$p_4 = 3$<br>$p_5 = 8$<br>or<br>$p_0 = 0$<br>$p_1 = 1$<br>$p_2 = 2$<br>$p_3 = 3$<br>$p_4 = 6$<br>$p_5 = 8$<br>$p_3 = 0$<br>$p_4 = 1$<br>$p_5 = 6$<br>$p_6 = 7$<br>or<br>$p_0 = 0$<br>$p_1 = 1$<br>$p_2 = 2$<br>$p_3 = 3$<br>$p_4 = 6$<br>$p_5 = 7$<br>$p_6 = 8$ | 2 |
| 4 | 2 | $p_0 = 1$ | 1 | 4 | 2 | $p_0 = 2$<br>$p_1 = 3$<br>$p_2 = 8$<br>$p_3 = 0$<br>$p_4 = 1$<br>$p_5 = 6$<br>$p_6 = 7$<br>or<br>$p_0 = 0$<br>$p_1 = 1$<br>$p_2 = 2$<br>$p_3 = 3$<br>$p_4 = 6$<br>$p_5 = 7$<br>$p_6 = 8$ | 2 |
| 5 | 2 | $p_0 = 2$ | 1 | 5 | 2 | $p_0 = 2$<br>$p_1 = 3$<br>$p_2 = 8$<br>$p_3 = 9$<br>$p_4 = 0$<br>$p_5 = 1$<br>$p_6 = 6$<br>$p_7 = 7$<br>or<br>$p_0 = 0$<br>$p_1 = 1$<br>$p_2 = 6$<br>$p_3 = 7$<br>$p_5 = 3$<br>$p_6 = 8$<br>$p_7 = 9$<br>or<br>$p_0 = 0$<br>$p_1 = 1$<br>$p_2 = 2$<br>$p_3 = 3$<br>$p_4 = 6$<br>$p_5 = 7$<br>$p_6 = 8$<br>$p_7 = 9$ | 2 |
| 6 | 2 | $p_0 = 3$ | 1 | 6-63 | Reserved | | Reserved |
| 7 | 2 | $p_0 = 0$<br>$p_1 = 1$ | 1 | | | | |
| 8 | 2 | $p_0 = 2$<br>$p_1 = 3$ | 1 | | | | |
| 9 | 2 | $p_0 = 0$<br>$p_1 = 1$<br>$p_2 = 2$<br>or<br>$p_0 = 2$<br>$p_1 = 0$<br>$p_2 = 1$ | 1 | | | | |
| 10 | 2 | $p_0 = 0$<br>$p_1 = 1$<br>$p_2 = 2$<br>$p_3 = 3$<br>or<br>$p_0 = 2$<br>$p_1 = 3$<br>$p_2 = 0$<br>$p_3 = 1$ | 1 | | | | |

-continued

| | One Codeword: Codeword 0 enabled, Codeword 1 disabled | | | Two Codewords: Codeword 0 enabled, Codeword 1 enabled | | |
|---|---|---|---|---|---|---|
| Value | Number of DMRS CDM group(s) without data | $\{P_0, \ldots, P_{v-1}\}$ | Number of front-load symbols | Value | Number of DMRS CDM group(s) without data | $\{P_0, \ldots, P_{v-1}\}$ | Number of front-load symbols |
| 11 | 3 | $p_0 = 0$ | 1 | | | | |
| 12 | 3 | $p_0 = 1$ | 1 | | | | |
| 13 | 3 | $p_0 = 2$ | 1 | | | | |
| 14 | 3 | $p_0 = 3$ | 1 | | | | |
| 15 | 3 | $p_0 = 4$ | 1 | | | | |
| 16 | 3 | $p_0 = 5$ | 1 | | | | |
| 17 | 3 | $p_0 = 0$ $p_1 = 1$ | 1 | | | | |
| 18 | 3 | $p_0 = 2$ $p_1 = 3$ | 1 | | | | |
| 19 | 3 | $p_0 = 4$ $p_1 = 5$ | 1 | | | | |
| 20 | 3 | $p_0 = 0$ $p_1 = 1$ $p_2 = 2$ or $p_0 = 2$ $p_1 = 0$ $p_2 = 1$ | 1 | | | | |
| 21 | 3 | $p_0 = 3$ $p_1 = 4$ $p_2 = 5$ or $p_0 = 5$ $p_1 = 3$ $p_2 = 4$ | 1 | | | | |
| 22 | 3 | $p_0 = 0$ $p_1 = 1$ $p_2 = 2$ $p_3 = 3$ or $p_0 = 2$ $p_1 = 3$ $p_2 = 0$ $p_3 = 1$ | 1 | | | | |
| 23 | 2 | $p_0 = 0$ $p_1 = 2$ or $p_0 = 2$ $p_1 = 0$ | 1 | | | | |
| 24 | 3 | $p_0 = 0$ | 2 | | | | |
| 25 | 3 | $p_0 = 1$ | 2 | | | | |
| 26 | 3 | $p_0 = 2$ | 2 | | | | |
| 27 | 3 | $p_0 = 3$ | 2 | | | | |
| 28 | 3 | $p_0 = 4$ | 2 | | | | |
| 29 | 3 | $p_0 = 5$ | 2 | | | | |
| 30 | 3 | $p_0 = 6$ | 2 | | | | |
| 31 | 3 | $p_0 = 7$ | 2 | | | | |
| 32 | 3 | $p_0 = 8$ | 2 | | | | |
| 33 | 3 | $p_0 = 9$ | 2 | | | | |
| 34 | 3 | $p_0 = 10$ | 2 | | | | |
| 35 | 3 | $p_0 = 11$ | 2 | | | | |
| 36 | 3 | $p_0 = 0$ $p_1 = 1$ | 2 | | | | |
| 37 | 3 | $p_0 = 2$ $p_1 = 3$ | 2 | | | | |
| 38 | 3 | $p_0 = 4$ $p_1 = 5$ | 2 | | | | |
| 39 | 3 | $p_0 = 6$ $p_1 = 7$ | 2 | | | | |
| 40 | 3 | $p_0 = 8$ $p_1 = 9$ | 2 | | | | |
| 41 | 3 | $p_0 = 10$ $p_1 = 11$ | 2 | | | | |
| 42 | 3 | $p_0 = 0$ $p_1 = 1$ $p_2 = 6$ | 2 | | | | |
| 43 | 3 | $p_0 = 2$ $p_1 = 3$ $p_2 = 8$ | 2 | | | | |
| 44 | 3 | $p_0 = 4$ $p_1 = 5$ $p_2 = 10$ | 2 | | | | |
| 45 | 3 | $p_0 = 0$ $p_1 = 1$ $p_2 = 6$ $p_3 = 7$ | 2 | | | | |
| 46 | 3 | $p_0 = 2$ $p_1 = 3$ $p_2 = 8$ $p_3 = 9$ | 2 | | | | |
| 47 | 3 | $p_0 = 4$ $p_1 = 5$ $p_2 = 10$ $p_3 = 11$ | 2 | | | | |
| 48 | 1 | $p_0 = 0$ | 2 | | | | |
| 49 | 1 | $p_0 = 1$ | 2 | | | | |
| 50 | 1 | $p_0 = 6$ | 2 | | | | |
| 51 | 1 | $p_0 = 7$ | 2 | | | | |
| 52 | 1 | $p_0 = 0$ $p_1 = 1$ | 2 | | | | |
| 53 | 1 | $p_0 = 6$ $p_1 = 7$ | 2 | | | | |
| 54 | 2 | $p_0 = 0$ $p_1 = 1$ | 2 | | | | |
| 55 | 2 | $p_0 = 2$ $p_1 = 3$ | 2 | | | | |
| 56 | 2 | $p_0 = 6$ $p_1 = 7$ | 2 | | | | |
| 57 | 2 | $p_0 = 8$ $p_1 = 9$ | 2 | | | | |
| 58-63 | Reserved | | | | Reserved | | | wherein item of One Codeword: Codeword 0 enabled, Codeword 1 disabled represents one codeword, with codeword 0 being enabled and codeword 1 being disabled; item of Two Codewords: Codeword 0 enabled, Codeword 1 enabled represents two codewords, with codeword 0 being valid and codeword 1 being invalid; item of Value represents a value of a DMRS port indication information field; item of Number of DMRS CDM group(s) without data represents a quantity of DMRS CDM groups without data; and item of Number of front-load symbols represents a quantity of front-load DMRS symbols.

17. An apparatus for sending data, wherein, the apparatus comprises a memory and a processor, wherein the memory is configured to store program instructions, and the processor is configured to invoke the program instructions stored in the memory and, in accordance with an obtained program, perform the instructions stored on the non-transitory computer storage medium of claim 1.

18. A data receiving apparatus, wherein, the apparatus comprises a memory and a processor, wherein the memory is configured to store program instructions, and the processor is configured to invoke the program instructions stored in the memory and, in accordance with an obtained program, perform:

determining a preset DMRS port ordering rule; and
receiving a data layer mapped onto a DMRS port via a transceiver according to the preset DMRS port ordering rule;
wherein, the DMRS port ordering rule is preset in one of following ways:

way 1-3:

two steps as follows are comprised for dual-codeword transmission:

step 1: grouping DMRS ports among DMRS ports allocated by DCI according to configured or indicated DMRS QCL grouping parameters, and for each DMRS group:
sorting DMRS ports in an order of DMRS port numbers from smallest to largest, or
sorting CDM groups to which DMRS ports in the group belong according to CDM group numbers, and sorting in an order of DMRS port numbers from smallest to largest in each CDM group;

step 2: sorting across DMRS-groups, comprising:
when a quantity of data layers is odd:
placing groups containing a smaller number of DMRS ports in front positions, or
sorting all DMRS groups according to DMRS group numbers;

when the quantity of data layers is even:
ensuring that a set of DMRS ports corresponding to codeword 1 is same as a set of DMRS ports corresponding to codeword 1 when the quantity of data layers minus 1, and a set of DMRS ports corresponding to codeword 0 contains a set of DMRS ports corresponding to codeword 0 when the quantity of data layers minus 1, or
sorting all DMRS groups according to the DMRS group numbers;

or way 1-4:

when two DMRS groups are used:
grouping DMRS ports among DMRS ports allocated by DCI according to high-level configured DMRS QCL grouping parameters, and for each DMRS group: sorting DMRS ports in an order of DMRS port numbers from smallest to largest, or sorting CDM groups to which DMRS ports in the DMRS group belong according to the CDM group numbers, and sorting in an order of DMRS port numbers from smallest to largest in each CDM group;
placing DMRS groups containing a smaller number of DMRS ports in front positions.

* * * * *